US011403849B2

(12) United States Patent
Weerasinghe et al.

(10) Patent No.: US 11,403,849 B2
(45) Date of Patent: Aug. 2, 2022

(54) METHODS AND APPARATUS FOR CHARACTERIZATION OF DIGITAL CONTENT

(71) Applicant: Charter Communications Operating, LLC, St. Louis, MO (US)

(72) Inventors: Srilal M. Weerasinghe, Parker, CO (US); Vipul Patel, Parker, CO (US); Basil Badawiyeh, Parker, CO (US); Robbie N. Mills, III, Indian Trail, NC (US); Michael Terada, Denver, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 16/582,837

(22) Filed: Sep. 25, 2019

(65) Prior Publication Data

US 2021/0089782 A1    Mar. 25, 2021

(51) Int. Cl.
*G06V 20/40* (2022.01)
*H04N 21/84* (2011.01)
(Continued)

(52) U.S. Cl.
CPC ......... *G06V 20/46* (2022.01); *H04N 21/8358* (2013.01); *H04N 21/84* (2013.01)

(58) Field of Classification Search
USPC ............................ 385/239–251; 386/239–248
See application file for complete search history.

(56) References Cited

U.S. PATENT DOCUMENTS

| 4,975,909 A | 12/1990 | Masson et al. |
| 5,410,344 A | 4/1995 | Graves et al. |

(Continued)

FOREIGN PATENT DOCUMENTS

| CA | 2653195 A1 | 12/2007 |
| CA | 3041380 A1 | 10/2010 |

(Continued)

OTHER PUBLICATIONS

Chen et al. "A Cascade of Feed-Forward Classifiers for Fast Pedestrian Detection," ACCV 2007, Part 1, p. 905-914, 2007. (Year: 2007).*

(Continued)

*Primary Examiner* — Hung Q Dang
(74) *Attorney, Agent, or Firm* — Gazdzinski & Associates, PC

(57) ABSTRACT

Methods and apparatus related to characterization of digital content, such as in a content delivery and/or service provider network. In one embodiment, a method is provided for identifying characteristics of digital content by a first-pass analysis of the content data, and subsequent adjustment of results of the first-pass data analysis based on a heuristic analysis. In one variant, the first-pass analysis is based on an extant (COTS) or off-the-shelf analytics framework which generates a result; artificial intelligence and/or machine learning techniques are utilized for analyzing the result based on a multi-source or multivariate analytical framework to enable convergence of a final result having suitable level of accuracy, yet with optimized temporal and processing overhead characteristics. In one implementation, the methods and apparatus are adapted for use in a content distribution network advertisement ingestion processing system.

20 Claims, 26 Drawing Sheets

(51) Int. Cl.
  *H04N 21/8358* (2011.01)
  *H04N 21/81* (2011.01)
  *H04N 21/845* (2011.01)
  *H04N 21/234* (2011.01)

(56) References Cited

U.S. PATENT DOCUMENTS

| | | | |
|---|---|---|---|
| 5,515,510 A | 5/1996 | Kikinis | |
| 5,758,257 A | 5/1998 | Herz et al. | |
| 5,790,935 A | 8/1998 | Payton | |
| 5,815,146 A | 9/1998 | Youden et al. | |
| 5,842,221 A | 11/1998 | Schmonsees | |
| 5,913,040 A | 6/1999 | Rakavy et al. | |
| 5,987,506 A | 11/1999 | Carter et al. | |
| 6,006,265 A | 12/1999 | Rangan et al. | |
| 6,073,160 A | 6/2000 | Grantham et al. | |
| 6,092,197 A | 7/2000 | Coueignoux | |
| 6,112,192 A | 8/2000 | Capek | |
| 6,122,647 A | 9/2000 | Horowitz et al. | |
| 6,169,570 B1 | 1/2001 | Suzuki | |
| 6,171,931 B1 | 1/2001 | Murari et al. | |
| 6,177,931 B1 | 1/2001 | Alexander et al. | |
| 6,285,999 B1 | 9/2001 | Page | |
| 6,286,041 B1 | 9/2001 | Collins, III et al. | |
| 6,321,257 B1 | 11/2001 | Kotola et al. | |
| 6,574,617 B1 | 6/2003 | Immerman et al. | |
| 6,581,207 B1 | 6/2003 | Sumita et al. | |
| 6,741,980 B1 | 5/2004 | Langseth et al. | |
| 6,760,916 B2 | 7/2004 | Holtz et al. | |
| 6,769,127 B1 | 7/2004 | Bonomi et al. | |
| 6,782,550 B1 | 8/2004 | Cao | |
| 6,785,704 B1 | 8/2004 | McCanne | |
| 6,832,259 B2 | 12/2004 | Hymel et al. | |
| 6,975,850 B1 | 12/2005 | Hurtta et al. | |
| 6,978,370 B1 | 12/2005 | Kocher | |
| 7,024,466 B2 | 4/2006 | Outten et al. | |
| 7,025,209 B2 | 4/2006 | Hawkins | |
| 7,028,071 B1 | 4/2006 | Slik | |
| 7,054,843 B2 | 5/2006 | Charas | |
| 7,103,906 B1 | 9/2006 | Katz et al. | |
| 7,155,226 B1 | 12/2006 | Oh et al. | |
| 7,159,235 B2 | 1/2007 | Son et al. | |
| 7,167,895 B1 | 1/2007 | Connelly | |
| 7,174,126 B2 | 2/2007 | McElhatten et al. | |
| 7,197,708 B1 | 3/2007 | Frendo et al. | |
| 7,203,185 B1 | 4/2007 | Dhara et al. | |
| 7,222,163 B1 | 5/2007 | Girouard et al. | |
| 7,228,359 B1 | 6/2007 | Monteiro | |
| 7,237,017 B1 | 6/2007 | Pecus et al. | |
| 7,260,564 B1 | 8/2007 | Lynn et al. | |
| 7,330,875 B2 | 2/2008 | Parasnis et al. | |
| 7,340,510 B1 | 3/2008 | Liskov et al. | |
| 7,346,630 B2 | 3/2008 | Eichstaedt et al. | |
| 7,383,228 B2 | 6/2008 | Lisanke et al. | |
| 7,406,099 B2 | 7/2008 | Schlagintweit | |
| 7,441,037 B2 | 10/2008 | Saxena | |
| 7,457,520 B2 | 11/2008 | Rosetti et al. | |
| 7,496,647 B2 | 2/2009 | Karaoguz et al. | |
| 7,558,837 B1 | 7/2009 | Denny | |
| 7,567,988 B2 | 7/2009 | Wolf et al. | |
| 7,602,820 B2 | 10/2009 | Helms et al. | |
| 7,603,321 B2 | 10/2009 | Gurvey | |
| 7,636,792 B1 | 12/2009 | Ho | |
| 7,653,689 B1 | 1/2010 | Champagne et al. | |
| 7,711,605 B1 | 5/2010 | Santeufemia et al. | |
| 7,788,687 B2 | 8/2010 | Conrad et al. | |
| 7,793,334 B2 | 9/2010 | Lewis | |
| 7,889,765 B2 | 2/2011 | Brooks et al. | |
| 7,937,725 B1 | 5/2011 | Schaffer et al. | |
| 7,986,686 B2 | 7/2011 | Nadeau et al. | |
| 8,010,691 B2 | 8/2011 | Kollmansberger et al. | |
| 8,015,583 B2 | 9/2011 | Bates et al. | |
| 8,028,322 B2 | 9/2011 | Riedl et al. | |
| 8,079,052 B2 | 12/2011 | Chen et al. | |
| 8,151,295 B1 | 4/2012 | Eldering et al. | |
| 8,165,916 B2 | 4/2012 | Hoffberg et al. | |
| 8,228,818 B2 | 7/2012 | Chase et al. | |
| 8,249,918 B1 | 8/2012 | Biere et al. | |
| 8,272,020 B2 | 9/2012 | Watson et al. | |
| 8,583,758 B2 | 11/2013 | Casey et al. | |
| 8,813,124 B2 | 8/2014 | Tidwell et al. | |
| 8,848,969 B2 | 9/2014 | Ramsdell et al. | |
| 8,856,825 B1 | 10/2014 | Mick, Jr. et al. | |
| 8,863,164 B1 | 10/2014 | Mick et al. | |
| 9,215,423 B2 | 12/2015 | Kimble et al. | |
| 9,286,388 B2 | 3/2016 | Marsh | |
| 9,386,327 B2 | 7/2016 | Lajoie et al. | |
| 9,479,807 B1 | 10/2016 | Bugajski et al. | |
| 10,032,190 B2 | 7/2018 | Marsh et al. | |
| 10,051,304 B2 | 8/2018 | Tidwell et al. | |
| 10,313,755 B2 | 6/2019 | Kimble et al. | |
| 10,445,784 B2 | 10/2019 | Marsh | |
| 10,506,296 B2 | 12/2019 | Bonvolanta et al. | |
| 10,586,023 B2 | 3/2020 | Gould et al. | |
| 2001/0003194 A1 | 6/2001 | Shimura et al. | |
| 2001/0030975 A1 | 10/2001 | Limb et al. | |
| 2001/0037223 A1 | 11/2001 | Beery et al. | |
| 2001/0056573 A1 | 12/2001 | Kovac et al. | |
| 2002/0002512 A1 | 1/2002 | Harpale | |
| 2002/0003789 A1 | 1/2002 | Kim et al. | |
| 2002/0013943 A1 | 1/2002 | Haberman et al. | |
| 2002/0019984 A1 | 2/2002 | Rakib | |
| 2002/0038296 A1 | 3/2002 | Margolus et al. | |
| 2002/0053076 A1 | 5/2002 | Landesmann | |
| 2002/0056107 A1 | 5/2002 | Schlack | |
| 2002/0059619 A1 | 5/2002 | Lebar | |
| 2002/0073421 A1 | 6/2002 | Levitan et al. | |
| 2002/0075805 A1 | 6/2002 | Gupta et al. | |
| 2002/0077787 A1 | 6/2002 | Rappaport et al. | |
| 2002/0082858 A1 | 6/2002 | Heddaya et al. | |
| 2002/0083451 A1 | 6/2002 | Gill et al. | |
| 2002/0085516 A1 | 7/2002 | Bridgelall | |
| 2002/0087975 A1 | 7/2002 | Schlack | |
| 2002/0112186 A1 | 8/2002 | Ford et al. | |
| 2002/0129368 A1 | 9/2002 | Schlack et al. | |
| 2002/0143565 A1 | 10/2002 | Headings et al. | |
| 2002/0152458 A1 | 10/2002 | Eyer et al. | |
| 2002/0161835 A1 | 10/2002 | Ball et al. | |
| 2002/0184091 A1 | 12/2002 | Pudar | |
| 2002/0188689 A1 | 12/2002 | Michael | |
| 2002/0188947 A1 | 12/2002 | Wang et al. | |
| 2002/0194498 A1 | 12/2002 | Blight et al. | |
| 2002/0194608 A1 | 12/2002 | Goldhor et al. | |
| 2003/0005447 A1 | 1/2003 | Rodriguez | |
| 2003/0023690 A1 | 1/2003 | Lohtia | |
| 2003/0037338 A1 | 2/2003 | Suzuki | |
| 2003/0061618 A1 | 3/2003 | Horiuchi et al. | |
| 2003/0069873 A1 | 4/2003 | Fox et al. | |
| 2003/0093790 A1 | 5/2003 | Logan et al. | |
| 2003/0126244 A1 | 7/2003 | Smith et al. | |
| 2003/0130008 A1 | 7/2003 | Rajaniemi et al. | |
| 2003/0149581 A1 | 8/2003 | Chaudhri et al. | |
| 2003/0149884 A1 | 8/2003 | Hernandez et al. | |
| 2003/0165241 A1 | 9/2003 | Fransdonk | |
| 2003/0169234 A1 | 9/2003 | Kempisty | |
| 2003/0172374 A1 | 9/2003 | Vinson et al. | |
| 2003/0179865 A1 | 9/2003 | Stillman et al. | |
| 2003/0182551 A1 | 9/2003 | Frantz et al. | |
| 2003/0188023 A1 | 10/2003 | Grecco et al. | |
| 2003/0192060 A1 | 10/2003 | Levy | |
| 2003/0204602 A1 | 10/2003 | Hudson et al. | |
| 2003/0223450 A1 | 12/2003 | Bender et al. | |
| 2003/0229900 A1 | 12/2003 | Reisman | |
| 2003/0236839 A1 | 12/2003 | Demsky et al. | |
| 2004/0001087 A1 | 1/2004 | Warmus et al. | |
| 2004/0003402 A1 | 1/2004 | McKenna, Jr. | |
| 2004/0006694 A1 | 1/2004 | Heelan et al. | |
| 2004/0015365 A1* | 1/2004 | Ohmori | G10L 15/22 704/276 |
| 2004/0015608 A1 | 1/2004 | Ellis et al. | |
| 2004/0030747 A1 | 2/2004 | Oppermann et al. | |
| 2004/0103120 A1 | 5/2004 | Fickle et al. | |
| 2004/0114539 A1 | 6/2004 | Beshai et al. | |
| 2004/0117838 A1 | 6/2004 | Karaoguz et al. | |

(56) References Cited

U.S. PATENT DOCUMENTS

| | | |
|---|---|---|
| 2004/0117846 A1 | 6/2004 | Karaoguz et al. |
| 2004/0128688 A1 | 7/2004 | Seo |
| 2004/0148625 A1 | 7/2004 | Eldering et al. |
| 2004/0153525 A1 | 8/2004 | Borella |
| 2004/0158858 A1 | 8/2004 | Paxton et al. |
| 2004/0162900 A1 | 8/2004 | Bucher et al. |
| 2004/0172531 A1 | 9/2004 | Little et al. |
| 2004/0185856 A1 | 9/2004 | McKenna et al. |
| 2004/0189873 A1 | 9/2004 | Konig et al. |
| 2004/0193712 A1 | 9/2004 | Benenati et al. |
| 2004/0194141 A1 | 9/2004 | Sanders |
| 2004/0199789 A1 | 10/2004 | Shaw et al. |
| 2004/0216158 A1 | 10/2004 | Blas |
| 2004/0218827 A1* | 11/2004 | Cohen .................. H04N 19/503 382/243 |
| 2004/0255148 A1 | 12/2004 | Monteiro et al. |
| 2004/0261099 A1 | 12/2004 | Durden et al. |
| 2004/0268398 A1 | 12/2004 | Fano et al. |
| 2004/0268403 A1 | 12/2004 | Krieger et al. |
| 2005/0005308 A1 | 1/2005 | Logan et al. |
| 2005/0021940 A1 | 1/2005 | Ma |
| 2005/0028200 A1 | 2/2005 | Sardera |
| 2005/0034171 A1 | 2/2005 | Benya |
| 2005/0060229 A1 | 3/2005 | Riedl et al. |
| 2005/0060742 A1 | 3/2005 | Riedl et al. |
| 2005/0060745 A1 | 3/2005 | Riedl et al. |
| 2005/0091539 A1 | 4/2005 | Wang et al. |
| 2005/0102529 A1 | 5/2005 | Buddhikot et al. |
| 2005/0108529 A1 | 5/2005 | Juneau |
| 2005/0111467 A1 | 5/2005 | Ng et al. |
| 2005/0122393 A1 | 6/2005 | Cockerton et al. |
| 2005/0132191 A1 | 6/2005 | Joshi et al. |
| 2005/0144333 A1 | 6/2005 | Kotzin |
| 2005/0144635 A1 | 6/2005 | Boortz et al. |
| 2005/0172312 A1 | 8/2005 | Lienhart et al. |
| 2005/0183120 A1 | 8/2005 | Jain et al. |
| 2005/0188402 A1 | 8/2005 | De et al. |
| 2005/0210502 A1 | 9/2005 | Flickinger et al. |
| 2005/0216942 A1 | 9/2005 | Barton |
| 2005/0229209 A1 | 10/2005 | Hildebolt et al. |
| 2005/0234779 A1 | 10/2005 | Chiu et al. |
| 2005/0238238 A1* | 10/2005 | Xu ...................... G06F 16/7834 382/224 |
| 2005/0257242 A1 | 11/2005 | Montgomery et al. |
| 2005/0261970 A1 | 11/2005 | Vucina et al. |
| 2005/0262418 A1 | 11/2005 | Gehrmann |
| 2006/0010226 A1 | 1/2006 | Hurtta et al. |
| 2006/0015502 A1 | 1/2006 | Szucs |
| 2006/0015580 A1 | 1/2006 | Gabriel et al. |
| 2006/0015637 A1 | 1/2006 | Chung |
| 2006/0015925 A1 | 1/2006 | Logan |
| 2006/0031558 A1 | 2/2006 | Ortega et al. |
| 2006/0036488 A1 | 2/2006 | Golan et al. |
| 2006/0059342 A1 | 3/2006 | Medvinsky et al. |
| 2006/0061682 A1 | 3/2006 | Bradley et al. |
| 2006/0075230 A1 | 4/2006 | Baird et al. |
| 2006/0088063 A1 | 4/2006 | Hartung et al. |
| 2006/0090186 A1 | 4/2006 | Santangelo et al. |
| 2006/0106805 A1 | 5/2006 | Aaron |
| 2006/0112038 A1* | 5/2006 | Luo ........................ G06N 20/00 706/20 |
| 2006/0116966 A1 | 6/2006 | Pedersen et al. |
| 2006/0117357 A1 | 6/2006 | Surline et al. |
| 2006/0117365 A1 | 6/2006 | Ueda et al. |
| 2006/0123147 A1 | 6/2006 | Yasuhara |
| 2006/0130120 A1 | 6/2006 | Brandyberry et al. |
| 2006/0149710 A1 | 7/2006 | Koningstein et al. |
| 2006/0159048 A1 | 7/2006 | Han et al. |
| 2006/0168119 A1 | 7/2006 | Inoue et al. |
| 2006/0173974 A1 | 8/2006 | Tang |
| 2006/0185004 A1 | 8/2006 | Song et al. |
| 2006/0190336 A1 | 8/2006 | Pisaris-Henderson et al. |
| 2006/0195553 A1 | 8/2006 | Nakamura |
| 2006/0200761 A1 | 9/2006 | Judd et al. |
| 2006/0224447 A1 | 10/2006 | Koningstein |
| 2006/0230427 A1 | 10/2006 | Kunkel et al. |
| 2006/0230457 A1 | 10/2006 | Hagan et al. |
| 2006/0242267 A1 | 10/2006 | Grossman |
| 2006/0248209 A1 | 11/2006 | Chiu et al. |
| 2006/0248555 A1 | 11/2006 | Eldering |
| 2006/0253545 A1 | 11/2006 | Lakamp |
| 2006/0253584 A1 | 11/2006 | Dixon et al. |
| 2006/0253894 A1 | 11/2006 | Bookman et al. |
| 2006/0256814 A1 | 11/2006 | Caci |
| 2006/0259927 A1 | 11/2006 | Acharya et al. |
| 2006/0260601 A1 | 11/2006 | Schedeler et al. |
| 2006/0277098 A1 | 12/2006 | Chung et al. |
| 2006/0291507 A1 | 12/2006 | Sarosi et al. |
| 2006/0293921 A1 | 12/2006 | McCarthy et al. |
| 2006/0293954 A1 | 12/2006 | Anderson et al. |
| 2007/0016476 A1 | 1/2007 | Hoffberg et al. |
| 2007/0022032 A1 | 1/2007 | Anderson et al. |
| 2007/0022459 A1 | 1/2007 | Gaebel et al. |
| 2007/0027809 A1 | 2/2007 | Alve |
| 2007/0038671 A1 | 2/2007 | Holm et al. |
| 2007/0038931 A1 | 2/2007 | Allaire et al. |
| 2007/0048716 A1 | 3/2007 | Hsu et al. |
| 2007/0061331 A1 | 3/2007 | Ramer et al. |
| 2007/0061336 A1 | 3/2007 | Ramer et al. |
| 2007/0067297 A1 | 3/2007 | Kublickis et al. |
| 2007/0077921 A1 | 4/2007 | Hayashi et al. |
| 2007/0078714 A1 | 4/2007 | Ott et al. |
| 2007/0086372 A1 | 4/2007 | Lee et al. |
| 2007/0088801 A1 | 4/2007 | Levkovitz et al. |
| 2007/0088832 A1 | 4/2007 | Tsang et al. |
| 2007/0091920 A1 | 4/2007 | Harris et al. |
| 2007/0094691 A1 | 4/2007 | Gazdzinski |
| 2007/0098350 A1 | 5/2007 | Gibbon et al. |
| 2007/0101359 A1 | 5/2007 | Schiller et al. |
| 2007/0115922 A1 | 5/2007 | Schneider et al. |
| 2007/0118848 A1 | 5/2007 | Schwesinger et al. |
| 2007/0118910 A1 | 5/2007 | Taylor et al. |
| 2007/0121612 A1 | 5/2007 | Nadeau et al. |
| 2007/0123253 A1 | 5/2007 | Simongini et al. |
| 2007/0124416 A1 | 5/2007 | Casey et al. |
| 2007/0124781 A1 | 5/2007 | Casey et al. |
| 2007/0130010 A1 | 6/2007 | Pokonosky |
| 2007/0136743 A1 | 6/2007 | Hasek et al. |
| 2007/0157234 A1 | 7/2007 | Walker |
| 2007/0157260 A1 | 7/2007 | Walker |
| 2007/0162958 A1 | 7/2007 | Kao et al. |
| 2007/0166687 A1 | 7/2007 | Bell et al. |
| 2007/0168429 A1 | 7/2007 | Apfel et al. |
| 2007/0186103 A1 | 8/2007 | Randle et al. |
| 2007/0204292 A1 | 8/2007 | Riedl et al. |
| 2007/0204314 A1 | 8/2007 | Hasek et al. |
| 2007/0217436 A1 | 9/2007 | Markley et al. |
| 2007/0219860 A1 | 9/2007 | Karls et al. |
| 2007/0220158 A1 | 9/2007 | Tolgu et al. |
| 2007/0255755 A1* | 11/2007 | Zhang ..................... G06F 16/78 |
| 2007/0260604 A1 | 11/2007 | Haeuser et al. |
| 2007/0271388 A1 | 11/2007 | Bowra et al. |
| 2007/0276801 A1 | 11/2007 | Lawrence et al. |
| 2007/0276925 A1 | 11/2007 | La et al. |
| 2007/0276928 A1 | 11/2007 | Rhoads et al. |
| 2008/0009268 A1 | 1/2008 | Ramer et al. |
| 2008/0019661 A1* | 1/2008 | Obrador ................. H04N 5/144 386/210 |
| 2008/0086750 A1 | 4/2008 | Yasrebi et al. |
| 2008/0147497 A1 | 6/2008 | Tischer |
| 2008/0155588 A1 | 6/2008 | Roberts et al. |
| 2008/0162623 A1 | 7/2008 | Flynn et al. |
| 2008/0178225 A1 | 7/2008 | Jost |
| 2008/0184122 A1 | 7/2008 | Grant et al. |
| 2008/0188964 A1* | 8/2008 | Bech ....................... G06F 16/68 700/94 |
| 2008/0192770 A1 | 8/2008 | Burrows et al. |
| 2008/0195468 A1 | 8/2008 | Malik |
| 2008/0235722 A1 | 9/2008 | Baugher et al. |
| 2008/0250447 A1 | 10/2008 | Rowe et al. |
| 2008/0281697 A1 | 11/2008 | Whitehead |
| 2008/0289009 A1 | 11/2008 | Lee et al. |
| 2008/0306814 A1 | 12/2008 | Hudson |
| 2008/0307454 A1 | 12/2008 | Ahanger et al. |

(56) References Cited

U.S. PATENT DOCUMENTS

| | | |
|---|---|---|
| 2009/0019134 A1 | 1/2009 | Bellifemine et al. |
| 2009/0022472 A1* | 1/2009 | Bronstein ............ G11B 27/329 386/278 |
| 2009/0031384 A1 | 1/2009 | Brooks et al. |
| 2009/0034521 A1 | 2/2009 | Kato |
| 2009/0064219 A1 | 3/2009 | Minor |
| 2009/0083279 A1 | 3/2009 | Hasek |
| 2009/0100459 A1 | 4/2009 | Riedl et al. |
| 2009/0119169 A1 | 5/2009 | Chandratillake et al. |
| 2009/0125951 A1 | 5/2009 | Agricola et al. |
| 2009/0165045 A1 | 6/2009 | Stallings et al. |
| 2009/0171784 A1 | 7/2009 | Morgan et al. |
| 2009/0187944 A1 | 7/2009 | White et al. |
| 2009/0193485 A1 | 7/2009 | Rieger et al. |
| 2009/0198794 A1 | 8/2009 | Beals |
| 2009/0216761 A1 | 8/2009 | Raichelgauz et al. |
| 2009/0222853 A1 | 9/2009 | White et al. |
| 2009/0244291 A1* | 10/2009 | Saptharishi ............. G06K 9/52 348/187 |
| 2009/0260030 A1 | 10/2009 | Karlsson et al. |
| 2009/0299853 A1 | 12/2009 | Jones et al. |
| 2009/0310668 A1 | 12/2009 | Sackstein et al. |
| 2009/0313654 A1 | 12/2009 | Paila et al. |
| 2009/0320059 A1 | 12/2009 | Bolyukh |
| 2009/0327346 A1 | 12/2009 | Teinila et al. |
| 2009/0328113 A1 | 12/2009 | Van De Klashorst |
| 2010/0023963 A1 | 1/2010 | Crookes et al. |
| 2010/0070510 A1 | 3/2010 | Agarwal et al. |
| 2010/0082440 A1 | 4/2010 | Vaidyanathan et al. |
| 2010/0083303 A1 | 4/2010 | Redei et al. |
| 2010/0104015 A1 | 4/2010 | Chatterjee et al. |
| 2010/0122285 A1 | 5/2010 | Begeja et al. |
| 2010/0153544 A1 | 6/2010 | Krassner et al. |
| 2010/0153831 A1 | 6/2010 | Beaton |
| 2010/0269128 A1 | 10/2010 | Gordon |
| 2010/0269132 A1 | 10/2010 | Foti |
| 2010/0293165 A1 | 11/2010 | Eldering et al. |
| 2010/0293221 A1 | 11/2010 | Sidman et al. |
| 2010/0333132 A1 | 12/2010 | Robertson et al. |
| 2011/0106784 A1 | 5/2011 | Terheggen et al. |
| 2011/0128961 A1 | 6/2011 | Brooks et al. |
| 2011/0202270 A1 | 8/2011 | Sharma et al. |
| 2011/0211809 A1* | 9/2011 | Sikora ................ G06K 9/00711 386/239 |
| 2011/0264530 A1 | 10/2011 | Santangelo et al. |
| 2011/0265116 A1 | 10/2011 | Stern et al. |
| 2012/0011567 A1 | 1/2012 | Cronk et al. |
| 2012/0128241 A1* | 5/2012 | Jung .................. H04N 21/4722 382/165 |
| 2012/0143660 A1 | 6/2012 | Jiwang et al. |
| 2012/0310762 A1 | 12/2012 | Robbin et al. |
| 2012/0324552 A1 | 12/2012 | Padala et al. |
| 2013/0007799 A1 | 1/2013 | Sandoval |
| 2013/0166765 A1 | 6/2013 | Kaufman et al. |
| 2013/0272575 A1* | 10/2013 | Li ....................... G06K 9/4671 382/103 |
| 2013/0275557 A1 | 10/2013 | Myers et al. |
| 2014/0052696 A1* | 2/2014 | Soroushian .......... H04N 21/482 707/691 |
| 2014/0075466 A1 | 3/2014 | Zhao |
| 2014/0129351 A1 | 5/2014 | Ringdahl |
| 2014/0129352 A1 | 5/2014 | Ringdahl |
| 2014/0150014 A1 | 5/2014 | Aitken et al. |
| 2014/0150019 A1 | 5/2014 | Ma et al. |
| 2014/0282695 A1 | 9/2014 | Bakar et al. |
| 2014/0358678 A1 | 12/2014 | Raab et al. |
| 2015/0019982 A1 | 1/2015 | Petitt, Jr. et al. |
| 2015/0020126 A1 | 1/2015 | Kegel et al. |
| 2015/0032533 A1 | 1/2015 | Raab et al. |
| 2015/0032550 A1 | 1/2015 | Shah et al. |
| 2015/0046938 A1* | 2/2015 | Qian .................. H04N 21/2353 725/25 |
| 2015/0094098 A1 | 4/2015 | Stern et al. |
| 2015/0304698 A1 | 10/2015 | Redol |
| 2015/0382034 A1 | 12/2015 | Thangaraj et al. |
| 2016/0055606 A1 | 2/2016 | Petrovic et al. |
| 2016/0094893 A1 | 3/2016 | Tse |
| 2016/0127260 A1 | 5/2016 | Gordon |
| 2016/0127440 A1 | 5/2016 | Gordon |
| 2016/0135230 A1 | 5/2016 | Swierczynski et al. |
| 2016/0182973 A1 | 6/2016 | Winograd et al. |
| 2016/0226922 A1 | 8/2016 | Russell et al. |
| 2017/0006317 A1 | 1/2017 | LaJoie et al. |
| 2017/0039444 A1* | 2/2017 | Li ........................ G06K 9/4604 |
| 2017/0070789 A1 | 3/2017 | Liassides et al. |
| 2017/0339417 A1* | 11/2017 | Puri ..................... G06K 9/4652 |
| 2018/0035174 A1 | 2/2018 | Littlejohn |
| 2018/0144194 A1* | 5/2018 | Park ................... H04N 21/4394 |
| 2019/0007724 A1 | 1/2019 | Tidwell et al. |
| 2019/0095715 A1* | 3/2019 | Nunes ................. G06K 9/6284 |
| 2019/0251602 A1 | 8/2019 | Corm |
| 2019/0268392 A1 | 8/2019 | Santangelo et al. |
| 2019/0289263 A1* | 9/2019 | Amini ................. H04L 41/0813 |
| 2019/0356956 A1* | 11/2019 | Sheng ................ G06Q 30/0271 |
| 2019/0394530 A1 | 12/2019 | Kimble et al. |
| 2020/0043056 A1 | 2/2020 | Marsh |
| 2020/0059693 A1 | 2/2020 | Neumeier et al. |
| 2020/0279027 A1 | 9/2020 | Gould |
| 2020/0329260 A1 | 10/2020 | Mathur |

FOREIGN PATENT DOCUMENTS

| | | |
|---|---|---|
| CA | 2762974 C | 6/2019 |
| EP | 1134951 A2 | 9/2001 |
| EP | 1691523 A1 | 8/2006 |
| WO | WO-9935846 A1 | 7/1999 |
| WO | WO-2007139889 A2 | 12/2007 |
| WO | WO-2010114857 A1 | 10/2010 |

OTHER PUBLICATIONS

Viola and Jones, "Rapid Object Detection using a Boosted Cascade of Simple Features," IEEE, 8 pages, 2001. (Year: 2001).*

Bodzinga et al., "Enhancing the IPTV Service Architecture to Enable Service Innovation", International Engineering Consortium, May 1, 2006.

Congdon et al., "IEEE 802.1 X Remote Authentication Dial In User Service (RADIUS) Usage Guidelines", RFC 3580, 2003.

David, P.A., "The Beginnings and Prospective Ending of 'End-to-End': An Evolutionary Perspective On the Internet's Architecture," Stanford Institute for Economic Policy Research, Aug. 2001, 34 pages.

Ford, B., "Unmanaged Internet Protocol: Scalable Application-Friendly Internet Routing," Jul. 24, 2003, 6 pages.

Ford, B., "Unmanaged Internet Protocol: Taming the Edge Network Management Crisis," ACM Sigcomm Computer Communications Review, vol. 34 (1), Jan. 2004, pp. 93-98.

McDevitt et al., "Switched vs Broadcast Video for Fiber-To-The Home Systems", 1990.

Merriam Webster, "Apparatus", 2015.

Merriam Webster, "subscribe", 2015.

Microsoft Computer Dictionary, "Device", Fifth edition, 2002, 648 pages.

Sadok D.H., et al., "Trends in Network and Device Composition," Topics in Internet Technology, IEEE Communications Magazine, Oct. 2006, pp. 112-118.

What is Packet Switching on Computer Networks, about.com, Internet Archive Capture date of Feb. 12, 2009 from URL http://compnetworking.about.com/od/networkprotcols/f/packet-switch.htm.

Wikipedia, "broadcast switched", 2015.

Wikipedia, "Client (computing)", 2020, 2 pages.

Wikipedia, "Content delivery network", 2015.

Wikipedia, "Hybrid fibre-coaxial", 2015.

Wikipedia, "Packet switching", 2015.

* cited by examiner

110

```
{
    "ID":4,
    "TEXT": "YOU CAN ENJOY OUR HOT TUB COCKTAILS AND R FLORIDA.",
    "CONFIDENCE":0.9069,
    "LANGUAGE": "EN-US",
    "INSTANCES": [
     {
         "START": "0:00:16.74",
         "END": "0:00:19.82",
     }
    ]
}
```

120

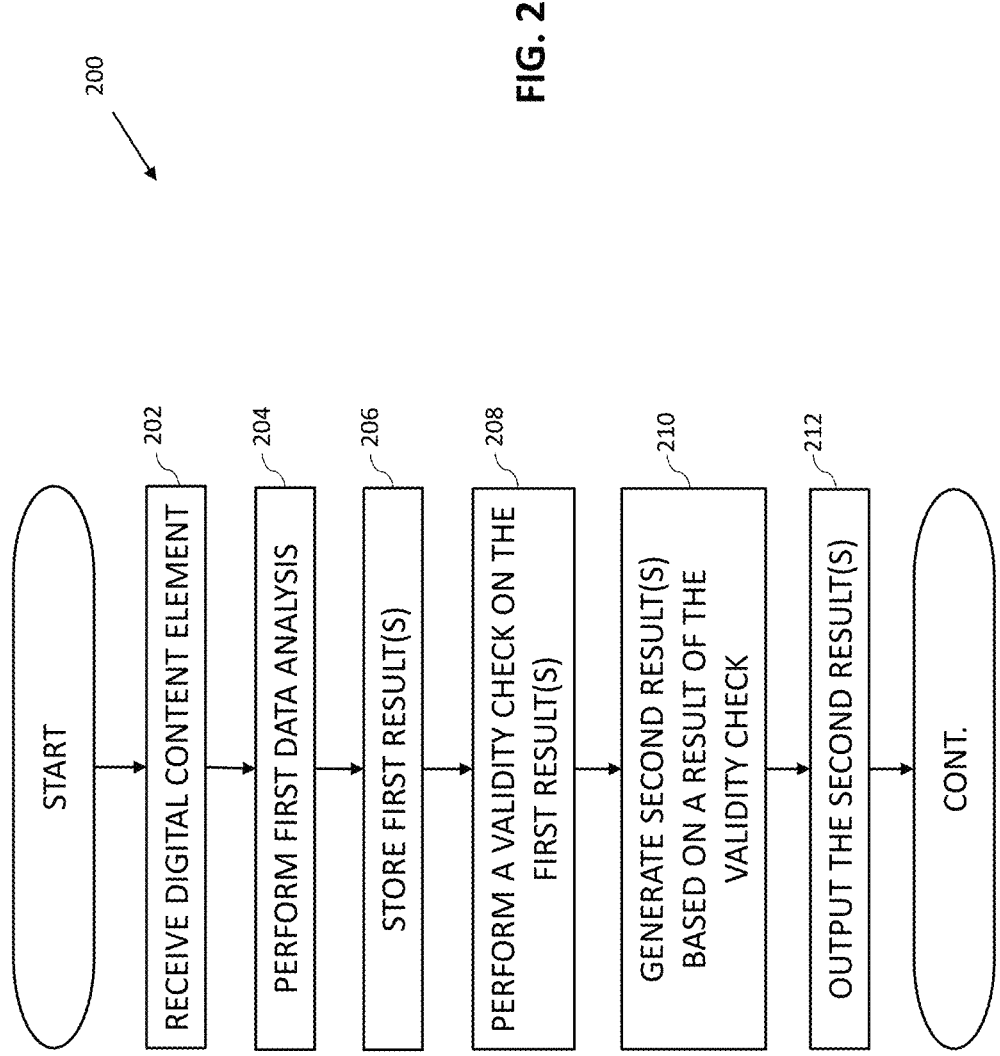

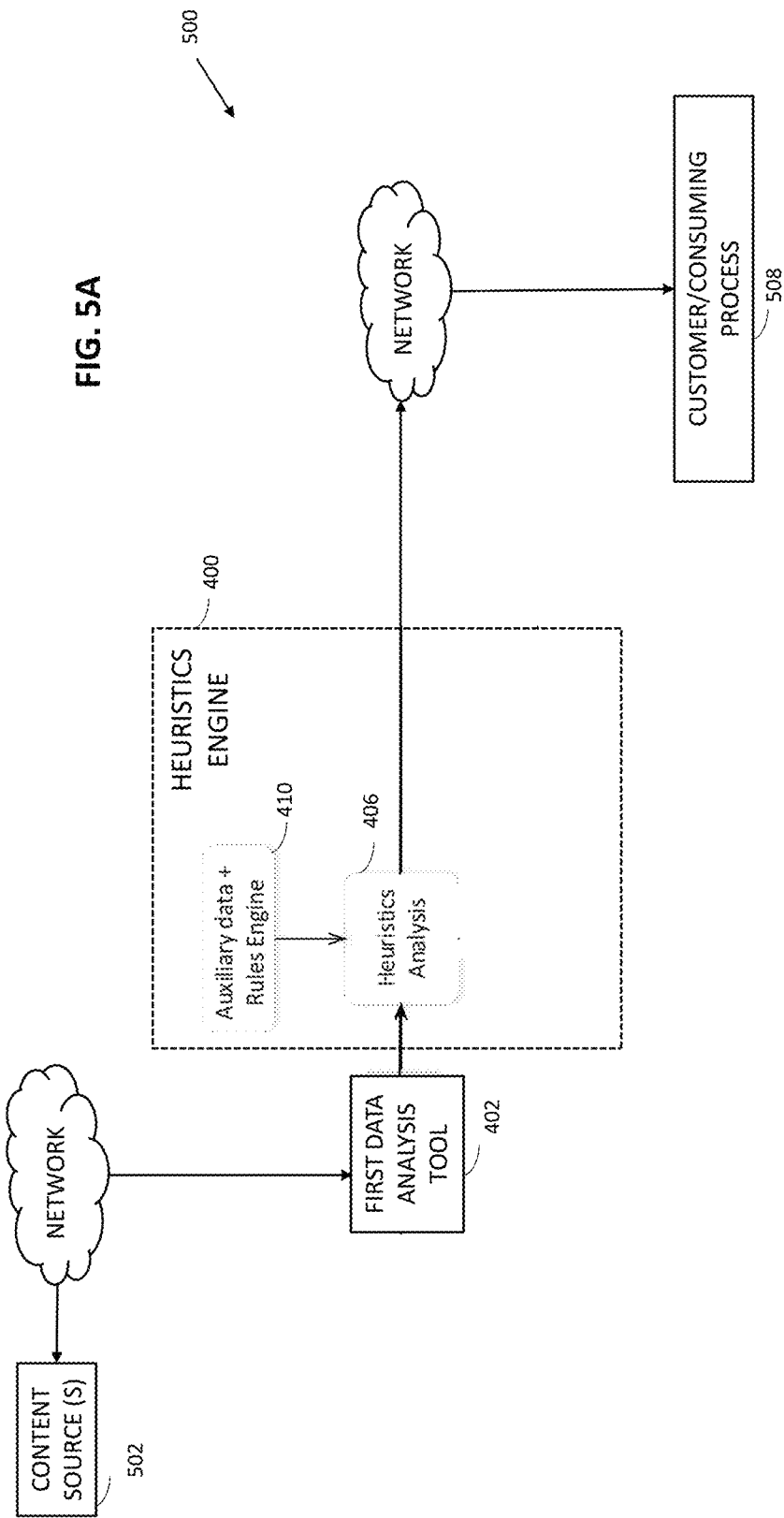

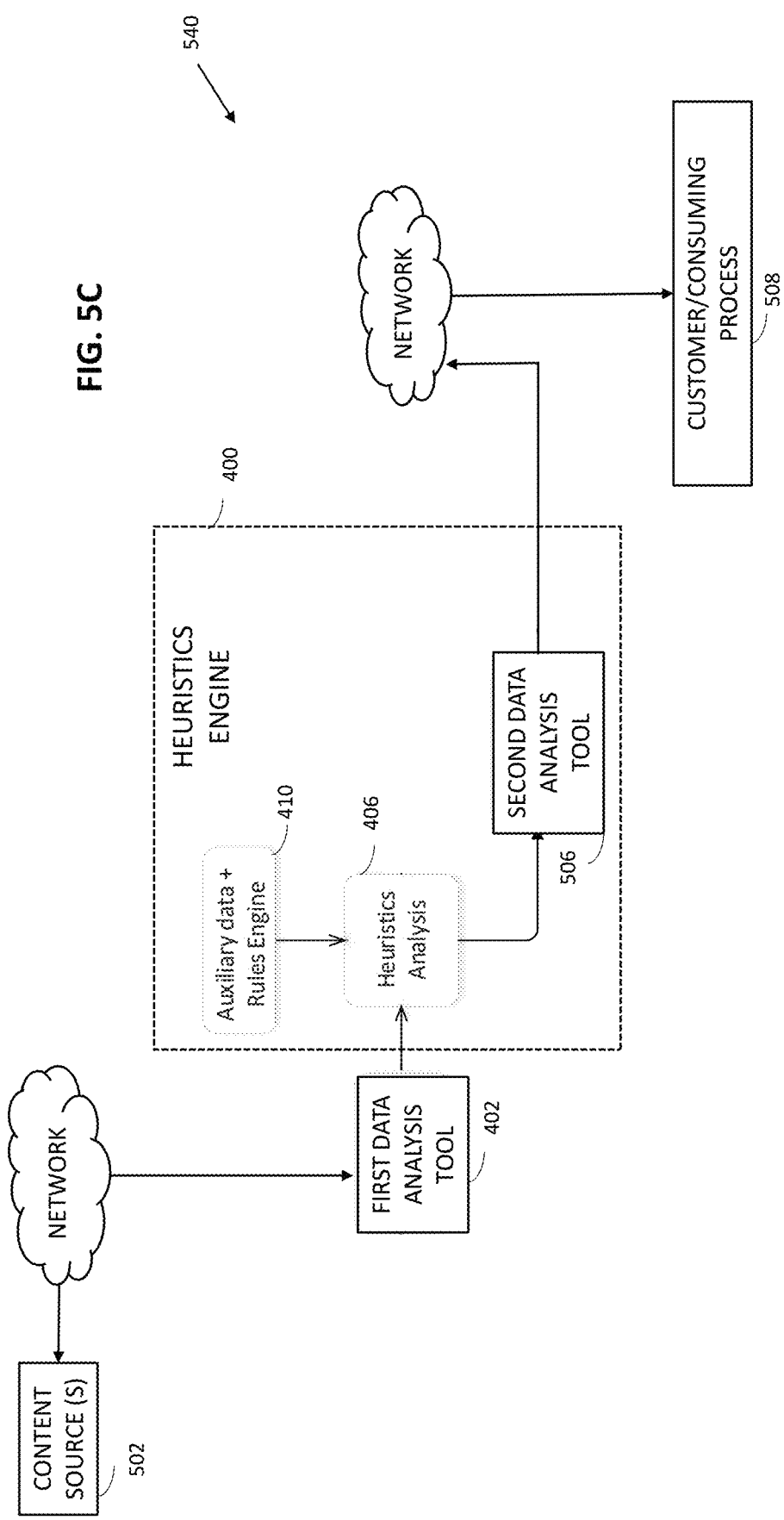

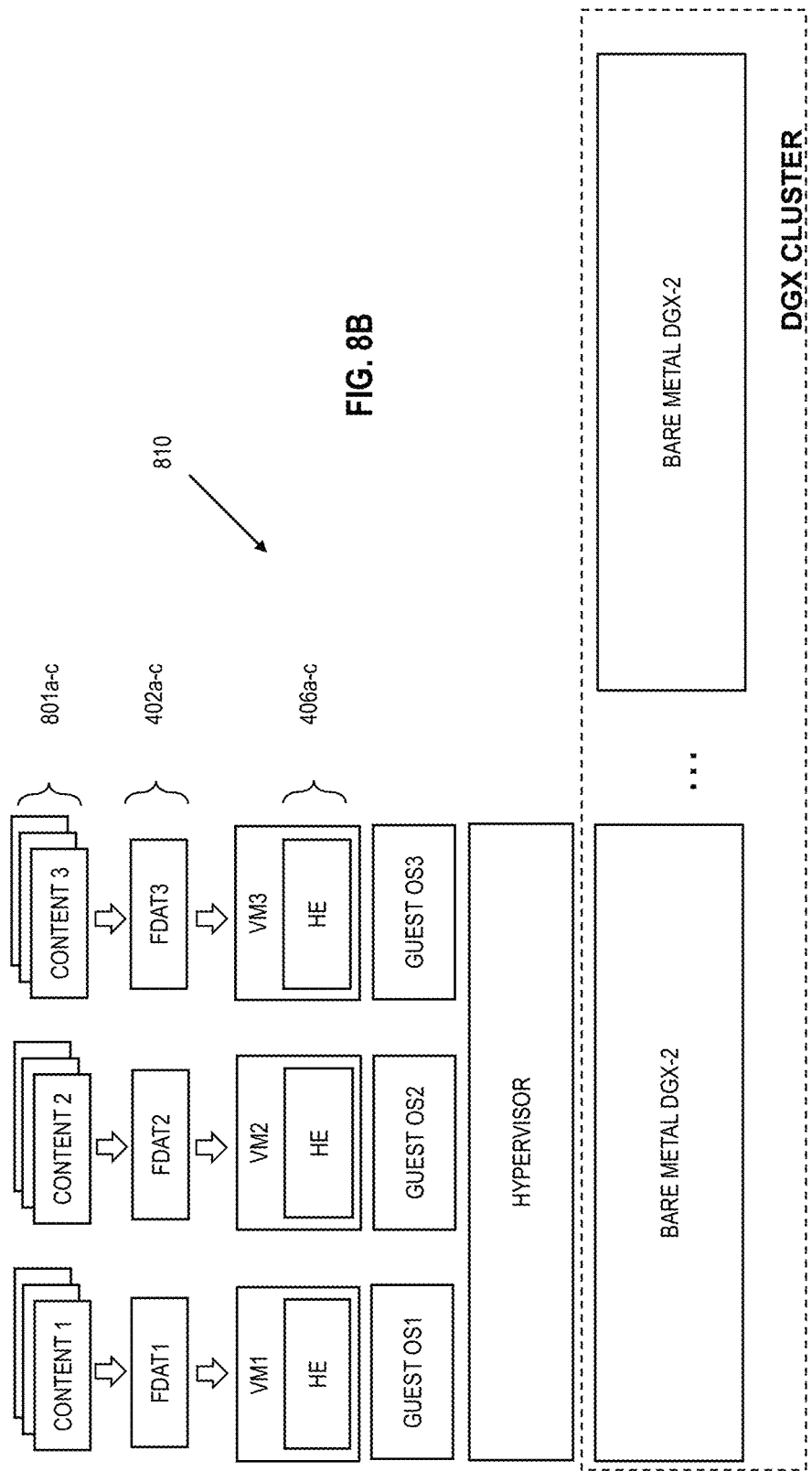

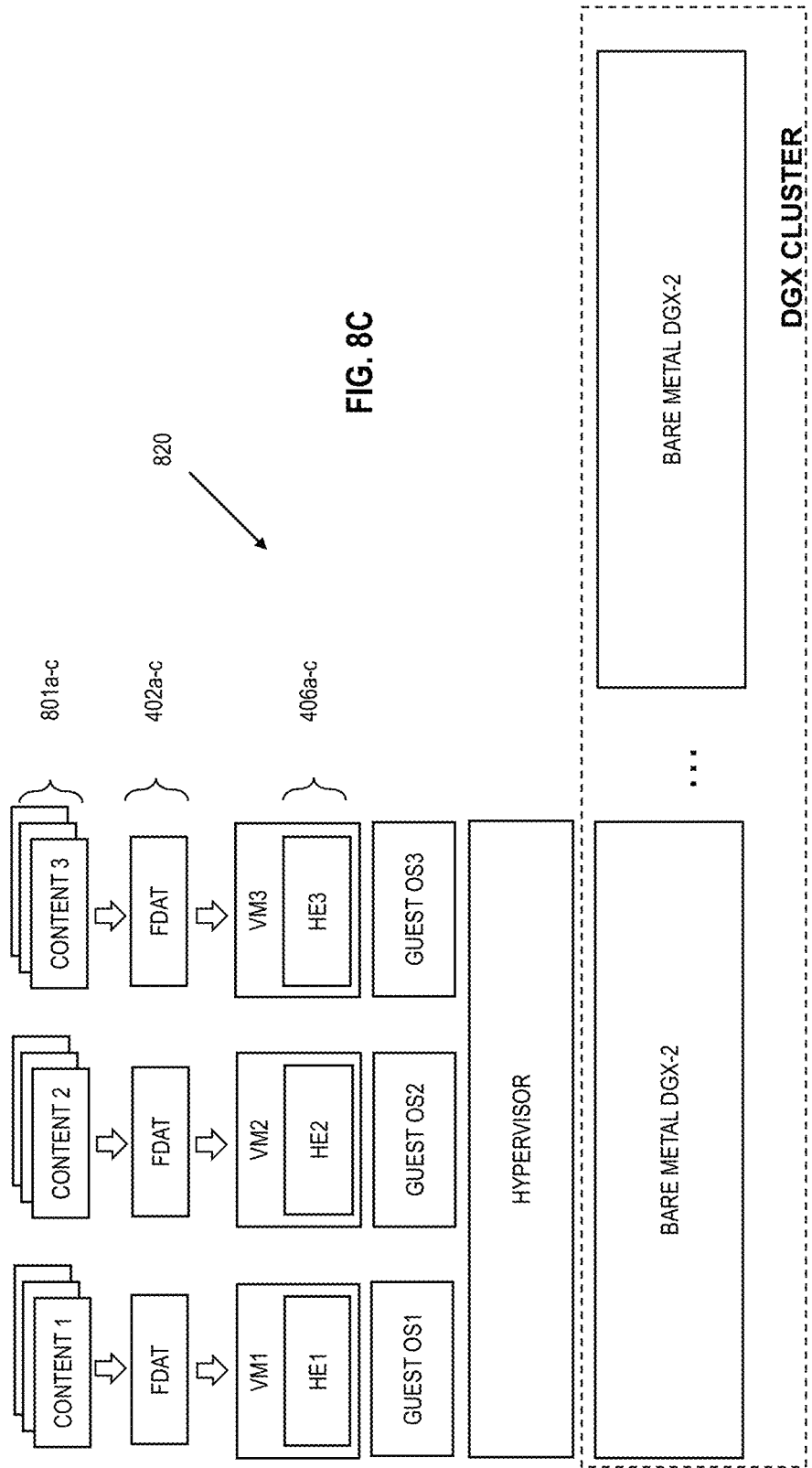

METHODS AND APPARATUS FOR CHARACTERIZATION OF DIGITAL CONTENT

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of data analysis and characterization of digital content, and specifically in one exemplary aspect, methods and apparatus for characterization of digital content elements as serviced by an MVPD (multichannel video programming distributor).

2. Description of Related Technology

In managed content distribution networks (e.g., cable television HFCu or satellite networks), digital content, including advertisements that are usually interspersed within the digital content, are provided to subscribers and other content consumers on a daily basis. With an increasing prevalence of various video subscription services (e.g., via streaming or video on-demand or "OTT" (over-the-top) delivery), the content providers and the content distribution network operators are continuously trying to improve the user experience with respect to the digital content that is delivered to such subscribers and other content consumers.

Advertisements or other "secondary content" (including, without limitation, promotions or "info-mercials", commercials, telescoping information/advertisements, and short segments) that are ultimately viewed by subscribers or other content consumers in the foregoing networks may be controlled in several ways. In one such approach, the advertisements and other secondary content are analyzed via use of various types of techniques involving computer-based processes such as, artificial intelligence ("AI") and machine learning ("ML").

Especially with a continuously increasing amount of information that are exchanged over various types of networks, use of AI and ML for data analysis has become increasingly ubiquitous within modern data networks and content distribution networks. Such data analysis provides a network operator or a content provider/distributor a great deal of information that may be utilized for many different purposes.

For example, one way in which such data analysis is useful may be found in image and video analysis. In an exemplary use case, the analysis includes face recognition, and the information gathered from a face recognition technique may be useful e.g., in sports and surveillance. An exemplary ML application for facial recognition involves creating a "bounding box" around a face and tracking it through a video clip. However, this is not directly applicable to e.g., an MVPD (multichannel video programming distributor) market. The latter often requires more comprehensive analyses of multiple aspects or digital data streams (e.g., video, audio and textual metadata).

In the MVPD market, data obtained by analysis of digital content may be useful in many different ways. One exemplary use is found with respect to advertisements and other secondary content.

As a brief aside, advertisements and other secondary content serve as a major source of revenue for the content providers and the network operators. Because of their revenue implications and because of the great exposure of such content to the subscribers and other content consumers, it is essential that these content elements are relevant and appropriate for the recipient users/audience. When the content is not relevant or appropriate e.g., due to lack of contextual relevancy, or because of lack of sensitivity or even illegality in some circumstances, such content may create a multitude of problems for the content providers and the network operators, including loss of viewership, potential retaliation via legal action, etc.

In a common usage of an exemplary data analysis tool, ML video analysis products perform multi-pass analyses (e.g., each pass to identify faces, common objects, celebrities, etc.). The results are generally presented as content descriptor metadata ("labels"), along with a set of metadata denoting "confidence levels" as indicators of the detection accuracy. To attempt to improve the detection accuracy, such tools tend to use increasingly sophisticated algorithms (e.g., Convoluted Neural Networks with Gradient Boost).

However, it has been observed by the inventors hereof that the foregoing "algorithmic" approach alone cannot produce optimal results within a reasonable time. Specifically, searching each video frame for a multitude of categories which may indicate problems with respect to various metrics or aspects of relevancy or appropriateness (e.g., alcohol, gambling, drugs, violence, trademarks, copyrighted content, explicit content, political content etc.), can be very time-consuming, even with advanced computing devices. It may also result in data that is gratuitous (e.g., searching for all manners of firearms or medications may be unnecessary and thus a waste of resources, e.g., in the case of a beer advertisement).

More specifically, current data analysis tools may utilize excessive amount of resources (e.g., time and processing overhead) required for the algorithmic data analysis in the aforementioned context. Moreover, classifying advertisements in a large repository manually (e.g., containing 50,000 to 100,000 ad video clips ("ad-creatives")) may be a formidable challenge. An example of ad-creatives is TV commercials (e.g., 30-second video clips with file extension formats such as .ts, .mp4, or .mpg). For instance, consider the exemplary use case of a COTS (commercial off-the-shelf) data analysis product for processing data contained within a video; a typical 30-second advertisement can take 2-3 minutes for completion of a multi-pass analysis. This is problematic because, inter alia, in the context of a commercial carrier in the MVPD market, spending 2-3 minutes to analyze a 30-second advertisement would make the delivery of such content to a consumer highly inefficient and even impractical, due to e.g., the sheer volume of advertisements that would be needed to be processed within a given time window for a number of different program streams.

Another issue with extant data analysis tools is the potential risk of incorrect results, especially when applied in the context of carrier-grade video applications. For example, results from data analysis of a video content or an advertisement may be tainted with (i) false positives (for instance, an ostensible "hit" on an offensive or inappropriate content element where none exists) or (ii) inadequate identification of data contained within such content (i.e., such offensive or inappropriate content element exists within the asset being analyzed, but it is undetected). These are significant problems because a "false positive" can result for instance in content not reaching the right consumers (e.g., a false positive result triggering an alleged presence of violence in a children's movie may preclude the movie from reaching its intended audience), while an inadequate identification of data can result in making the content irrelevant or inappropriate (e.g., lack of identification of elements that otherwise would be restricted based on age may allow content with such elements reaching unintended audiences).

FIG. 1 shows a typical prior art approach for asset (e.g., advertisement) processing. At step 102, the target asset or digital content is first obtained from a source (e.g., third party content source). At steps 104-105, the obtained digital content is analyzed for one or more characteristics as described above (e.g., a multi-pass algorithmic analysis). Finally, at step 106, the result(s) of the analysis from step 104 is/are generated as an output.

FIG. 1A illustrates an exemplary COTS product of the type referenced above, as used for data analysis of the type shown in FIG. 1. As an output of e.g., image analysis performed on this platform, labels are generated relating to particular aspects (e.g., "cocktails"), reflected in the asset 110 being analyzed in FIG. 1A. The asset 110 of FIG. 1A does not include the particular phrase ("cocktail"). However, in this example, a JavaScript Object Notation (JSON) file that is created based on the analysis of an audio file associated with the foregoing image analysis, as can be seen in FIG. 1B, includes "cocktail" 120 as a label, based on the video file including an image of cocktails. This is an example of an inadequate identification of data contained within digital content assets based on prior art treatment of metadata of each stream (e.g., video, audio, and text data) separately. Stated differently, there is no analytical context "connection" or association between the (e.g., iteratively) generated analytical outputs of the prior art multi-pass approach.

In another example, another COTS product is used for advertisement asset data analysis. In an exemplary use scenario with the same files as used in the foregoing scenario described with respect to FIGS. 1A and 1B, while the result has identified a phrase triggering a health advisory notification ("Alcohol") 130 as can be seen in FIG. 1C, it has also identified a false positive by falsely identifying "Fireworks" 132 in an image containing a palm tree (i.e., a false visual correlation).

Moreover, target words or elements indicative of context may not be present in an asset explicitly (e.g., many beer advertisements do not use the term "beer" in the audio stream or the video stream, but rather use only brand names).

Based on the foregoing, it is apparent that the current COTS products used for data analysis are prone to various types of inaccurate results (e.g., inadequate and false-positive identifications).

Accordingly, there is a need for improved methods and apparatus for characterization of digital content such as e.g., advertising assets. Ideally, these improved methods and apparatus would, inter alia, increase the accuracy of the results of data analysis e.g., in the foregoing advertising context, and reduce the amount of resources (e.g., time and processing overhead, as required for multiple passes of analyses) required to produce such results, thereby enabling broad utilization within even time-critical applications.

SUMMARY OF THE INVENTION

The present disclosure addresses the foregoing needs by providing, inter alia, methods and apparatus for characterization of digital content.

In a first aspect of the disclosure, a method for characterizing a digital video content asset is disclosed. In one embodiment, the method includes decoding the digital video content asset; utilizing a first algorithm to perform a first-pass analysis of image data of the decoded digital video content asset to identify a first attribute or element; utilizing a second algorithm to perform a confirmatory analysis of the identified first attribute or element, the confirmatory analysis based on a plurality of data sources other than the image data; and based on a result of the confirmatory analysis, assigning at least one rating or confidence metric to the digital video content asset. In another embodiment, the characterization is performed by a first data analysis tool and a Heuristic Engine, and the method includes: identifying first data relating to characteristics of the digital content; performing a validity check on the first data relating to the characteristics; modifying the first data relating to the characteristics based at least on the validity check; and generating second data relating to the characteristics based on the modified first data.

In one variant, the identifying the first data includes identifying data relating to accuracy of the first data.

In another variant, the performing the validity check includes evaluating whether the data relating to the accuracy of the first data is within a threshold level, the threshold level based on one or more policies.

In yet another variant, the modifying the first data includes modifying the first data if the data relating to the accuracy of the first data is within a threshold level, the threshold level based on one or more policies.

In still another variant, the modifying the first data includes adjusting the data relating to the accuracy by a factor, the factor based on one or more policies.

In a further variant, the adjusting the data relating to the accuracy by the factor includes multiplying the data relating to the accuracy by the factor if the first data includes data relating to an auxiliary signature, the auxiliary signature including data defined by an operator of the managed content distribution network.

In yet another variant, the performing the validity check includes comparing each entry of a database with the first data, the database storing data relating to one or more keywords based on one or more policies.

In another variant, the method further includes identifying second data relating to the characteristics of the digital content based on the modified first data.

In another aspect of the disclosure, a computerized apparatus for characterizing digital content is disclosed. In one embodiment, the computerized apparatus includes: processor apparatus; network interface apparatus in data communication with a computerized data analysis entity; and storage apparatus in data communication with the processor apparatus. In one variant, the storage apparatus includes at least one computer program configured to, when executed on the processor apparatus: receive data relating to a result of a first data analysis performed by the computerized data analysis entity; perform a validity check on the data relating to the first result of the first data analysis; modify the data relating to the first result of the first data analysis based on the validity check; perform a second data analysis based on the modified data; and generate data relating to a result of the second data analysis.

In one implementation, the computerized data analysis entity includes a topologically remote data analysis apparatus accessible via the network interface apparatus.

In another implementation, the storage apparatus includes a database for storing (i) the data relating to the result of the first data analysis; (ii) one or more keywords useful for the modification of the data relating to the first result of the first data analysis; and/or one or more signatures, the signatures useful for the modification of the data relating to the first result of the first data analysis and defined by a user of the digital content.

In another implementation, the computerized apparatus is configured to perform the second data analysis via another computerized data analysis entity or process.

In one variant the computerized apparatus is a network server device disposed within an MSO infrastructure.

In another variant, the computerized apparatus is a processing device disposed at an edge node of a content distribution network.

In yet another variant, the computerized apparatus is a third-party Internet server apparatus.

In still a further variant, the computerized apparatus is a client device (e.g., premises device or mobile device) configured for use within a user or subscriber premises.

In still another variant, the computerized apparatus is a distributed virtualized platform (e.g., a VM operative to execute on a Linux kernel of a network-based computing resource).

In another aspect, a method for reducing the temporal latency of secondary content (e.g., advertisement) analysis is disclosed.

In another aspect of disclosure, computer readable apparatus is disclosed. In one embodiment, the apparatus includes a storage medium configured to store one or more computer program. In embodiment, the apparatus includes a program memory or HDD or SDD on a computerized server device, such as an MSO server.

In another aspect, a software architecture for data analysis is disclosed.

In a further aspect, a network architecture comprising a device for heuristic data analysis is disclosed.

In another aspect, apparatus for ingesting and processing digital content such as advertising assets is disclosed.

In a further aspect, a method for identifying inappropriate or irrelevant content is disclosed.

In another aspect, a method for mitigating false positives in analysis of digital content is disclosed.

In another aspect, a method for mitigating false negatives in analysis of digital content is disclosed.

In another aspect, a database of keywords useful with a heuristics engine is disclosed.

In yet a further aspect, a method for developing keywords for use with an algorithmic data analysis tool is disclosed.

In another aspect, a method for classifying keywords for use with an algorithmic data analysis tool is disclosed.

In a further aspect, a method for enhancing or enriching a result of a data analysis is disclosed.

In still a further aspect, a method for classifying a result of a data analysis based on detection accuracy is disclosed.

In a further aspect, a method for classifying a result of a data analysis based on one or more policies is disclosed.

Additionally, a method for classifying a result of a data analysis based on how the result is to be used is disclosed.

In still another aspect, a method for utilizing enhanced or enriched data is disclosed.

These and other aspects shall become apparent when considered in light of the disclosure provided herein.

BRIEF DESCRIPTION OF THE DRAWINGS

FIG. 2 is a logical flow diagram of an exemplary embodiment of a generalized method for analytical characterization of digital content, according to the present disclosure.

FIG. 5A is a functional block diagram representing one embodiment of a content distribution network architecture, useful with various aspects of the present disclosure.

FIG. 5C is a functional block diagram representing a third embodiment of a content distribution network architecture, useful with various aspects of the present disclosure.

FIG. 8B is a block diagram illustrating a second HE-enabled software stack configuration of an accelerated GPU-based processing system with heterogeneous FDAT/homogeneous HE configuration, according to the present disclosure.

FIG. 8C is a block diagram illustrating a third HE-enabled software stack configuration of an accelerated GPU-based processing system with homogeneous FDAT/heterogeneous HE configuration, according to the present disclosure.

Figure 1:
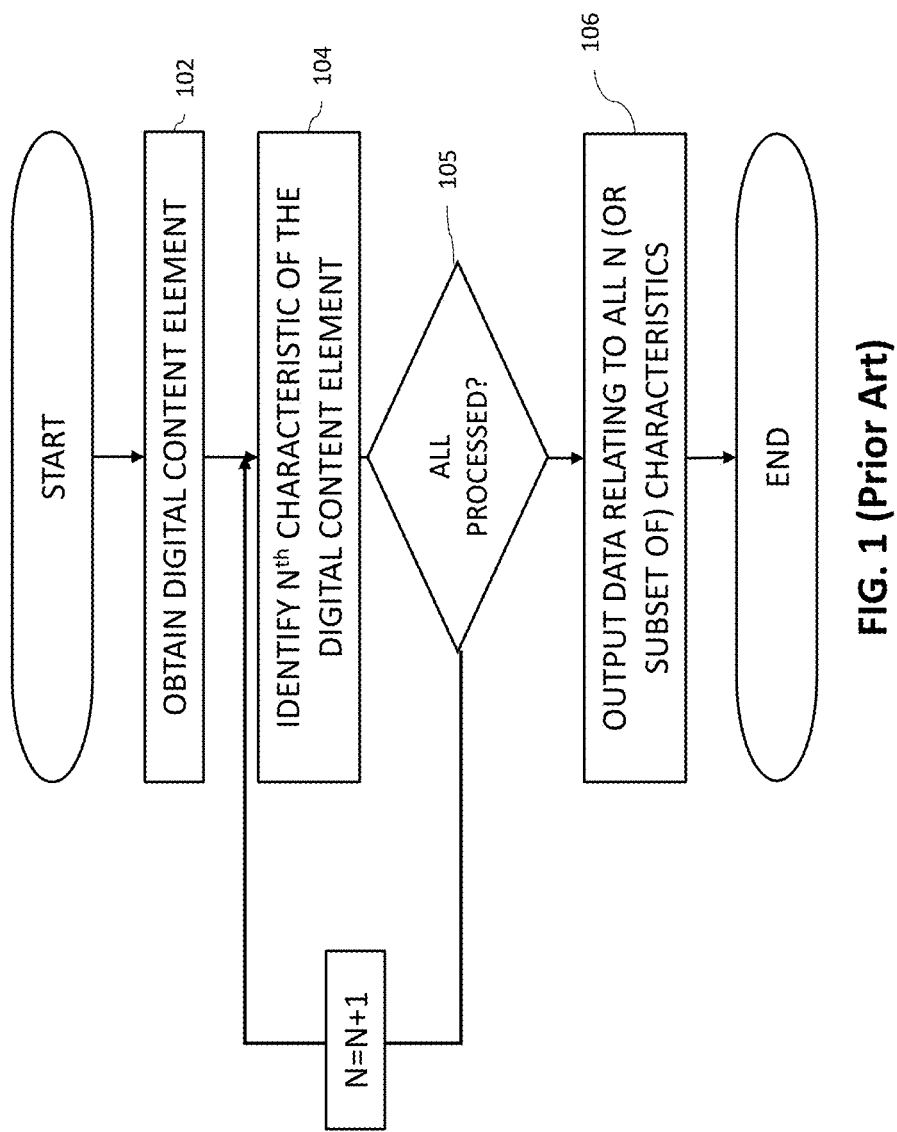
FIG. 1 is a logical flow diagram illustrating a typical prior art methodology for algorithmic characterization of digital content.

All Figures © Copyright 2018-2019 Charter Communications Operating, LLC. All rights reserved.

DETAILED DESCRIPTION OF THE INVENTION

Reference is now made to the drawings wherein like numerals refer to like parts throughout.

As used herein, the term "advertisement" (or "ad") and similar forms refer generally and without limitation to any audio, visual, or promotion, message or communication, whether for-profit or otherwise, that is perceptible by a human. Examples of advertisements include so-called "bumper" advertisements (advertisements inserted before or after a client-requested program), "pause" advertisements (presented when a client sends a pause control command to a video server or the like), or additional and replacement advertisements.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator, etc.), and one application may have more than one theme. The unit of executable software generally runs in a predetermined environment; for example, the unit could include a downloadable Java Xlet™ that runs within the JavaTV™ environment.

As used herein, the term "artificial intelligence" refers to, without limitation, techniques involving interpretation of external data and usage of such data to achieve specific goals and tasks.

As used herein, the term "browser" refers to any computer program, application or module which provides network access capability including, without limitation, Internet browsers adapted for accessing one or more websites or URLs over the Internet, as well as any "user agent" including those adapted for visual, aural, or tactile communications.

As used herein, the terms "client device" or "user device" or "UE (user equipment)" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "codec" refers to a video, audio, or other data coding and/or decoding algorithm, process or apparatus including, without limitation, those of the MPEG (e.g., MPEG-1, MPEG-2, MPEG-4/H.264, HEVC/H.265, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Ruby, Python, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "Customer Premises Equipment (CPE)" refers without limitation to any type of electronic equipment located within a customer's or subscriber's premises and connected to or in communication with a network.

As used herein, the term "display" means any type of device adapted to display information, including without limitation CRTs, LCDs, TFTs, plasma displays, LEDs (e.g., OLEDs), incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0, 3.0, 3.1 and 4.0.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the term "heuristic" refers without limitation to a technique, process or component configured for approximation-based solution of a problem, such as based on information discovery.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc., as well as receivers, hubs, proxy devices, or gateways used in association therewith.

As used herein, the term "machine learning" refers to, without limitation, algorithms and models used to perform a specific task without any explicit instructions, based on predictions or decisions made from sample data, including for instance deep learning and artificial neural networks.

As used herein, the term "memory" includes any type of integrated circuit or other storage device adapted for storing digital data including, without limitation, ROM, PROM, EEPROM, DRAM, SDRAM, DDR2/3/4/5/6 SDRAM, EDO/FPMS, RLDRAM, SRAM, "flash" memory (e.g., NAND/NOR), 3D memory, XPoint, spin-transfer/torque memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), GPUs, array processors, Tensor Cores, secure microprocessors, and application-specific integrated circuits (ASICs). Such digital processors may be contained on a single unitary IC die, or distributed across multiple components.

As used herein, the term "modem" refers to any kind of modulation or demodulation process or apparatus including without limitation cable (e.g., DOCSIS compliant) modems, DSL modems, analog modems, and so forth.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein, the term "QAM (quadrature amplitude modulation)" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "node" refers to any functional entity associated with a network, such as for example: CPE, edge device, server, gateway, router, Optical Line Terminal (OLT), Optical Network Unit (ONU), etc. whether physically discrete or distributed across multiple locations.

As used herein, the term "server" refers to any computerized component, system or entity regardless of form (including virtualized processes) which is adapted to provide data, files, applications, content, or other services to one or more other devices or entities on a computer network.

As used herein, the term "storage" refers to without limitation computer hard drives, DVR device, memory, SSD, RAID devices or arrays, optical media (e.g., CD-ROMs, Blu-Ray, etc.), or any other devices or media capable of storing content or other information, whether local, virtual, or cloud-based.

As used herein, the term "user interface" refers to, without limitation, any visual, graphical, tactile, audible, sensory, or other means of providing information to and/or receiving information from a user or other entity. A user interface may comprise, for example, a computer screen display, touch screen, speech recognition engine, text-to-speech (TTS) algorithm, and so forth.

As used herein, the term "Wi-Fi" refers to, without limitation and as applicable, any of the variants of IEEE Std. 802.11 or related standards including 802.11 a/b/g/n/s/v/ac/ax, 802.11-2012/2013 or 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE/Bluetooth Mesh Networking, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), CBRS (e.g., 3.55-3.70 GHz), 802.20, Zigbee®, Z-wave, NFC (near field communication), RFID, narrowband/FDMA, OFDM, PCS/DCS, LTE/LTE-A/LTE-U/LTE-LAA, 5G NR (including e.g., NR-U), analog cellular, CDPD, satellite systems, millimeter wave or microwave systems, acoustic, Li-Fi, and infrared (i.e., IrDA).

Overview

As noted above, characterization of digital content may be achieved via data analysis tools, including those that are currently available on the market. The results obtained from such characterization of digital content may be useful for different purposes, including for example ensuring that the digital content is relevant and appropriate for subscribers and content consumers in a content distribution network.

However, the content data analysis tools that are currently available suffer from issues including results that involve false positive and inadequate identifications, each of which may lead to problems including allowing irrelevant, inappropriate or even illegal content to reach the subscribers and other content consumers.

Accordingly, the present disclosure provides methods and apparatus to facilitate characterization of digital content, so as to, inter alia, reduce the risk of erroneous results, avoid or minimize loss of user experience, as well as catalog and characterize various types of data so as to enable subsequent use (e.g., algorithmic stitching together relevant portions of digital content to generate customized content, etc.).

In one embodiment described herein, a Heuristic Engine is utilized with a data analysis tool to, inter alia, enhance the accuracy of the results obtained from the data analysis tool. This functionality is accomplished by use of separate sets of data as compiled in databases in conjunction with a Rules Engine, which includes rules to be applied to the aforementioned results and the separate sets of data.

In one variant, the aforementioned separate sets of data are input by or based on data provided by a subscriber or content consumer in a content distribution network. The rules of the aforementioned Rules Engine may also be defined or modified by a subscriber or content consumer.

In another variant, the aforementioned separate sets of data are based on external data, including e.g., customer profile data (demographic, viewing history, etc.), user interests, and other data relating to digital content and/or its consumption. In one implementation, the data is compiled via the methods and apparatus of the present disclosure. In another implementation, the data is compiled by a separate (e.g., third party) entity.

In another embodiment, a first data analysis tool and the Heuristic Engine are used in conjunction with a second data analysis tool to enhance the accuracy of the characterization of digital content even further.

In various disclosed implementations, the analytical processes are disposed at different topological locations within the network, including for example an MSO headend, and edge node or edge cache, or even at the user/subscriber premises.

Through implementation of the various mechanisms described above, the exemplary methods and apparatus of the disclosure are advantageously able to significantly reduce secondary content characterization processing latency and overhead, including at ingestion processes or nodes within content distribution networks.

Detailed Description of Exemplary Embodiments

Exemplary embodiments of the methods and apparatus of the present disclosure are now described in detail. While these exemplary embodiments are described in the context of a managed network (e.g., hybrid fiber coax (HFC) cable or satellite) architecture having a multiple systems operator (MSO), digital networking capability, IP delivery capability, and a plurality of client devices, the general principles and advantages of the disclosure may be extended to other types of networks and architectures that are configured to deliver services such as digital media data (e.g., text, video, and/or audio), whether managed or unmanaged. Such other networks or architectures may be broadband, narrowband, wired or wireless, or otherwise.

It will be recognized that while certain aspects of the disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the embodiments disclosed and claimed herein.

It will also be appreciated that while described generally in the context of a network providing service to a customer or consumer (i.e., residential) end user domain, the present disclosure may be readily adapted to other types of environments including, e.g., commercial/enterprise, and government/military applications. Myriad other applications are possible.

Similarly, while certain aspects are described primarily in the general context of artificial intelligence or machine learning, it will be appreciated that the present disclosure may utilize other types of techniques and algorithms to implement the described functionality.

While certain aspects are also described primarily in the context of the well-known Internet Protocol (described in, inter alia, *Internet Protocol DARPA Internet Program Protocol Specification*, IETF RCF 791 (September 1981) and Deering, et al., *Internet Protocol, Version 6 (IPv6) Specification*, IETF RFC 2460 (December 1998) each of which is incorporated herein by reference in its entirety), it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Exemplary Methods—

Referring now to FIG. 2, one exemplary embodiment of a generalized method for analytical characterization of digital content according to the present disclosure is described.

As shown, per step 202, digital content is received. The digital content may originate from various types of sources, including a content server in a content distribution network, or a third-party content provider, or a web server, and may include for instance advertisements or other secondary content, primary content (e.g., movies), or yet other forms of content. Such content or web server may be associated with various types of content providers, including but not limited to those providing video streaming and video on-demand ("VOD") services (e.g., Netflix, YouTube, Hulu, Amazon Prime Video, Sony Crackle, Sling TV, HBO Now, etc.). Furthermore, such digital content may be in various types of formats (e.g., video/image, sound, audio, transcript, OCR or sentiment) and also encoded via various types of codecs (e.g., MPEG-1, MPEG-2, MPEG-4/H.264, HEVC/H.265, etc.) for such purposes as e.g., more efficient transmission and/or storage or encryption. It should be appreciated by persons of ordinary skill in the art that the digital content may be obtained as a direct or indirect result of a request from a user (e.g., subscriber or content consumer) for another digital content element (e.g., a movie, as part of streaming or VOD services) or the content element itself (e.g., an ad), or by being pushed or delivered to the user without any user intervention.

In one exemplary scenario, the digital content may be in the highest resolution format (e.g., mezzanine files); e.g., on the order of 90 MB for a 30-second advertisement. Although files of large sizes can be ingested via ML/AI type data analysis discussed herein, in some variants, a low resolution copy (e.g., about one-tenth of the original size) may be created/encoded specifically for ingest by the ML/AI type data analysis discussed herein. This approach may be used for example to alleviate any file transfer restrictions due to file size or other limitations due to management of large files. For instance, the digital content may be converted to multiple speeds, formats, and profiles to serve different devices/systems so as to not impede the regular or timely data flow in the context of the methods and apparatus of the present disclosure, and can be adjusted or correlated to the available processing capabilities used (e.g., where significant or undesirable latency is encountered using a prescribed processing regime, the size of the ingested digital content can be reduced so as to mitigate or eliminate the latency; i.e., avoid overtaxing the capabilities of the system).

Figure 2A:
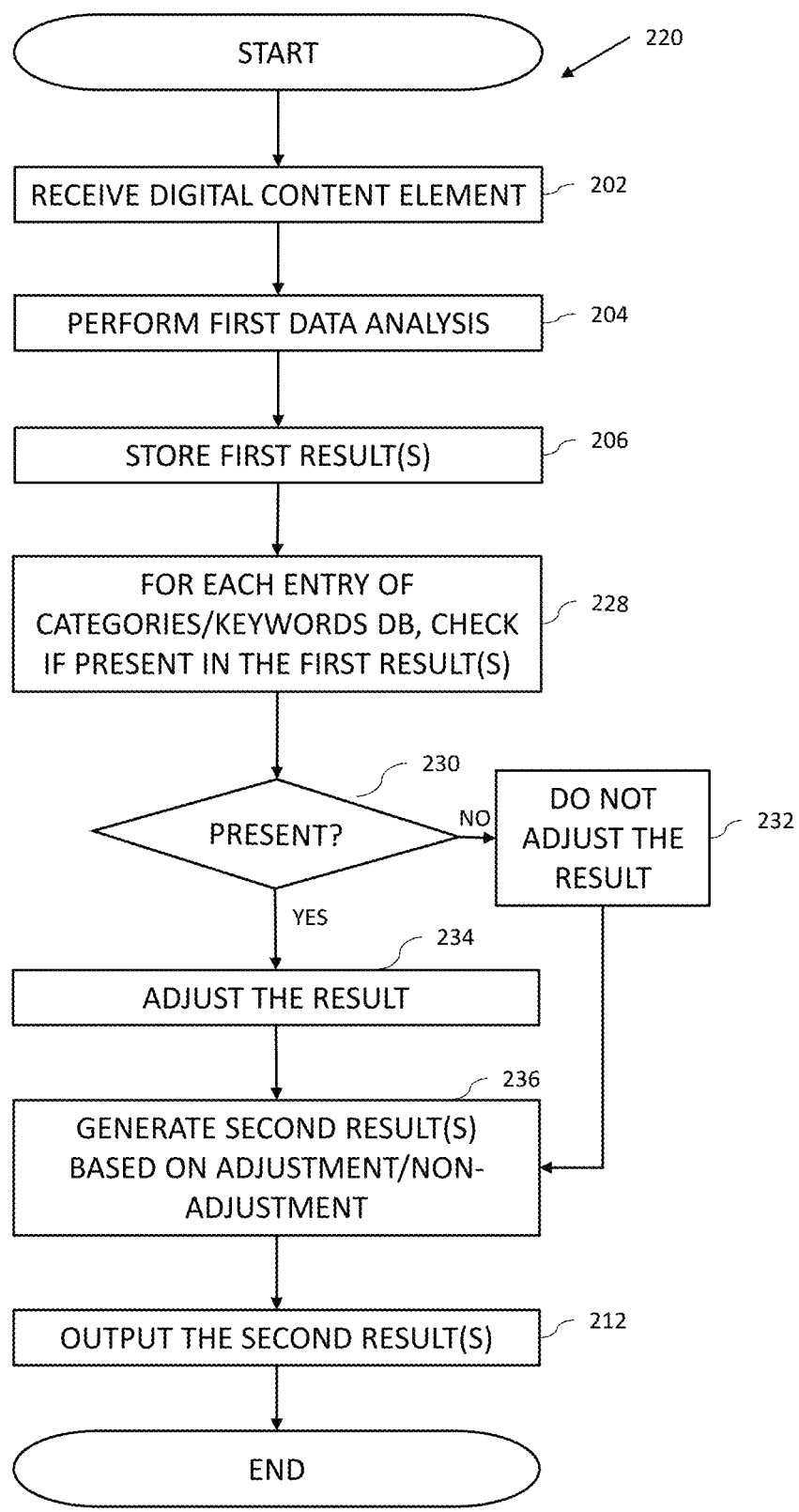
FIG. 2A is a logical flow diagram representing one embodiment of the generalized method of FIG. 2, according to the present disclosure.
Figure 2B:
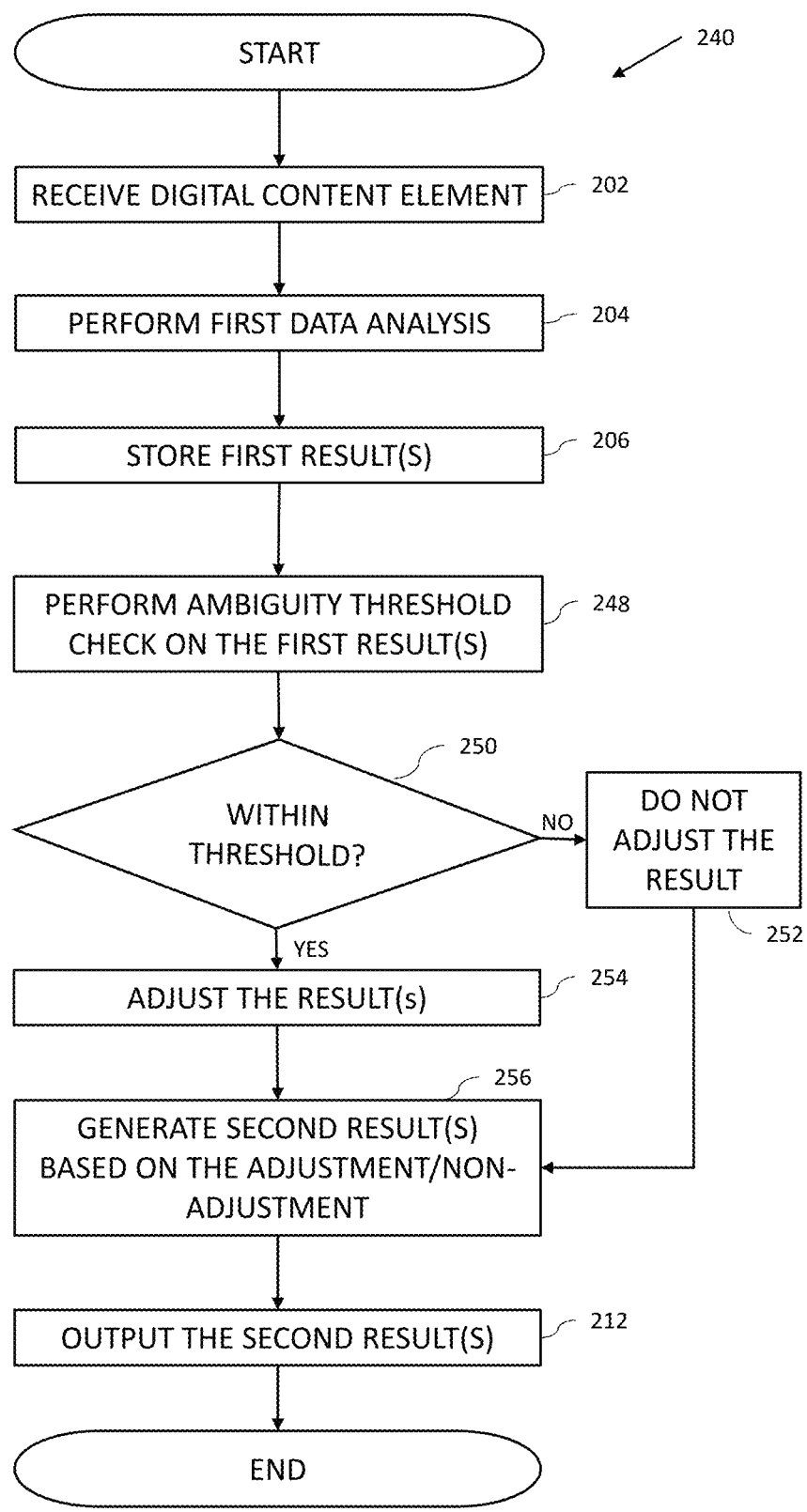
FIG. 2B is a logical flow diagram representing another embodiment of the generalized method of FIG. 2, according to the present disclosure.
Figure 2C:
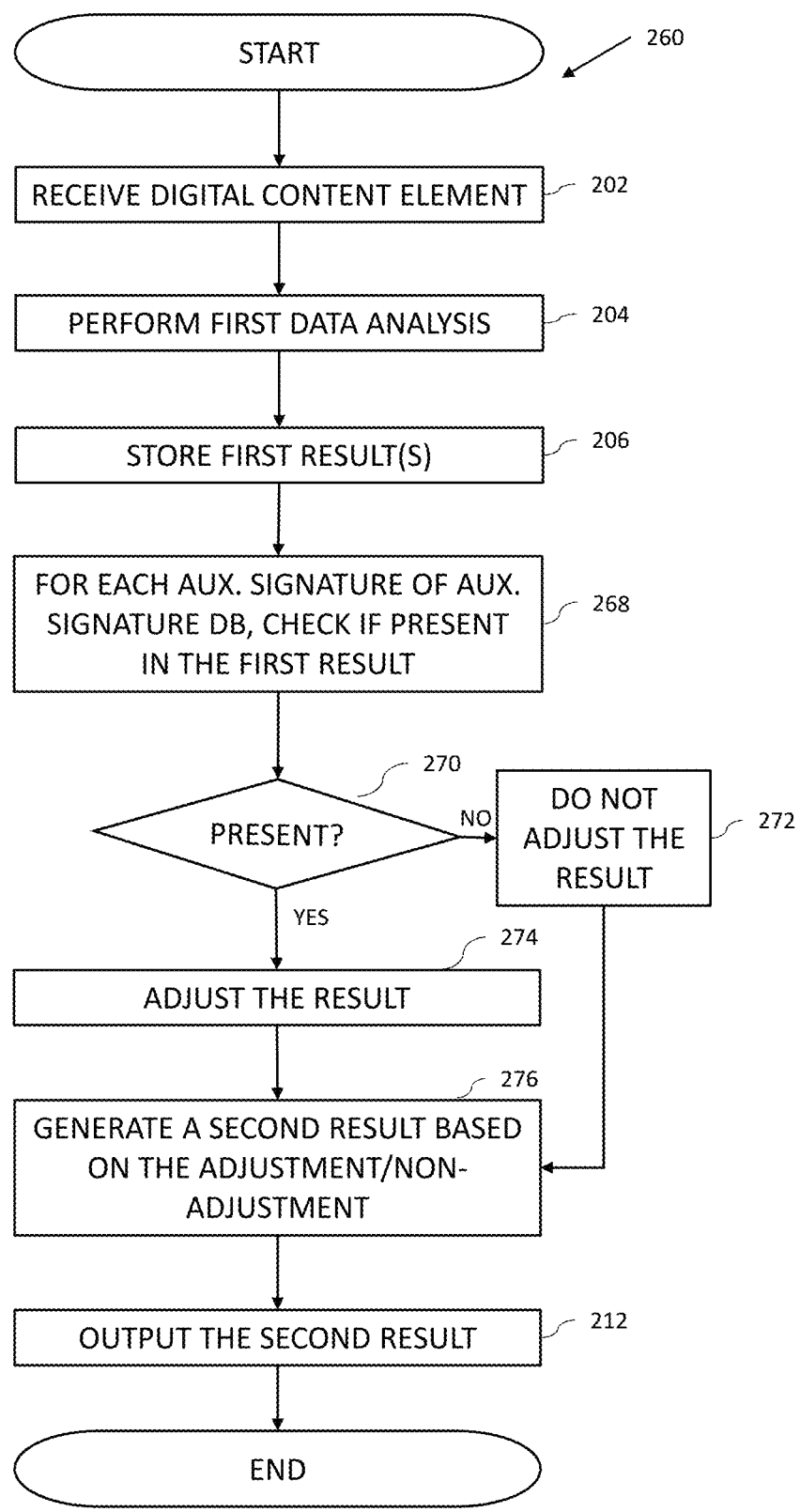
FIG. 2C is a logical flow diagram representing yet another embodiment of the generalized method of FIG. 2, according to the present disclosure.
Figure 2D:
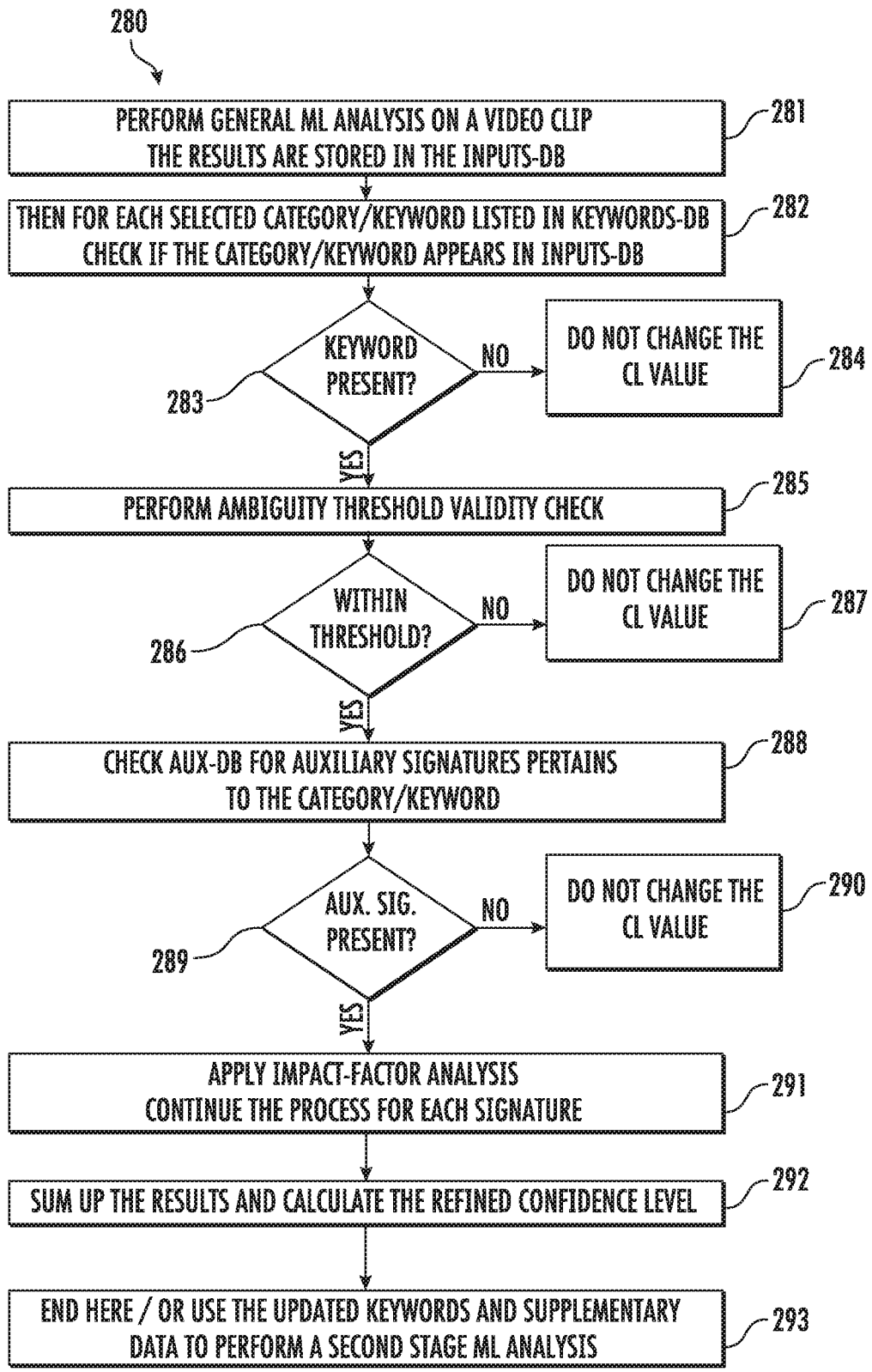
FIG. 2D is a logical flow diagram representing one particular implementation of a method of processing digital content data, according to the present disclosure.
Figure 2E:
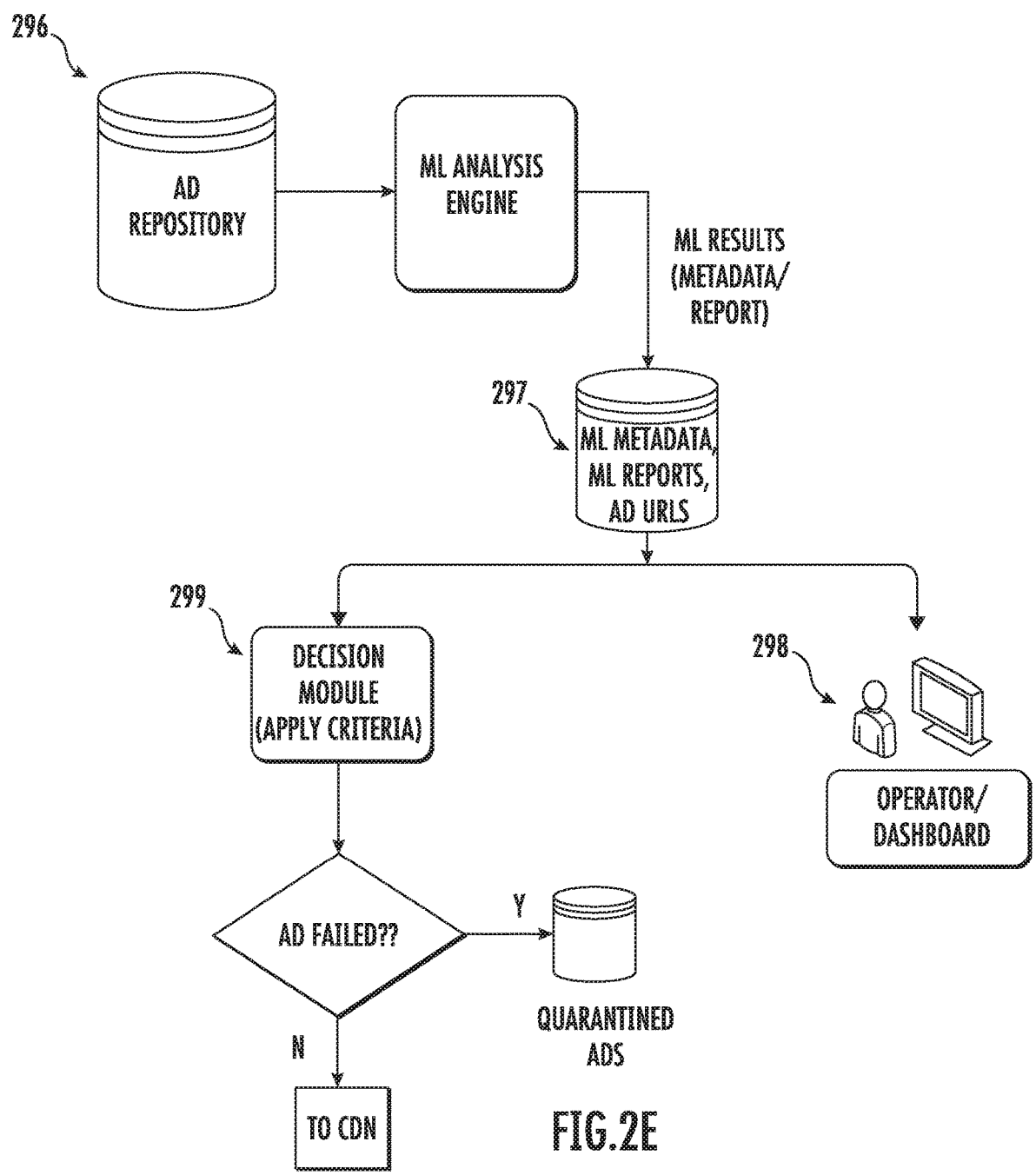
FIG. 2E is a graphical illustration representing an exemplary processing scenario according to the present disclosure.

In an exemplary use case scenario shown in FIG. 2E, a multitude of advertisements (e.g., about a thousand ads per day) are received at the ingestion point or process from various ad suppliers. The ingested content elements are pushed to a separate database 296 (e.g., Amazon AWS S3 "bucket") for retrieval and subsequent algorithmic analysis using the methods and apparatus of the present disclosure. Results of such data analysis may then be provided to a separate database 297, and then retrieved by human operators/technicians 298 for enhanced video analysis, in conjunction with the existing manual audio-visual analysis. Alternately, the output can be fed to an ADS 299 (Ad Decision Server; e.g., Free-Wheel, Double Click) for enhanced ad analysis.

In another exemplary scenario involving e.g., ABR (Adaptive Bitrate) streaming, a TV/media content stream received from a supplier may be received by a content distributor. Then, an encoder/transcoder entity may perform any format changes as needed. A packager/segmenter entity may splice the content into many chunks; the resulting video/audio segments, along with an index file (e.g., a manifest file) for segment identification, may be placed for storage on a CDN (Content Distribution Network) origin server. A manifest manipulator entity may then modify the index file to accommodate the ad segments. The origin server may be for example at the headend of the MO network, or at another node of e.g., a CDN. During playback, a customer device may pull media segments (chunks) from the origin server per the order listed in the index file. TV ad placement may be based on e.g., the presence and detection of SCTE-35 markers in the incoming stream. In the prevalent manifest manipulator based system, ads are "pulled" in real time, e.g., based on the ad location URL. Hence, in one approach, the ingestion and data analysis according to the present disclosure may be performed in parallel with one or more of the above actions, and hence not impede the existing data flow. This is especially true of any "dead time" or portions of the process when advertisement insertion-related activities are not critical for maintaining the data flow. For instance, ads may be ingested and processed, and their duration/placement identified as needed, before the need to insert the SCTE-35 markers arises. Other approaches will be recognized by those of ordinary skill given the present disclosure.

Returning to FIG. 2, per step 204, a first data analysis is performed on the digital content. A number of different computer programs and methods, including those from third party programs or service providers, may be used to perform the first data analysis. This first data analysis is intended to be a higher-level analysis of the content. For example, even a simple "visual" inspection of the digital content can be used to produce one or more results. An exemplary embodiment performing step 204 may identify and detect, via machine learning (ML) or artificial intelligence (AI) algorithms and processing, a broader selection of items or elements of interest, but in a shorter time. The first data analysis as performed in the exemplary embodiment may, depending on configuration, detect features in iterations or "passes." For instance, in one approach, a first pass may include detection of basic or high-level features or attributes; this pass may not be very granular; e.g., it is performed before "training" in supervised learning for image classification of ML/AI type data analysis as described elsewhere herein. For example, the first pass may be a "broad brush" scenario (e.g., a search for alcohol, but not for particular types of beer or wine; or a search for weapons, but not for particular type of weaponry). In one variant, only if the presence of a broad category is detected (and confirmed by the heuristic analysis, as discussed further herein) would a second data analysis or pass be performed, the second analysis comprising a more finely-grained analysis that the first pass. In this fashion, second-pass processing resources are only invoked as needed when the first pass meets one or more criteria or detects applicability to broad categories of interest.

In one exemplary implementation of step 204, a video file is analyzed on a frame-by-frame (e.g., I Frames only) or GOP-by-GOP basis, while the corresponding audio and text are processed as continuous stream. For example, a user or supervisory process may specify a window of time (e.g., which can be static or dynamically modified) for which the data associated therewith that can be processed to determine more contextual information e.g., by a validity check as discussed herein for step 208.

Furthermore, in another exemplary implementation of step 204, all or portions of a video file may be marked (e.g., via time stamping or other approach such as a "hint" track or synchronized metadata). Such marking (including e.g., frame/scene-accurate marks) of the video asset may allow, among other things, seamless transition in and out of the asset for e.g., ad insertions/transitions. Note that these markings may also have context; e.g., context identifiers or descriptors may be used to indicate not only temporal coordinates but also what the content context is at each marker.

As a brief aside, artificial neural networks loosely mimic the functioning of biological neurons. For example, when a human brain receives a plausible signature from one of the senses (visual, aural, olfactory, gustatory or haptic/tactile), a normal behavior of the brain may be to seek supplementary evidence, i.e. auxiliary data from other sources, to validate its initial detection. Exemplary embodiments of the present disclosure make use of a generally similar functionality based on "multi-stream" analysis of digital content; i.e., data from multiple sources to validate initial hypotheses or decisions/results. By enhancing the capabilities for data characterization by e.g., methods and apparatus of AI and ML techniques and algorithms, more rapid and accurate identification and classification of information included in digital content is achieved, thereby reducing the risk of irrelevant, inappropriate, or illegal digital content reaching subscribers and content consumers in a content distribution network, and reducing human workload in evaluating advertisements or other such content at ingestion.

Returning to FIG. 2, as a simple example of ML/AI type analysis of the first or "front end" step/process, the image or shape analysis detection result may be data indicative of a bottle/can containing a drink, but not granular enough to identify it as soda or beer.

Furthermore, parsing of a textual transcript or a set of metadata related to the digital content may serve as a way of performing data analysis for step 204 of FIG. 2, whether used in tandem with the image-based process. As is known, "metadata" includes extra data not typically found in (or at least not visible to the consumers of) the digital content. This metadata may be validated against relevant specifications if desired, such as e.g., those provided by CableLabs. For each individual secondary content element, for example, a metadata file can be generated, which specifies which events are associated with that individual secondary content element. For example, a simple "one-association" secondary content element would include metadata that associates the individual secondary content element chunk with a URL where that chunk can be found. The metadata can be rendered in human-readable form if desired. Additional and/or different metadata content may be used, such as, for example, providing user rating data for particular events, source of the content element, etc. The metadata information can be packaged in a prescribed format such as a markup or other language (e.g., XML, TXT, JSON, CSV, TTML or Audio-Visual). International standards for audiovisual metadata, such as the ISO/IEC "Multimedia Content Description Interface" (also referred to as MPEG7), or the TV-Anytime Forum's "Specification Series: S-3 on Metadata", can also be used as the basis for the metadata.

Figures 1A, 1B:
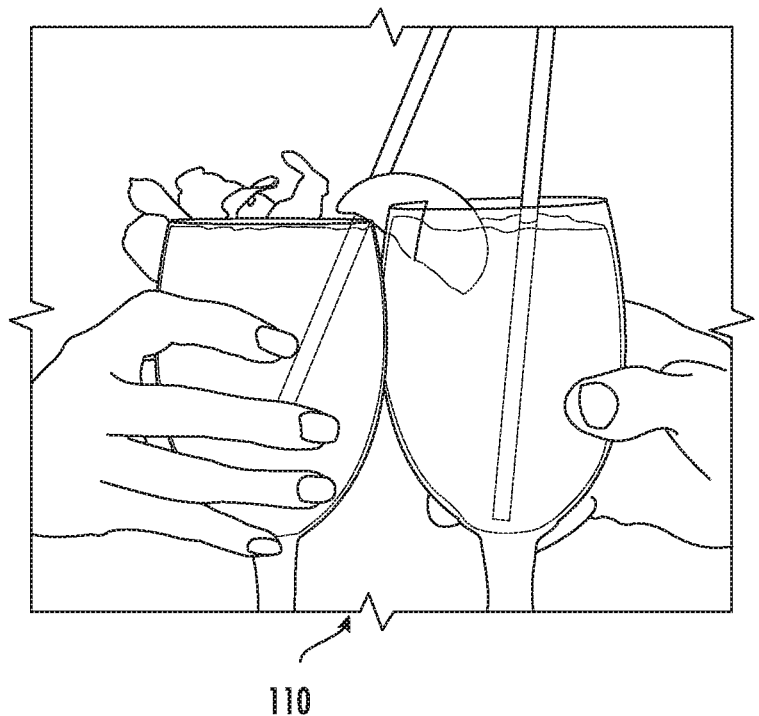
FIG. 1A is a graphical illustration of one exemplary prior art implementation of digital content characterization and its output.
FIG. 1B is a graphical illustration of a segment of output of the exemplary prior art implementation of digital content characterization shown in FIG. 1A.
Figure 1C:
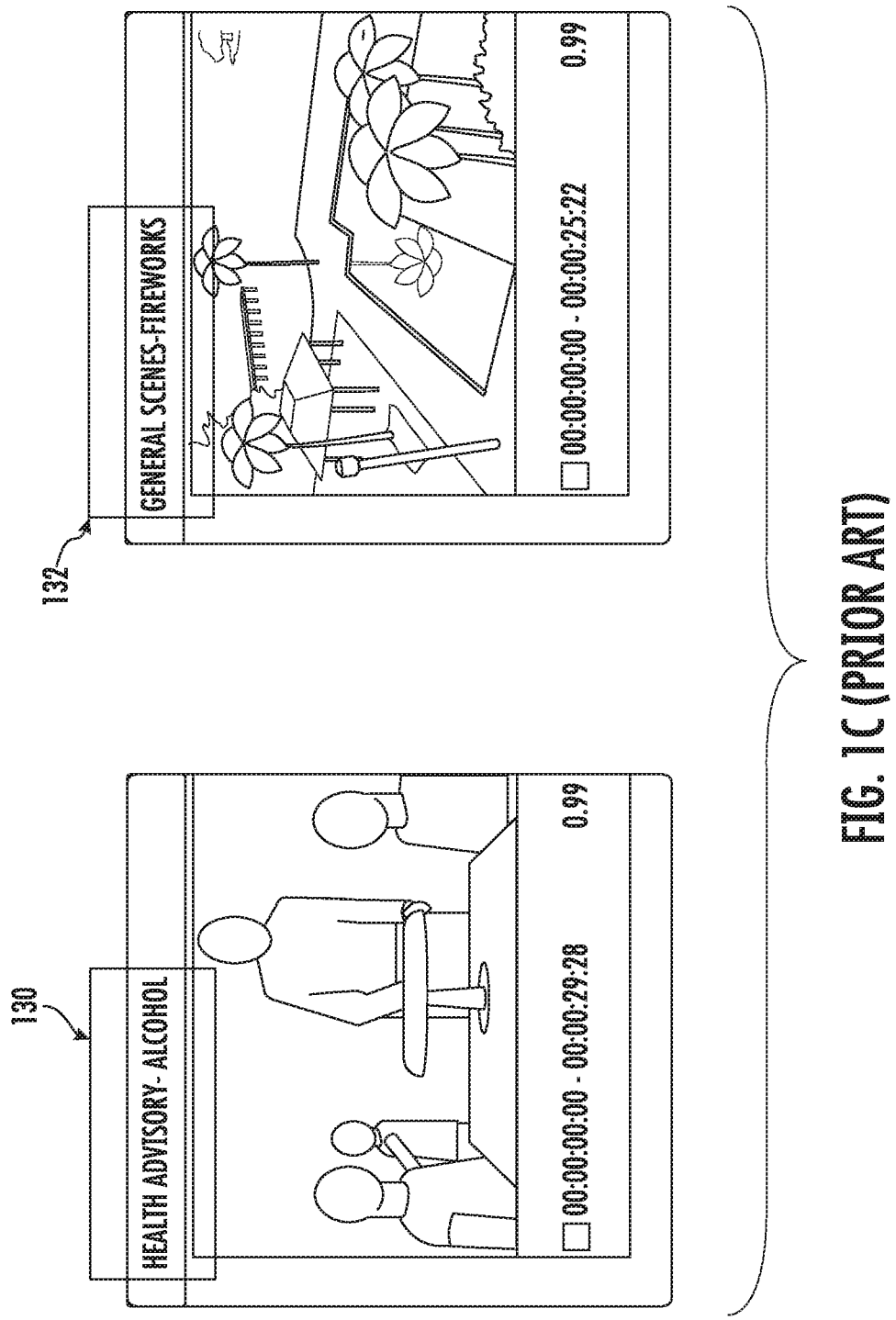
FIG. 1C is a graphical illustration of another exemplary prior art implementation of digital content characterization and its output.

In an exemplary implementation of step 204, the first result is obtained from a COTS data analysis tool, such as those illustrated in FIGS. 1A-1C, such as a set of results in a format that can readily be interpreted by the methods and apparatus of the present disclosure (e.g., XML, TXT, JSON, CSV, TTML or Audio-Visual). An exemplary configuration of the first result of step 204 includes: (i) detected content descriptors (e.g., in decreasing hierarchical format, video-, segment-, and frame-level "labels"); (ii) an associated "confidence level (CL)" metric for each detection, generated via the first data analysis; (iii) time stamps of occurrences (e.g., duration, interval, etc.); and (iv) coordinates of each detection (e.g., a bounding box). Such result may also be configured to coordinate with or fit into prescribed formats, such as e.g., a key-value format of JSON. It should be appreciated by persons of ordinary skill in the art given the present disclosure that any number of text file formats may be used in rendering the output of the result.

Moreover, while an exemplary ML/AI analysis of step 204 may perform image/video classification, it will be recognized that other ML/AI types of analyses (e.g., based on statistical algorithms) can be utilized in the context of step 204. Such algorithms include, but are not limited to: (i) K-Nearest Neighbor, (ii) Linear Classifiers (e.g., Logistic Regression, Naïve Bayes Classifier, etc.), (iii) Support Vector Machines, (iv) Decision Trees, (v) Boosted Trees, and (vi) Random Forest.

Furthermore, in another exemplary implementation of step 204, the first result obtained (e.g., from a COTS data analysis tool) may include a set of results in a format that cannot readily be interpreted by subsequent stages or processes of the analytical framework. In such a case, a flag or other such mechanism may be used to indicate "unable to process" when the first result is passed downstream. In this scenario, the exemplary implementation of step 204 may include an additional round or iteration of processing performed by e.g., a pre-processing entity. For example, the data received as the first result (obtained from the COTS data analysis tool) may be parsed and converted to a format that can readily be interpreted by subsequent stages or processing entities (e.g., XML, TXT, JSON, CSV, TTML or Audio-Visual). An example of such data may only include images and bounding box coordinates. Hence, the present disclosure contemplates instances where removal or stripping off of non-processable data is used as well; e.g., where certain fields or types of data make further processing incompatible, such data can merely be removed when it is not essential to the subsequent processing accuracy or performance.

Figure 1D:
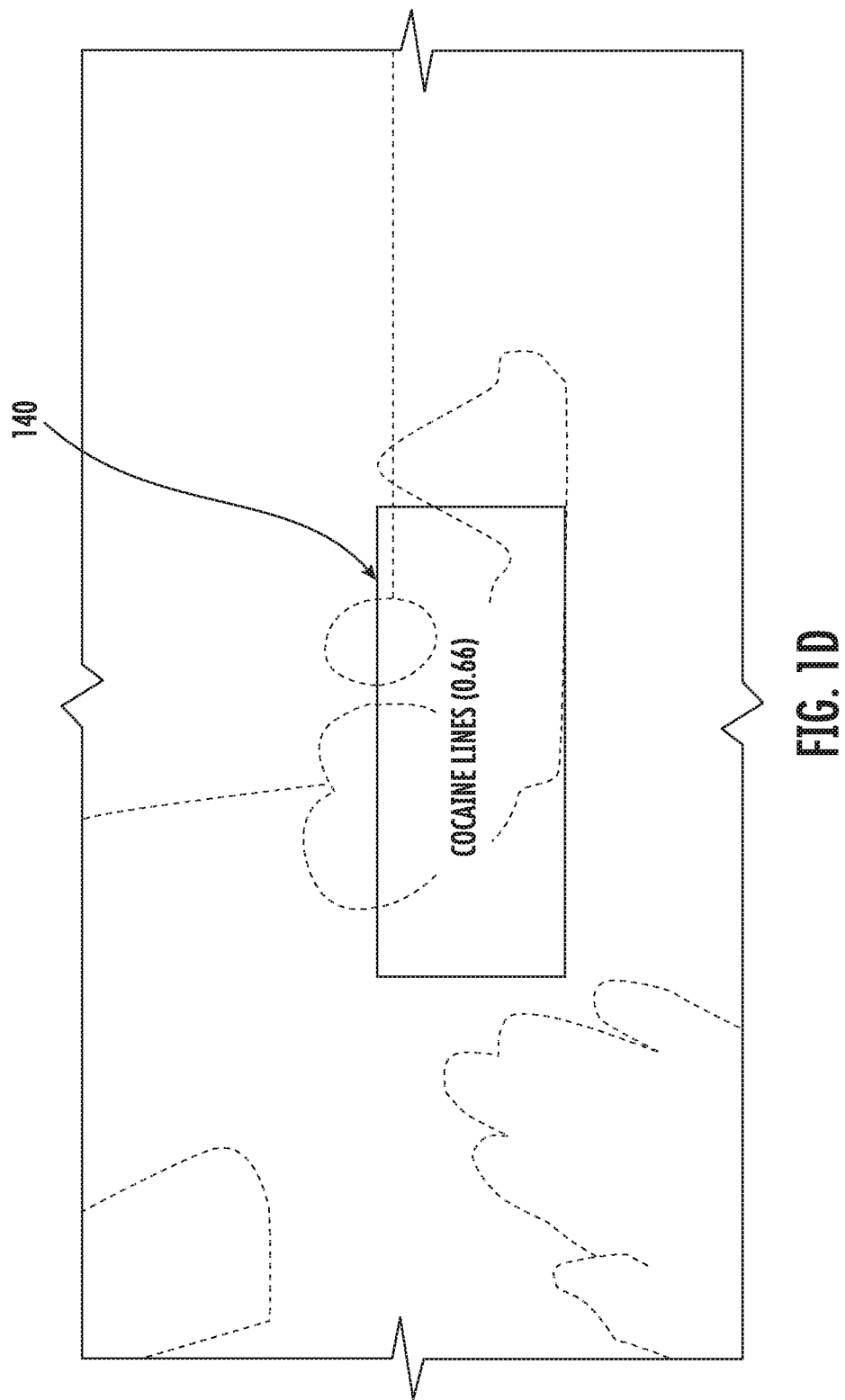
FIG. 1D is a graphical illustration of output of a digital content characterization process useful in the context of the generalized method of FIG. 2.

In another example, the CL data may appear in the image of the result itself. In such a scenario, the pre-processing entity can analyze and convert the initial data into the format that can readily be interpreted, as discussed above. An exemplary illustration of such data is shown in FIG. 1D. In FIG. 1D, the reflection from gas flames is misconstrued as contraband with a 66% CL metric 140. The pre-processing entity may convert this data into JSON format as input for the subsequent processing steps/algorithms, without changing the actual CL metric value.

In yet another exemplary implementation of step 204, the first data analysis may be performed via an internally-developed (e.g., MSO authored) data analysis tool. In one such variant, the tool formats its output so that it is optimized for further processing according to the present disclosure. For example, a first result from a first data analysis by such data analysis tool (as internally developed) may include "look ahead" results such as MSO-specific content descriptors (or labels) and accompanying CL metrics, which may facilitate further processing according to the present disclosure, as compared to the output of the COTS solution discussed above. Stated differently, COTS solutions are often generic or "one size fits all" and intended for use by broader, diverse bases of users in various different operating environments. As such, the first stage processing tool can be made application- or even MSO-specific as to its operation and outputs, so as to seamlessly integrate with other extant network processes (including the HE 400 described below).

It is further appreciated that while software-based decoders/first data analysis tools are described herein, some or all aspects of the process may be reduced to hardware, such as within an ASIC specifically fabricated for high-speed video/audio data decode operations or ML/AI logic functions. As is known, hardware is often orders of magnitude faster in certain operations, but heavily limited in its reconfigurability.

Returning to FIG. 2, per step 206, a first result based on the first data analysis performed in step 204 is stored in a storage entity. In one exemplary implementation of step 206, an Input database ("DB") 404 (see discussion of FIG. 4 herein) may be used to store the first result from the first data analysis. The format of the first result may be in multiple variants (e.g., XML, TXT, JSON, CSV, TTML or Audio-Visual). The Input DB 404 may be located in local or remote storage and may be of e.g., SQL or NoSQL types. The Input DB 404 may also contain an interface (e.g., GUI) for a user (e.g., a subscriber or content consumer in a content distribution network) to create a new entry or edit an existing entry on the DB. Alternatively, the Input DB 404 may be limited to a content provider or a network operator for access. In such a case, the content provider or the network operator may be able to allow access to the DB by a user based one or more policies (e.g., for a fee).

It should be appreciated by persons of ordinary skill in the art that possible locations of the DB include but are not limited to: a local storage device, a network of external servers, "cloud" entities (such as memory or storage not local to a device, storage generally accessible at any time via a network connection, and the like), service nodes, access points, controller devices, client devices, etc.

Per step 208, a validity check is performed on the first result resulting from the first data analysis 204, such as by utilizing various combinations of the methods as discussed further herein (see discussion of FIGS. 2A-2C herein).

Per step 210, a second result is generated based on the result of the validity check as performed in step 208 on the first result obtained from step 204. In one exemplary embodiment, the second result is based on an adjustment as made to e.g., confidence level (CL) metrics associated with the first result obtained from step 204.

Per step 212, the second result obtained in step 210 are output for other entities (not shown) to use for various purposes. In one exemplary embodiment, the adjusted results may be output and presented in a format that can readily be interpreted by other applications (e.g., XML, TXT, JSON, CSV, TTML or Audio-Visual).

It should be appreciated by persons of ordinary skill in the art that any combination(s) of the following methods and modules may be used for the purpose of improving the accuracy of the data analysis results according to the present disclosure.

Algorithm Utilizing Categories/Keywords DB

Referring now to FIG. 2A, one exemplary implementation (method 220) of the generalized method 200 of FIG. 2 is described.

As described supra, per steps 202-206, digital content is received, a first data analysis performed, and a first result from the first data analysis is stored in a storage device.

Per step 228 of the method 200, each entry of a Categories/Keywords DB is compared against the first result of the first data analysis. In an exemplary embodiment, the Categories/Keywords DB may include ad categories that may be restricted for certain TV audiences (e.g., no alcohol ads during children's programs). For examples of such categories and keywords, see the first and the second columns of Table 1, infra.

TABLE 1

Exemplary Categories, Keywords, and Auxiliary Signatures

| Restricted Category for Ad Ingest | Keywords | Auxiliary Signatures |
|---|---|---|
| Alcohol | Beer, wine, hard liquor or variants, including those with non-descriptive names (e.g., "Bud Light Lemon Tea") | Toasting, bottle/can, joy, young people gathering, dancing, brand names |
| Tobacco | Cigarettes, e-cigarettes, cigars, vaping | Smoke, device, fingers |
| Drugs | Common terms for (drug paraphernalia) | Marijuana leaf, glass pipes |
| Gambling, Casino | Poker, Blackjack | Green casino table |
| Copyrighted Content | Visual and/or audio track (songs, movie soundtracks) | |
| Trademarked Content | College-brand t-shirts, logos and emblems | |
| Explicit Content | | |
| Curse/Swear Words | | |
| Sexual Products | | |
| Violence | Guns, explosives, physical violence | Screaming, attacking |
| Political Content | | |

It should be appreciated by persons of ordinary skill in the art that the categories and keywords as described in the foregoing context may be provided from, inter alia, a user (e.g., a subscriber or content consumer in a content distribution network) or a content provider or network operator, or yet another input (e.g., as selected by an AI/ML, based selection process).

Per step 230 of the method 220, if any of entries found in the Categories/Keywords DB is present in the first result, the first result from the first data analysis is adjusted (per step 234) via any combination(s) of exemplary methods as described herein (see discussion of FIGS. 2B and 2C herein). Otherwise, the first result is left as-is (per step 232).

Per step 236, the adjusted result from step 234 is used to generate an output (as a second result), which can be used by another application for various purposes as described herein.

As described previously, per step 212, the second result (e.g., as generated in step 236) is given as an output for other applications to use for various purposes. In one exemplary embodiment, the adjusted (second) result may be presented in a format that can readily be interpreted by the other applications (e.g., XML, TXT, JSON, CSV, TTML or Audio-Visual).

Algorithm Utilizing Ambiguity Threshold

Referring now to FIG. 2B, another exemplary implementation (method 240) of the generalized method 200 of FIG. 2 is described.

Per steps 202-206, digital content is received, a first data analysis performed, and a first result from the first data analysis is stored in a storage device.

Per step 248, an ambiguity threshold check is performed on the first result. In an exemplary embodiment, the first result, which includes CL metrics relating to the accuracy of the result, is checked to see if the measured CL metrics are within the ambiguity threshold as defined by one or more parameters. It should be appreciated by persons of ordinary skill in the art that such one or more parameters relating to the ambiguity threshold may be defined by a user (e.g., a subscriber or content consumer of a content distribution network) or a content provider or network operator, or other process or entity.

Per step 250, in an exemplary embodiment of the method 240, if the measured CL value of an entry of the first result is within the ambiguity threshold, that particular entry of the first result is adjusted (per step 254). Otherwise, the results are left as-is (per step 252).

The ambiguity threshold defines the low and high values for the CL metrics. In an exemplary embodiment method, the following rules are utilized:

(a) Ignore further adjustments if the CL value for an entry of the first result matched with a selected category or keyword is lower than the low value; and (b) Ignore further adjustments if the CL value for an entry of the first result matched with a selected category or keyword is higher than the high value.

For example, if the CL value is greater than 95%, it may be assumed that the accuracy of the identification of a characteristic (e.g., as found in the Categories/Keywords DB) is reliable, and a user or consuming process as applicable may take the identified data at its face value. In another example, if the CL value is less than 20%, it may be assumed that the identification of a characteristic (e.g., as found in the Categories/Keywords DB) is spurious and may be ignored altogether (thus requiring no further adjustment to the first result from the first data analysis). Only when the CL value is within the threshold level as described herein, may the identified characteristic and its CL value be adjusted for a greater accuracy.

Per step 256, the adjusted results from step 254 are used to generate a second result as an output that can be used by other applications as described herein.

Per step 212, the second result obtained in step 256 is given as an output for other applications to use for various purposes. In one exemplary embodiment, the second result may be presented in a format that can readily be interpreted by other applications (e.g., XML, TXT, JSON, CSV, TTML or Audio-Visual).

Algorithm Utilizing Auxiliary Signatures DB (Impact Factor Application)

Referring now to FIG. 2C, yet another exemplary implementation (method 260) of the generalized method 200 of FIG. 2 is described.

As described elsewhere herein, per steps 202-206, digital content is received, a first data analysis performed, and a first result from the first data analysis is stored.

Per step 268, each entry of the auxiliary signature DB is compared against the first result of the first data analysis. For examples of the signatures, see last column of Table 1, supra. In one exemplary embodiment, customer profile data (e.g., demographic, viewing history, etc.) may be utilized as auxiliary data for the present disclosure.

Figure 3A:
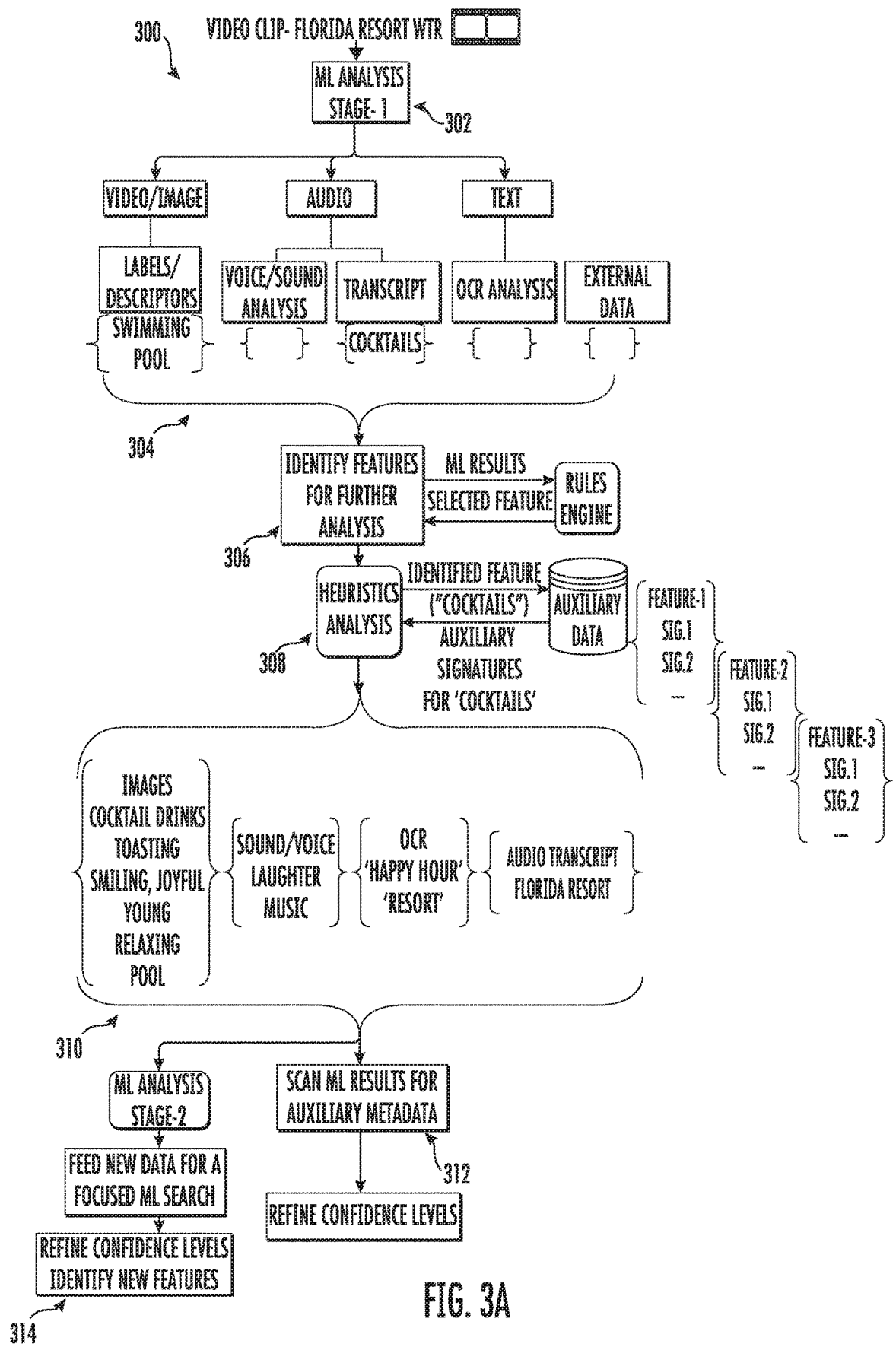
FIGS. 3A and 3B are graphical illustrations representing exemplary applications or use cases of the methods of FIGS. 2-2D.
Figure 3B:
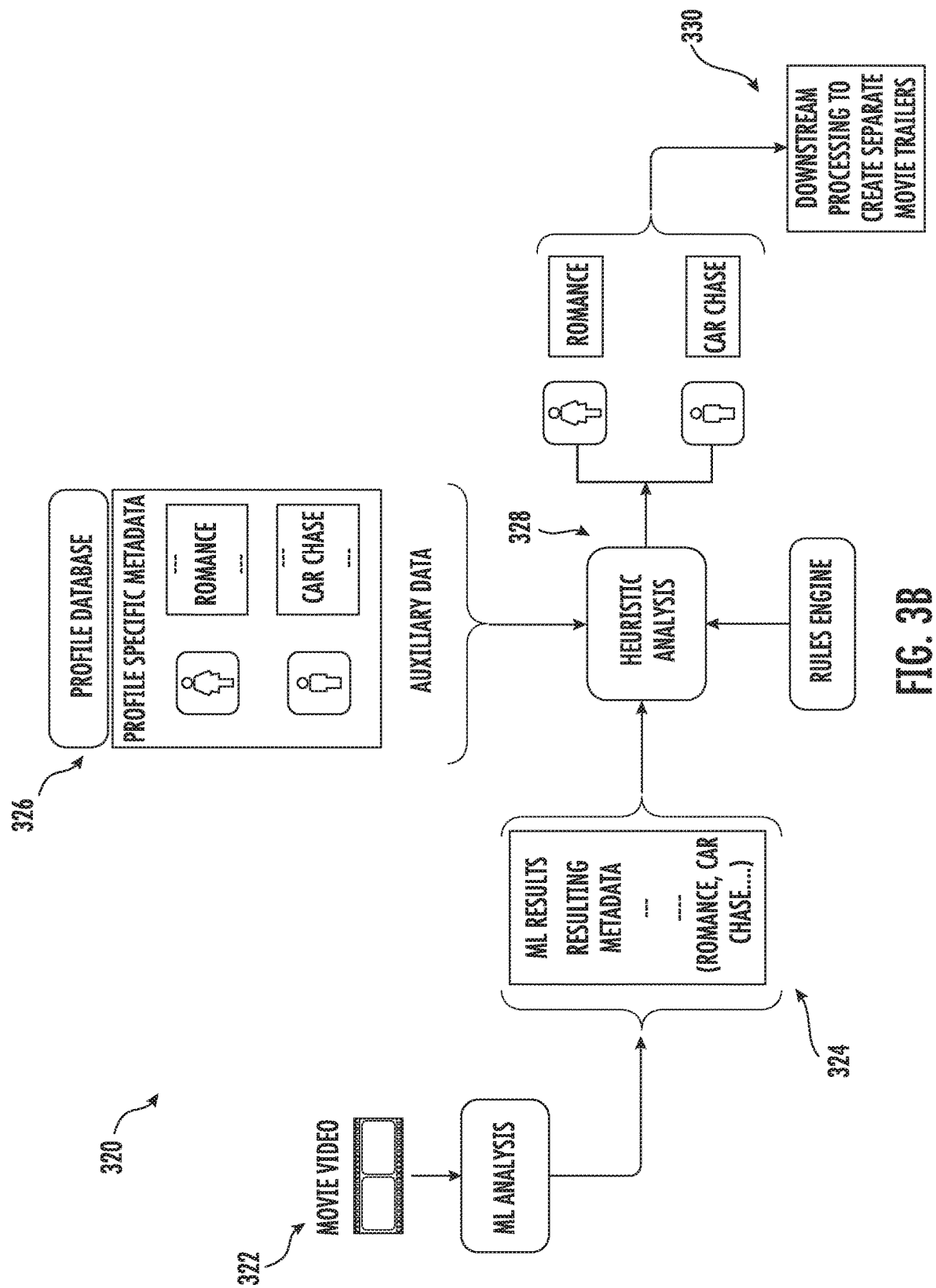

For example, using customer profile data to match against the first result from the first data analysis may be useful to extract sections of a movie to create customized movie trailers (see discussion of FIG. 3B).

In another example, such data as text size/locations, static background, or text format (e.g., Key-Value pair as used in closing credits of a movie) may be useful to classify portions of a movie that a user may be able to skip by using the adjusted result based on these data as auxiliary signatures and the methods and apparatus described herein.

Per step 270, if an auxiliary signature is present in the first result, in one exemplary embodiment, the CL value(s) of the first result is/are multiplied by impact factor associated with each auxiliary signature entry found in the first result (per step 274). Otherwise, the first result is left as-is (per step 272). It should be appreciated by persons of ordinary skill in the art that the impact factor of each auxiliary signature may be defined by a user (e.g., a subscriber or content consumer of a content distribution network) or a content provider or network operator, or other process or entity.

An impact factor may be embodied for instance as a non-negative numerical value, and in one implementation, it may be in the range of 0.5 to 1.5 (i.e., 50% to 150%). This factor can be used to amplify or diminish (aka weight) the importance of auxiliary signatures, and/or enhance a data analysis result, which may be otherwise hampered by the fact that the signatures are sometimes not expressly defined. For example, in alcoholic beverage ads, which may try to avoid mentioning specific words such as 'beer' and/or use obscure names like 'pale ale', there are tell-tale signs (i.e., auxiliary signatures) that describe the digital content even if the primary "signature" (e.g., descriptor such as "beer", or positive visual identification of something known to be beer) is not expressly stated. In this example, beer ads targeted for a younger population may often be accompanied by scenes of happiness, laughter, dancing, etc. Such auxiliary signatures would fortify the initial assertion or hypothesis by affirming or disaffirming the accuracy of the detection.

It should be noted that not every auxiliary signature may have equal importance. For example, scenes of people holding vessels of liquid elevated in front of them (e.g., a putative "toast") would likely have more impact/importance for detecting alcohol, than a scene with a swimming pool. Hence, the present disclosure contemplates weighting of different secondary or auxiliary signatures or other indicia as to their relevant importance or reliability. For instance, while an elevated liquid vessel held by a person as mentioned above is a strong indicator for alcohol, it may also be a strong indicator for one or more other correlations (e.g., a laboratory scientist looking at a chemical sample or beaker in the light, a child offering lemonade to an adult at a lemonade stand, etc.). As such, the reliability of the auxiliary signature may also be weighted via one or more secondary factors.

Using the foregoing approach, the exemplary impact factor (and any sub-factors and/or weightings) helps to quantify the influence/importance of auxiliary signatures of e.g., a keyword.

The impact factor(s), managed by a Rules Engine 410 (see discussion of FIG. 4 herein), can be used in one implementation as a multiplier to amplify the importance. For example, if an auxiliary signature is present, the CL metric of an associated keyword can be revised by multiplying the initial CL metric value by the impact factor value (and any appropriate weighting if not otherwise entrained within the factor itself). In another implementation, the impact factor/weight can also be used as a divisor to diminish the importance of a keyword. For example, if an expected auxiliary signature is absent, then the CL metric of an associated keyword can be revised by dividing the initial CL metric value by the impact factor value.

It will also be appreciated that the impact factors (and in fact other metrics described herein) may be used for either/both of confirmation of a positive or negative hypothesis. That is, the data and analysis can be used to confirm the existence of a particular hypothesized condition or element (e.g., the presence of alcoholic beverages in an ad), or to support a hypothesis that no alcoholic beverages are in the ad. In the former case, the analysis may merely need to identify one instance of suitable CL/reliability that an alcoholic beverage is present, and obviate any remaining analysis. Conversely, for the latter situation, the analysis may need to examine every frame or GOP of the video (and audio/text) to confirm the negative hypothesis. Such positive or negative hypotheses may be useful for example, based on the stringency or "gravity" of the condition or attribute; more rigorous and complete analytical regimes may be applied for those conditions/hypotheses which have more importance to the viewing audience or the content provider.

In another exemplary scenario, one or more technicians or operators, who are well-experienced in defining auxiliary signatures as well as determining the numerical values of impact factors, can be tasked to manually review video content and identify the auxiliary signatures; i.e., as a complementary approach to automated signature analysis as described above.

Furthermore, it should also be appreciated by persons of ordinary skill in the art that the auxiliary signature entries as described herein can be provided from an external source, including but not limited to data from e.g., IMDB, MPAA movie ratings, etc.

In another exemplary embodiment applying impact factor calculation, the CL value(s) of the first result is/are divided by impact factor associated with each auxiliary signature entry not found in the first result.

In yet another exemplary embodiment applying impact factor calculation, for each auxiliary signature entry of the auxiliary signature DB, the following rules are applied:

(a) If the auxiliary signature is present in the first result, then multiply the CL value(s) of the first result by the impact factor associated with the auxiliary signature. Repeat the process for each auxiliary signature; and (b) If any auxiliary signature is absent, then divide the CL value(s) of the first result by its associated impact factor. Repeat the process for each auxiliary signature.

In yet another exemplary embodiment applying the impact factor calculation, the methods 240 (FIG. 2B) and 260 (FIG. 2C) may be combined to implement the following rules:

(a) If an entry of the auxiliary signature DB is present in the first result, then multiply the CL value of the entry of the first result matched with a category or keyword by the impact factor associated with the auxiliary signature. Repeat the process for each auxiliary signature; and (b) If any auxiliary signature is absent, then divide the CL value of the entry of the first result matched with a category or keyword by the impact factor associated with the auxiliary signature. Repeat the process for each auxiliary signature (this is to reduce false positive results); and (c) If the category/keyword of interest is absent while only the auxiliary signature(s) is/are present (likely an indication of a false negative result in the first result, meaning the first data analysis missed a category/keyword that should have been detected), then multiply the CL value of the category/keyword of interest by impact factor of each auxiliary signature found in the first result. Repeat the process for each auxiliary signature.

Table 2 shown infra summarizes rules relating to the algorithm utilizing impact factors and associated auxiliary signatures.

TABLE 2

Summary of Exemplary Algorithm Utilizing
Impact Factors and Auxiliary Signatures

| Category/Keyword | Aux. Signature | CL Adjustment | Comments |
|---|---|---|---|
| Detected | Detected | Multiply by Impact Factor | ML detection accurate (category/keyword/signature present in the first result) |
| Detected | Not Detected | Divide by Impact Factor | False Positive |
| Not Detected | Detected | Multiply by Impact Factor | False Negative |
| Not Detected | Not Detected | Divide by Impact Factor | ML detection accurate (category/keyword/signature present in the first result) |

In another exemplary variant of the impact factor calculation, a CL value as modified by virtue of the foregoing rules must lie in the range between 0% and 100%. For example, in order to avoid extremely low or high CL values, a Rules Engine 410 (see discussion of FIG. 4 herein) may curtail the number of auxiliary signatures to be counted in the calculation.

In another variant, if multiplying several impact factors causes the resulting CL value to exceed 100, then it is truncated to 100%. For example, if (New CL)=(Old CL)×(Impact Factor 1)×(Impact Factor 2)×(Impact Factor 3)=65%×1.2×1.1×1.2=102%, then the New CL is truncated to 100%.

In yet another variant, an "anti-signature" is considered. As a brief aside, an "anti-signature" is an auxiliary signature whose presence would diminish (rather than increase) the CL value. For example, in Table 3 as shown below, if the first result includes a keyword "fight" while the analyzed content is merely of "kids screaming and playing wildly", then the associated CL value would be reduced. Accordingly, the impact factor of an anti-signature is less than 1.0 (e.g., 0.5 for "Children/kids" in Table 3).

TABLE 3

Exemplary Categories, Keywords, and Auxiliary Signatures with Impact Factors

| | | Auxiliary Signatures | | | | | |
|---|---|---|---|---|---|---|---|
| Category | Keywords | Video Stream | Impact Factor | Audio Stream | Impact Factor | Audio Transcript | Impact Factor |
| Violence | Fight, Rage | Screaming | 1.1 | Screaming | 1.1 | Screaming | 1.1 |
| | | Crying | 1.1 | Sounds of attack | 1.1 | Argument | 1.1 |
| | | Attacking | 1.2 | | | Threatening words | 1.1 |
| | | Fighting | 1.2 | | | | |
| | | Contorted faces | 1.1 | | | | |
| | | Blood | 1.4 | | | | |
| | | Weapons | 1.2 | | | | |
| | | Children/kids | 0.5 | | | | |

In another auxiliary signature-based variant, no numerical computation is involved. Instead of recalculating CL values, only the presence or absence of auxiliary signatures may be tracked so that an entry of the first result may be reported and/or flagged as appropriate.

For example, based on the entries of Table 3, an entry of the first result matched with a category "violence" with 60% CL may be reported and/or flagged as a false positive result, based on the presence of an entry of the first result matched with an auxiliary signature "kids screaming and playing."

In another example based on the entries of Table 1 supra, when a category "alcohol" is not detected in the first result while auxiliary signatures of "toasting", "joy", "young people" and "dancing" are found in the first result, the category of "alcohol" may be reported and/or flagged as a false negative result.

Referring back to FIG. 2C, per step 276, the adjusted results from step 274 are used to generate a second result as an output that can be used by other applications as described herein.

Lastly, per step 212, the second result obtained in step 276 is given as an output for other applications to use for various purposes; e.g., in XML, TXT, JSON, CSV, TTML or Audio-Visual format.

FIG. 2D illustrates another implementation of the generalized methodology 200 of FIG. 2.

Per step 281, the general ML analysis is performed on a video clip, and the results are stored in the Inputs DB 404.

Per step 282, for each selected category/keyword listed in the Keywords DB 408, an evaluation is performed to determine if that category/keyword is present in the Inputs DB.

Per step 283, if not present, the extant confidence level (CL) value, as determined via the general ML analysis performed per step 281 or alternatively, in one exemplary variant, set to a default value (e.g., 100% for 100% certainty) via the Rules Engine 410 (e.g., if the initial CL values are not present for the claimed detections from step 281), is left unchanged per step 284. It should be appreciated by persons of ordinary skill in the art that the default CL value may be configurable e.g., via the Rules Engine 410 or another process (or user input).

Conversely, if not present in the Inputs database, the method proceeds to step 285, wherein an ambiguity analysis is performed. In this implementation, the ambiguity analysis is a threshold validity check At step 285, if the ambiguity analysis result is not within a prescribed threshold, the CL value is left unchanged per step 286. Conversely, if it is within the threshold, then per step 287, the Auxiliary DB is checked for one or more auxiliary signatures pertaining to the category/keyword per step 288. If an auxiliary signature is not present per step 289, the CL value is left unchanged per step 290. If a signature is present, then per step 291, an impact-factor analysis is utilized for each signature found in steps 288-289.

Next, per step 292, the results are summed, and a refined or converged CL value is calculated.

Lastly, per step 293, the process 280 either (i) is terminated or (ii) if available, updated keywords and/or supplemental data are utilized to perform a "second stage" or iterated ML analysis.

FIGS. 3A and 3B illustrate exemplary "real-world" use-cases or applications of the foregoing methodologies.

As shown in FIG. 3A, the first approach 300 initially feeds ad creatives/video content (these could be e.g., 30-second ads, long-form ads, TV episodes, movies or other multimedia content) into the selected ML engine at stage 302. In this illustration the exemplary Cocktails video clip of FIG. 1A and the Florida Resort video clip of FIG. 1C are used as the inputs.

In the next stage 304, the ML Engine conducts machine learning-based analysis. The results are the identified content descriptors (CDs) and confidence levels (CLs). For instance, the exemplary JSON file (see FIG. 1B) contains the word 'Cocktails' extracted from the audio transcript as previously described, the image analysis missed this element. For the example shown in FIG. 1C, the cocktail is identified correctly; however, the identification of 'Fireworks' is a false positive (i.e., a palm tree is shown versus a fireworks "bloom").

Per stage 306, one or more features for further analysis are identified. In this illustrative example, the criteria is based on rules built previously either by human input or machine generation, such as a list of keywords. As previously described, features that are ambiguous may also be used as a feature keying further analysis (the criteria for ambiguity could be CL within a specified threshold, e.g. 80%>Confidence level>60%).

Per stage 308, a heuristics analysis is performed; the 'auxiliary data' for the feature(s) identified above (e.g., "cocktails") is identified and retrieved. For instance, this auxiliary data may relate to plausible signatures that may appear in other streams for a given feature.

Sample auxiliary signatures for the feature(s) of interest (e.g., 'cocktails') are assembled per stage 310. In one embodiment, these signatures are pre-populated in the auxiliary database. Alternately they may be derived from an external system, such as via so-called "Transfer Learning" (i.e., a machine learning method wherein a model developed for a task is reused as a starting point for a model on a second task; see, e.g., "*Transfer learning is the improvement of learning in a new task through the transfer of knowledge from a related task that has already been learned*"—Handbook of Research on Machine Learning Applications, (ISBN: 1605667668 9781605667669), incorporated herein by reference in its entirety.

At the next stage 312, previous ML results (from the first pass) are fed into the ML software module programmatically, and the presence of auxiliary data in other streams identified. The Rules Engine (RE) may define additional criteria for the search. e.g., how long of a temporal duration the data need to appear in the video stream to be counted "significant" (because a fleeting occurrence (e.g. one frame) of an object may not warrant a high score). Based on the foregoing analysis, the CL is adjusted. (e.g., if 'drinks', 'toasting' metadata appear in the video analysis, the confidence level for 'Cocktails' is increased. Conversely, if there are no supporting auxiliary data, the confidence level (CL) is lowered.

Optionally, a second stage ML analysis is supported at stage 314 for a more refined search. Using auxiliary data for the classification algorithm enables, inter alia, a focused and higher accuracy search where desired (e.g., where not restricted by temporal or processing overhead concerns). It will be appreciated that the ML engine for this last stage 314 can be same as in the first stage 302, or a separate instance customized for the targeted search.

Referring now to FIG. 3B, another exemplary use-case or application of the technology of the present disclosure is shown and described. In this example, creation of customized movie trailers is used as the basis/output of the analysis. Specifically, customer profile data (demographic, viewing history, etc.) are supplied as auxiliary data for the heuristic analysis. A match is made between ML results and profile data heuristics, and relevant sections of the movie can be extracted to create customized movie trailers.

At stage 322 of the illustrated approach 320, a video of a movie (or multimedia content) is fed to the ML engine. The ML analysis results (stage 324) contain in this illustration the feature identifiers 'romance' and 'car chase.'

Per stage 326, a separate Profiles DB contains customer data. A heuristic analysis performed at stage 328 using the HE described elsewhere herein can glean the auxiliary keywords. For instance, in the illustrated case, it is assumed that the age/sex group of age 18-24 males prefers car chases, and 18-24 females prefer romantic scenes. Also per stage 328, data from both inputs (i.e., the source movie and the profile from the Profiles DB of stage 326) are compared, and matching data are identified per the rules set of the RE. Lastly, downstream processing is used at stage 330 to extract relevant sections of the movie to create customized movie trailers for the individual users or groups of users (e.g., the demographic or 18-24 females).

It will be appreciated that in addition to the information relating to the age/sex group of content consumers, used as profiles for customizing digital content (e.g., movie trailers), the above approach 320 can be readily adapted for use with other types of information, such as previous viewing history, user interests, time of day, etc. Furthermore, such profile information may be provided by one or more users or obtained from one or more external sources, including audience data collected by a network operator, a third party data collection entity, etc.

It will be further appreciated that in addition to movie trailers as described with respect to FIG. 3B, the above process 320 can also be readily adapted for use in parsing a video repository to form customized content (e.g., for identification of fight scenes from a collection of videos, and stitching together of the identified scenes to build a customized video content stream or "montage"), in addition to improving upon data collected from the machine learning-based analysis as performed in stage 304, discussed supra.

More generally, it will also be appreciated that while the exemplary embodiments of the present disclosure and the illustrations above describe ingestion, analysis, and characterization of individual digital content elements (e.g., ads), parallel or pseudo-parallel analysis of two or more distinct content elements may be conducted according to the techniques described herein. For instance, in one such variant, two separate content elements are analyzed in parallel by two parallelized analytical chains (e.g., two virtual machines (VMs) executing workloads on CPUs/GPUs in a cluster server architecture, such as the Nvidia vCompute and vGPU solutions with Kernel Virtual Machine (KVM)). In one such implementation, the two (or more) content elements are "raced" such that the first to emerge with a suitable result is provided to a requesting encoding process (e.g., a JIT packager or stream encoder within the MSO network) in a "just in time" fashion, thereby mitigating latency.

In another variant, the output of each analytical process is used as an input to the analysis of the other asset (e.g., at an appropriate stage thereof) so as to enable comparisons or similarity analysis between the two or more assets (as to be distinguished from the multi-stage refinement/convergence described above). This similarity analysis can be performed after the results of the analysis on each asset are complete ("offline") so as to not add any further latency to the overall analysis and characterization process, especially in time-critical applications. The results of the similarity analysis can be used to, among other things, populate a database such as the auxiliary signatures database 412 described elsewhere herein, with data relating two or more assets (e.g., ads) as to similarity in one or more facets or aspects (e.g., content theme or context, presence/absence of inappropriate elements, etc.), in effect forming a relational database wherein e.g., tables of various parameters and characterization aspects are maintained and inter-related based on e.g., a query (e.g., SQL), thereby facilitating operator-based (or even machine-based) selection of alternate or substitute secondary content elements for insertion or provision to the packager apparatus previously described.

Heuristic Engine—

Figure 4:
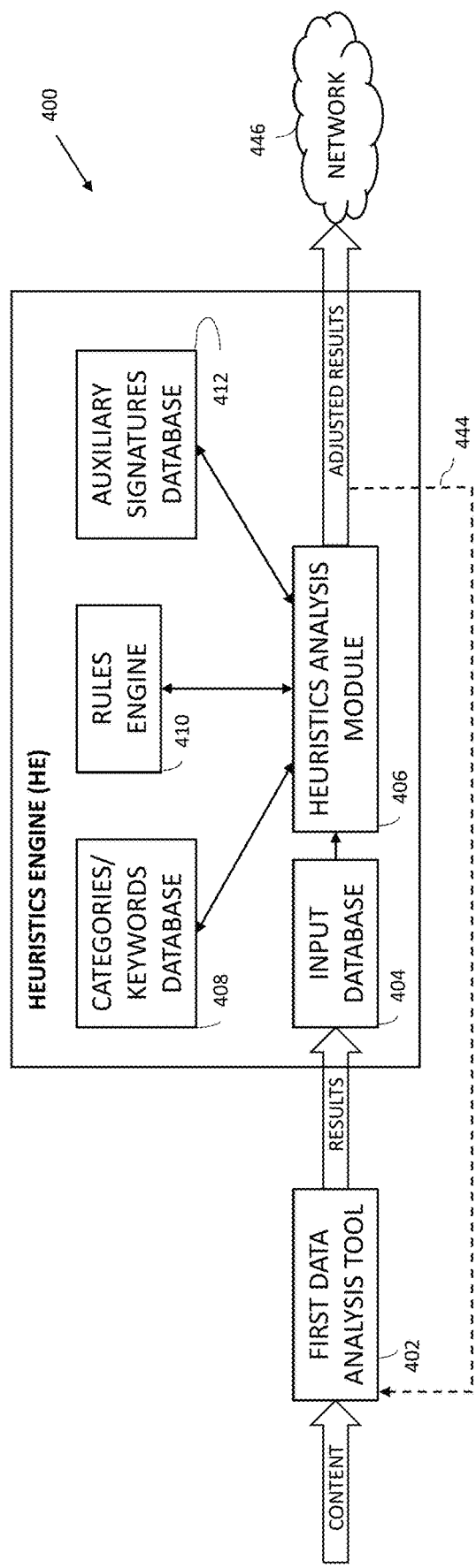
FIG. 4 is a logical block diagram of an exemplary embodiment of a Heuristic Engine (HE) apparatus, according to the present disclosure.

Referring now to FIG. 4, a logical block diagram of an exemplary embodiment of a Heuristic Engine ("HE") apparatus 400 for characterization of digital content specifically implementing the various aspects of the disclosure is shown and described. It should be appreciated by persons of ordinary skill in the art that the HE apparatus 400 may be used in conjunction with any of the aforementioned COTS data analysis tools (i.e., those of FIGS. 1A-1C as discussed herein), or any independent or dependent implementation of another data analysis tool.

As shown in FIG. 4, the exemplary embodiment of the HE apparatus 400 generally comprises a Heuristics Analysis Module (HAM) 406, which is configured to run programs that implement the digital content characterization methods (e.g., according to FIGS. 2-3B) previously described. The apparatus 400 generates an output of results that are e.g., based on results of a first data analysis tool (FDAT) 402 (e.g., the Stage 302 ML tool of FIG. 3A) adjusted by various subsequent analyses. The HE apparatus 400 may, in one exemplary configuration, include an Input DB 404; the data stored in the Input DB 404 are generated from the first data analysis tool 402 as shown in FIG. 4, although the present disclosure contemplates other input sources and storage mechanisms. Use of the Input DB 404 enables, among other things, a "buffering" between the first tool process 402 and the heuristics module analysis, for example when the two processes are not synchronized or operate independently of one another.

The Input DB 404, along with other types of DB, including Categories/Keywords DB 408 and Auxiliary Signatures DB 412 described below, may be locally attached RDBMS, SQL/NoSQL type, or in the cloud such as Amazon S3, Google cloud storage, Hadoop HDFS, etc. Furthermore, a file transfer and management system (not shown; e.g., IBM Aspera or freeware) may be used to facilitate transfer of data stored in such DBs. Also, a database management layer may be utilized for proper administration of data flows. For example, a load balancer process may be used to guard against system failures in scenarios with multiple instances of DBs, while CAP theorem constraints (e.g. limitations relating to consistency, availability, and partition tolerance of data) are handled by proper vertical/horizontal scaling architectures.

The exemplary embodiment of the HE apparatus 400 also includes a Categories/Keywords DB 408. In one implementation, the DB 408 stores data relating to categories and keywords to be detected from the data stored in the Input DB 404. The data stored in the Categories/Keywords DB 408 may be populated by a user, or a content provider or network operator via e.g., a network interface (e.g., a GUI), or even via an automated process (e.g., via input from a third-party demographics/psychographics analytical process or server).

The illustrated HE apparatus 400 also includes an Auxiliary Signatures DB 412. The Auxiliary Signatures DB 412 may also be accessible via a network interface, which allows a user or a content provider or network operator to define the auxiliary signatures to be used in the auxiliary signature analysis (see e.g., stage 308 of FIG. 3A).

It should be appreciated by persons of ordinary skill in the art that the entries stored in the foregoing DB entities may be periodically updated and/or organized in various classifications of data. Furthermore, the foregoing DB entities may be located in local or remote storage or even distributed databases, and may be of e.g., SQL or NoSQL types.

The HE apparatus 400 of FIG. 4 also includes a Rules Engine (RE) 410. The RE 410 contains logic (e.g., software routines executable on a CPU or GPU or DSP) which when executed implement the particular logical rules as discussed elsewhere herein which are called or utilized by the Heuristics Analysis Module 406 operating on the data retrieved from the various DBs (e.g., Input DB 404, Categories/Keywords DB 408, an Auxiliary Signatures DB 412) as appropriate.

In one exemplary implementation, each of the DBs 404, 408, 412 may be accessed locally or remotely by API calls made to the HE 400. For instance, in one approach, the requesting HAM 406 issues API calls to the DBs for data for the constituent HAM analysis routines. Similarly, the rules engine may make API calls to other processes to obtain requisite data/inputs. In operation, the data analysis result as obtained via the first data analysis tool 402 may be adjusted by the HAM 406 via utilization of the data in the various DBs of the foregoing types and the RE 410. The adjusted result is then used to generate data for output, the latter which is to be used by other applications (not shown) for various purposes as described elsewhere herein; e.g., storage in a database (not shown), input to the same or a different first analysis tool on a subsequent iteration, as shown by the dotted line 444 in FIG. 4, or for distribution over a network (e.g., MSO LAN 446) to other components within the content delivery architecture.

Exemplary Network Architectures—

Figure 5B:
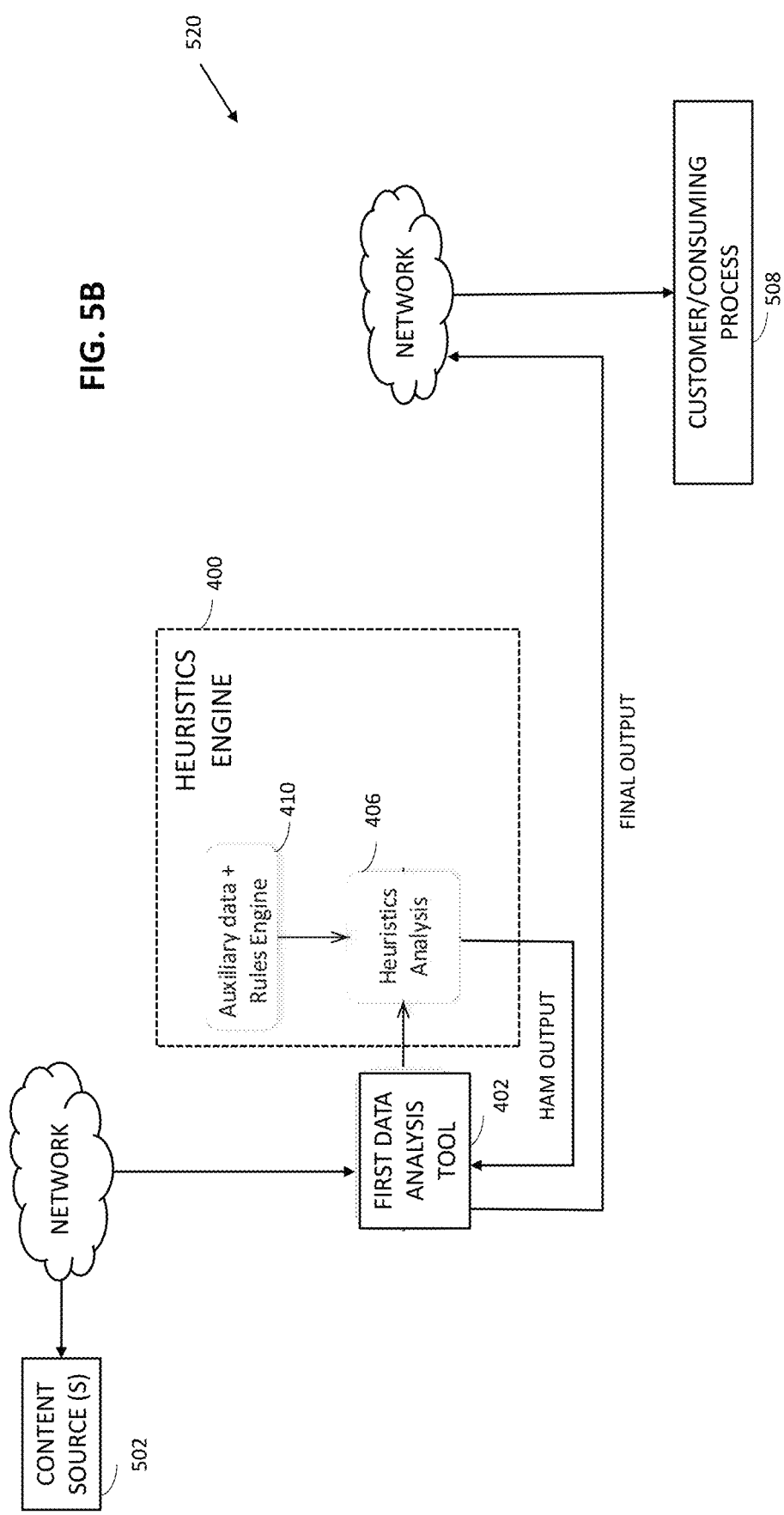
FIG. 5B is a functional block diagram representing a second embodiment of a content distribution network architecture, useful with various aspects of the present disclosure.

FIGS. 5A-5C illustrates content distribution network configurations useful with the enhanced digital content characterization methods and apparatus described herein.

The architecture 500 of FIG. 5A is configured for "one pass" or single-iteration analysis by the HE 400 after analysis by the FDAT 402. This approach has the salient advantage of being able to trade speed for accuracy, and also scales well. Specifically, the processing by the HE 400 of the FDAT output enables rapid convergence on a reasonably accurate result with minimal processing overhead.

The various components of an exemplary embodiment configuration of the network 500 of FIG. 5A may include: (i) one or more content sources 502, (ii) a first data analysis tool 402, (iii) an HE 400, and (iv) one or more consuming processes 508. A simple configuration comprising one of each of the components 502, 402, 400, and 508 is shown in FIG. 5A for simplicity, but it should be appreciated by persons of ordinary skill in the art that comparable configurations with multiple entities of each component (as well as different network topologies) may be utilized consistent with the present disclosure. For example, the network 500 may comprise a headend (not shown), which may include a billing module, a subscriber management system (SMS) and client/CPE configuration management module, a cable modem termination system (CMTS) and OOB system, as well as LAN(s) placing the various components in data communication with one another. The headend may further include a conditional access system (CAS) and a multiplexer-encrypter-modulator (MEM) coupled to a HFC network adapted to process or condition content for transmission over the network acquired from various sources. Typically, the channels being delivered from the headend to the client devices/CPE ("downstream") are multiplexed together in the headend, and sent to neighborhood hubs.

The content source 502 may be of any MVPD or content service provider including but not limited to video streaming or VOD service providers (e.g., Netflix, YouTube, Hulu, Amazon Prime Video, Sony Crackle, Sling TV, HBO Now, etc.), web providers, or yet others.

In one embodiment configuration, a digital content originating from the content source 502 $m$ is ingested at the MSO headend or other node and ultimately fed into the first data analysis tool 302, which may be an independently implemented data analysis tool or a COTS data analysis tool as described elsewhere herein.

Then, the results of the first data analysis tool 402 may be fed into the HE 400, which then would make necessary adjustments based on various embodiments according to the present disclosure.

In one embodiment, both IP data content and IP-packetized audio/video content may be delivered to a user via one or more universal edge QAM devices (not shown). According to this embodiment, all of the digital content may be delivered on DOCSIS channels, which may be received by a premises gateway or cable modem (not shown) and distributed to one or more client devices in communication therewith. Alternatively, the client devices may be configured to receive IP content directly without need of the gateway or other intermediary. As a complementary or back-up mechanism, audio/video content may also be provided in downstream (in-band) channels e.g., via traditional video in-band QAMs.

In certain embodiments, the network may also permit the aggregation and/or analysis of subscriber-, device-, and/or account-specific data (including, inter alia, particular CPE associated with such subscriber or accounts) as part of the analytics functions described herein (e.g., to collect profile data such as that described with respect to stage 326 of FIG. 3B). As but one example, device specific IDs (e.g., MAC address or the like) can be cross-correlated to MSO subscriber data maintained at e.g., the network headend(s) so as to permit or at least facilitate, inter alia, (i) user authentication; (ii) specific user identification, and (iii) determination of subscription level, and hence subscriber privileges and access to features, as well as demographics/psychographics for specific users or accounts that can be used as inputs to the HE 400. For instance, in one variant, any configuration changes to the user's devices may first be authorized via the aforementioned mechanisms, which may verify the user preferences or the type of user device in service with a particular premises or account (including rules and policies for input to the RE 410), its current firmware version, the types of features which the user is authorized to receive, its ML/AI execution capabilities, etc.

FIG. 5B shows another exemplary architecture. The architecture 520 of FIG. 5B is configured for "two-pass" or multiple-iteration analysis by the HE 400 and FDAT 402. This approach has the advantage of higher accuracy or refinement of results than the architecture of FIG. 5A. Specifically, the processing by the HE 400 of the FDAT output, and subsequent return of first iteration results to the FDAT, results in slower solution convergence but a higher degree of accuracy than the single-pass architecture. Notably, the number of iterations and/or types of FDAT analysis used on the second and subsequent passes can be configured by e.g., the network operator based on comparatively simple code modifications.

In the embodiment of FIG. 5C, the HE 400 includes a second data analysis tool (SDAT) 506, which may perform a second data analysis with the first data analysis results from the first data analysis tool 402, after adjustment(s) made to the first data analysis results based on various rules and algorithms as implemented as part of the HE 400. Hence, the analytical processes are "daisy chained." The adjusted results (which may be based on a second data analysis as discussed in the foregoing) may then be provided to downstream consumers for various purposes as described herein.

Network Configuration with HE at Consumer

Figure 6A:
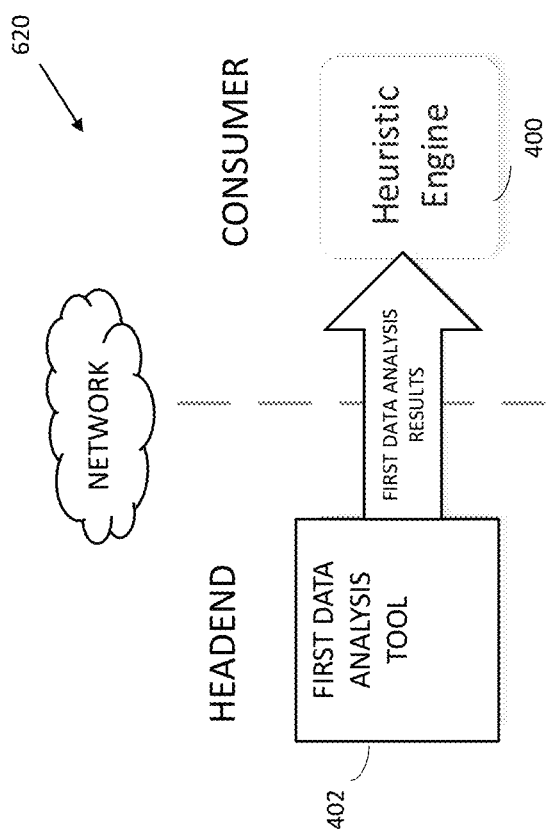
FIGS. 6A-6C are logical block diagrams illustrating various configurations of placement of the FDAT (first or "front end" data analysis tool) and HE (heuristics) processes of the present disclosure.

Referring now to FIG. 6A, an exemplary embodiment of a network configuration relating to the first data analysis tool 402 and HE 400 is shown and described. It should be appreciated by persons of ordinary skill in the art that the configuration 620 of FIG. 6A can be used as part of any combination(s) of the other network configurations and topologies (e.g., those of FIGS. 5-5C discussed herein).

In FIG. 6A, the first data analysis tool 402 is situated in an MSO network node or center (e.g., the headend or ingestion node). In this exemplary configuration, the result generated by the first data analysis as performed by the first data analysis tool 402 is transmitted via a distribution network to the consumer premises or process. As used in this context, the term "consumer" may include for example: (i) another network process, such as a JIT packager or edge cache device; (ii) a third party server or process, such as a web server; (iii) a human reviewer (e.g., MSO "QA" person), or (iv) the end user or subscriber or their premises. The adjustment on the first data analysis result, as described by the present disclosure within the HE 400 is then performed by the consumer before the content is further utilized or distributed. For example, after application of the HE 400 to a given content asset, a subscriber CPE may implement a viewing restriction based on the data analysis results obtained from the first data analysis tool 402 and adjusted by the HE 400.

Network Configuration with Network-based FDAT and HE

Figure 6B:
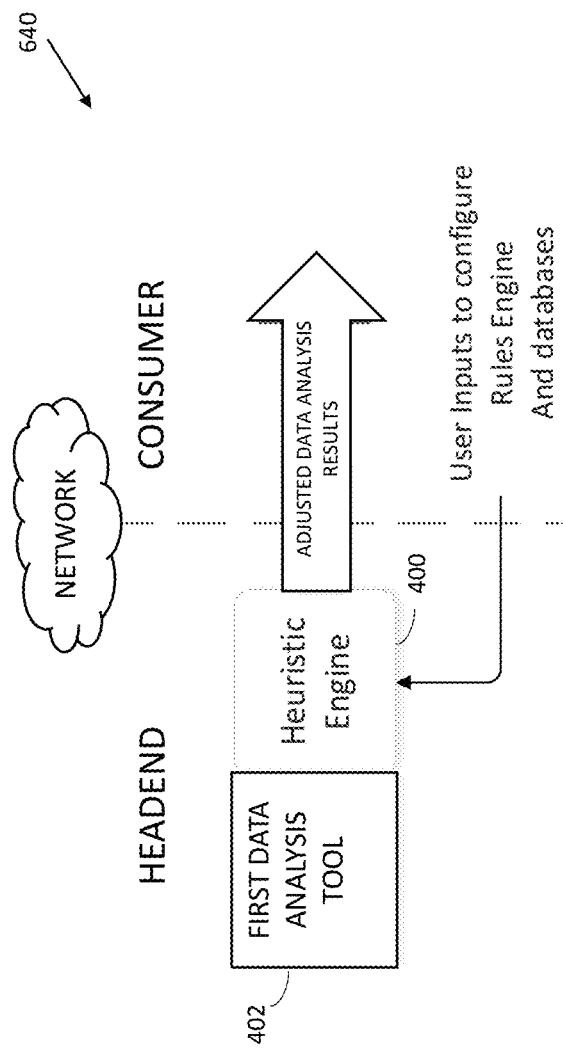

Referring now to FIG. 6B, another exemplary embodiment of a network configuration specifically relating to the first data analysis tool 402 and HE 400 is shown and described. As above it should be appreciated by persons of ordinary skill in the art that the configuration 640 of FIG. 6B can be used as part of any combination(s) of the other network configurations and topologies (e.g., those of FIGS. 5-5C discussed herein).

In FIG. 6B, the first data analysis tool 402 is situated in the network (e.g., headend), along with the HE 400. In this example, the result generated by the first data analysis tool 402 may be read directly by the HE 400 (e.g., via API call to the Input DB 404), which then may make the adjustment as described elsewhere herein. Accordingly, the adjustment of the first data analysis result by the HE 400 is performed within the headend and thus before the adjusted data analysis result reaches the consumer.

In the exemplary configuration 640 of FIG. 6B, the adjustment by the HE 400 occurs in the headend or other network node, and as such the digital content based on one or more policies relating to the digital content (as characterized through the FDAT 402 and the HE 400) may never be sent out to a customer premises e.g., due to any trigger(s) in the adjusted data analysis result and the one or more policies restricting access to the digital content based on the trigger(s). For example, one result of the analysis may be preclusion of further ingestion/use of an evaluated asset, or sequestration for use only in certain contexts (e.g., in association with an adult content context, or for certain demographic or psychographic user populations).

In one exemplary embodiment of the network configuration 640, a network interface (not shown) may be available in the HE 400 so that a consumer/user may be permitted to define and configure the RE 410 and various DBs as discussed elsewhere herein. For instance, a subsequent content consumer (e.g., a downstream or lower tier content delivery service or distributor) may utilize an API to the HE 400 to "tweak" their particular rules and policies (e.g., keywords, what is appropriate, threshold values, etc.) for their individual contexts.

Network Configuration with Second Data Analysis Tool

Figure 6C:
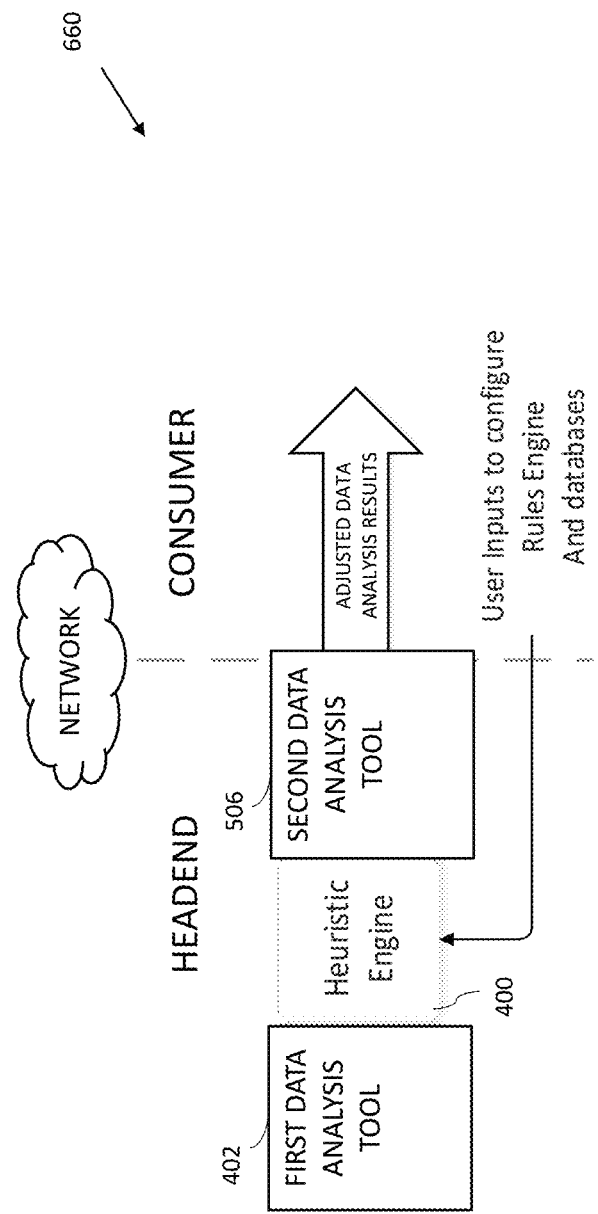

Referring now to FIG. 6C, one exemplary embodiment of a network configuration specifically relating to the first data analysis tool 402, HE 400, and a second data analysis tool 506. It should be appreciated by persons of ordinary skill in the art that the configuration 660 of FIG. 6C can be used as part of any combination(s) of the other network configurations and topologies (e.g., those of FIGS. 5-5C discussed herein).

In FIG. 6C, the first data analysis tool 402 is situated in the network; e.g., headend, along with the HE 400 and also the second data analysis tool 506. In one exemplary configuration, the second data analysis tool 506 may be merely another identical instance of the first data analysis tool 402 (i.e., to repeat the process of the first data analysis but with the results obtained from the HE 400 for a second pass of data analysis). In another approach, the second tool 506 may be a non-identical instance of the same tool (i.e., algorithmically adjusted to be complementary to the first instance). In yet another exemplary configuration, the second data analysis tool 506 may be a different tool of a third-party (e.g., a process maintained and operated on e.g., a third party data cluster or could entity), or as implemented by the content provider or network operator.

Similar to the exemplary configuration with only one data analysis tool and the HE 400 in the network/headend as described supra, the data analysis result generated by the first data analysis tool 402 may be read directly/indirectly by the HE 400, which then may make the adjustment as described by the present disclosure. Furthermore, the adjusted result from the HE 400 then may be fed directly/ indirectly into the second data analysis tool 506, which generates a second data analysis result based on the adjusted result from the HE 400 and the data analysis as described elsewhere herein.

Exemplary Compute Platforms—

Figure 7A:
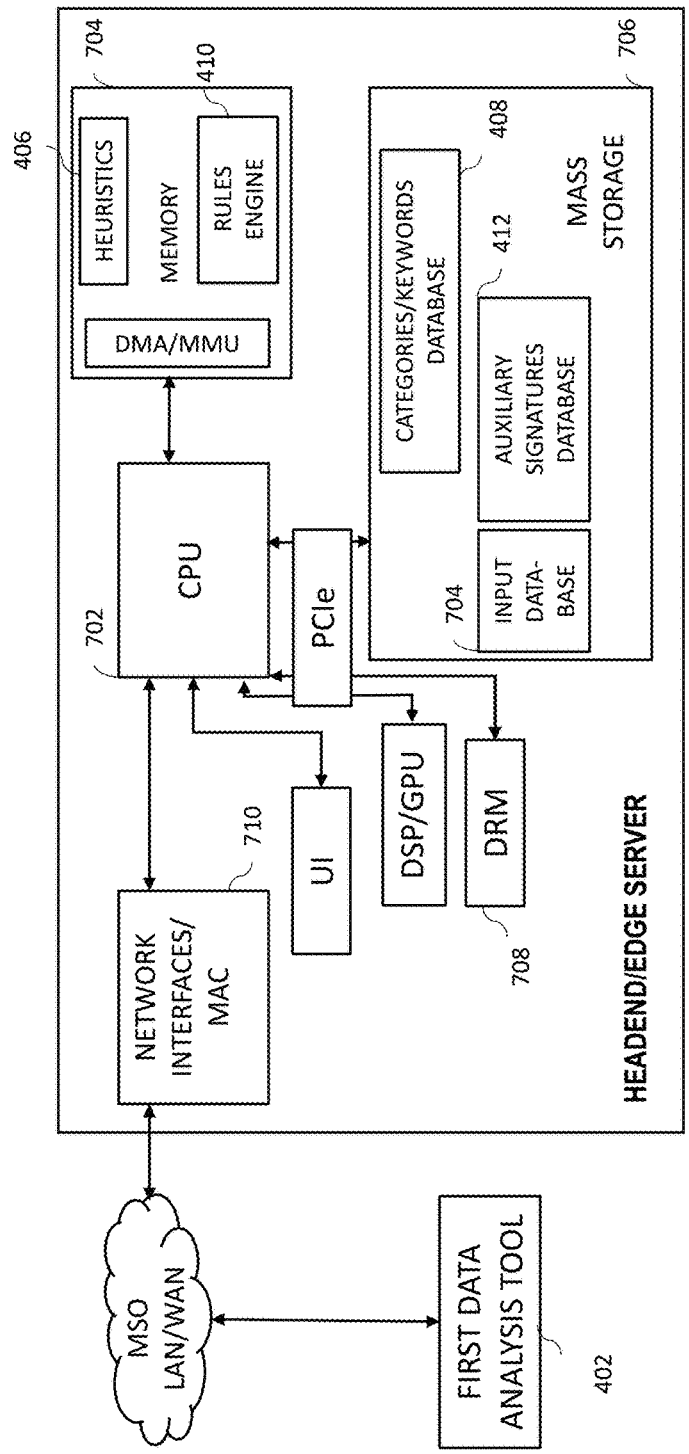
FIG. 7A is a functional block diagram of a first exemplary embodiment of an HE-enabled server device according to the present disclosure.

FIG. 7A is a functional block diagram of an exemplary embodiment of a network apparatus with HE/analytics subsystem according to the present disclosure. As shown in FIG. 7A, the apparatus 700 includes, inter alia, a processor subsystem with CPU 702, a memory module 704, a mass storage module 706, and one or more network interface(s) 710.

In one exemplary embodiment, the processor subsystem 702 may include one or more of a microprocessor (e.g., RISC core(s) such as ARM core), field-programmable gate array, or plurality of processing components mounted on one or more substrates (e.g., printed circuit board). The processor subsystem/CPU 702 may also comprise an internal cache memory (e.g., L1/L2/L3 cache). The processor subsystem is in communication with a memory subsystem 704, the latter including memory which may for example comprise SRAM, flash, and/or SDRAM components. The memory subsystem may implement one or more of DMA-type hardware, so as to facilitate data accesses as is well known in the art. The memory subsystem of the exemplary embodiment contains computer-executable instructions which are executable by the processor subsystem.

In another exemplary embodiment, the mass storage module 706, which comprises a nonvolatile medium (e.g., magnetic, optical, and/or charge based (e.g., flash)), may include Input DB 404, Categories/Keywords DB 408, and Auxiliary Signatures DB 412. The computer-executable instructions for characterizing digital content (e.g., by enhancing the result from the first data analysis tool 402 according to the present disclosure) may be run by the processor subsystem 702, which is in communication with the aforementioned DBs, RE 410, and DRM 708 to gain access to DRM-protected digital content as discussed elsewhere herein.

In this and various embodiments, the processor subsystem/CPU 702 is configured to execute at least one computer program stored in memory 704 (e.g., a non-transitory computer readable storage medium). A plurality of computer programs are used and are configured to perform various functions such as communication with relevant network entities such as the first data analysis tool 402 and characterization of digital content according to the present disclosure.

Also shown is a GPU card in data communication with the CPU via a PCIe bus. In one variant, the GPU card comprises an Nvidia Tesla V100 Volta-based device, although Turing- and Pascal-based architected devices may be used as well (e.g., the dual GPU K80, P100 accelerator, etc.). In this capacity, the GPU card (which may include one, two, or more GPUs) can be used as a high-speed processing asset for the ML/AI algorithms operative within the HE module 400, e.g., using a CUDA or similar programming model.

Figure 7B:
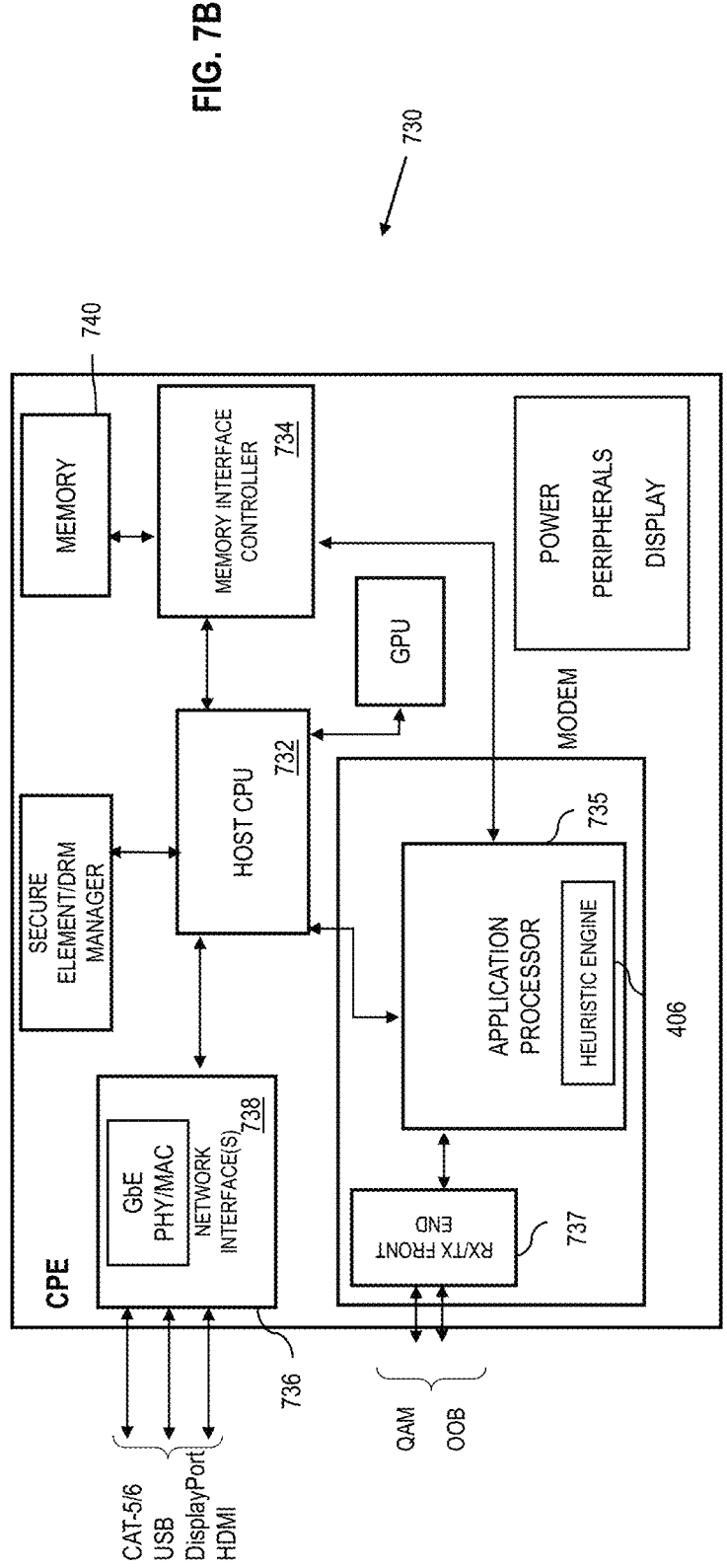
FIG. 7B is a functional block diagram of a first exemplary embodiment of an HE-enabled client device apparatus (DSTB or gateway) according to the present disclosure.

FIG. 7B is a functional block diagram of a second exemplary embodiment of a HE-enabled client device 730 according to the present disclosure. As shown in FIG. 7B, the client device is a premises DSTB or gateway and includes, inter alia, a processor subsystem with CPU 722, a memory module 724, one or more QAM/OOB radio frequency (RF) network interfaces 728, GPU/video co-processor 730, a secure element (SE) and DRM manager 732, and an RF baseband processing module 736.

In one exemplary embodiment, the processor subsystem 722 may include one or more of a digital signal processor (DSP), microprocessor (e.g., RISC core(s) such as ARM core), field-programmable gate array, or plurality of processing components mounted on one or more substrates (e.g., printed circuit board). The processor subsystem/CPU 722 may also comprise an internal cache memory (e.g., L1/L2/L3 cache). The processor subsystem is in communication with a memory subsystem 724, the latter including memory which may for example comprise SRAM, flash, and/or SDRAM components. The memory subsystem may implement one or more of DMA-type hardware, so as to facilitate data accesses as is well known in the art. The memory subsystem of the exemplary embodiment contains computer-executable instructions which are executable by the processor subsystem.

In this and various embodiments, the processor subsystem/CPU 722 is configured to execute at least one computer program stored in program memory 724 (e.g., a non-transitory computer readable storage medium). A GPU/video co-processor 730 and SE/DRM Manager 732 are also in data communication with the processor subsystem 722, and collectively the foregoing components include a plurality of computer programs/firmware configured to perform various functions such as conditional access/digital rights management, decryption, manifest unpacking, content decode, as well as HE-related analytical functions. Various other functions useful for and typical in consumer electronics including baseband management (e.g., transmit and receive functions via the baseband processor 736 and associated Tx and Rx chains of the RF front end 728. For example, in one embodiment, the Tx and Rx chains are part of an RF front end and tuner (part of the interface 728) used to receive and demodulate the QAM-256 signals transmitted over the MSO HFC network. Once the comparatively higher frequency signals received on the QAM(s) have been down-converted by the front end 728, the baseband processing module 736 is utilized to further process the down-converted signals, and may include digital filtration, FEC, CRC, and other PHY-related functions.

The tuner (or additional tuner) of the RF front end 728 is also capable of tuning to and receiving OOB (out-of-band) signals on an OOB channel provided by the MSO for e.g., low bandwidth communications. The RF front end 728 also comprises an OOB transmitter module, useful for transmitting OOB data communications (such as data resulting from the indigenous HE analytics back up to a network entity via the HFC backhaul).

The network interface 728 generally further incorporates an assembly of filters, low noise amplifiers (LNAs), and power amplifiers (PAs) that are configured to receive/transmit a modulated waveform via the DSTB's coax interface.

In one or more embodiments, the GPU/video co-processor/manager and SE/DRM manager each include an internal cache or memory configured to hold data associated with one or more functions (e.g., ML/AI algorithm execution data and results, decoded video frames, decryption keys, etc.). In some embodiments, application program interfaces (APIs) such as those included in an MSO-provided application such or those natively available on the client device (e.g., as part of the decode/display application, or exclusively internal to the RF baseband or SE/DRM manager modules 736, 732) may also reside in the internal cache(s), or other memory 724. In one such variant, the network-side process (e.g., the server device of FIG. 7A can make API calls to the HE process on the CPE, such as to retrieve analytics results, obtain configuration data, etc.).

Figure 7C:
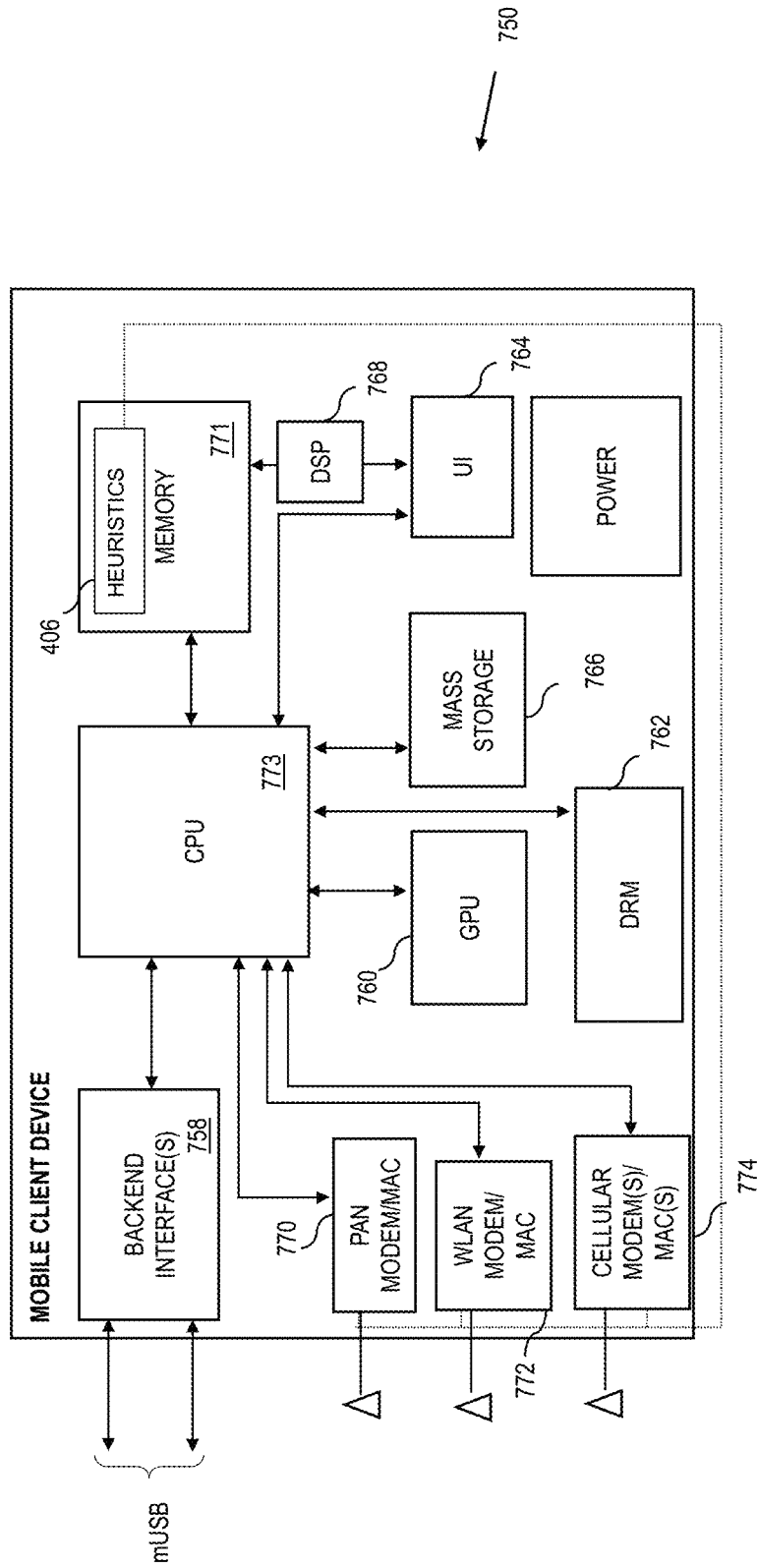
FIG. 7C is a functional block diagram of a first exemplary embodiment of an HE-enabled client device apparatus (3GPP 4G/5G NR UE) according to the present disclosure.

FIG. 7C is a functional block diagram of an exemplary embodiment of an HE-enabled mobile device 750 according to the present disclosure. As shown in FIG. 7C, the mobile device includes, inter alia, a processor subsystem with CPU 773, a memory module 771, one or more network interfaces 758, graphics co-processor (GPU) 760, a DRM manager 762, mass storage device 766, DSP 768, and user interface (UI) 764. The device 750 also includes a PAN interface (e.g., IoT, Bluetooth) with MAC 770, WLAN (802.11) interface 772, and cellular data/voice interface(s) 774 (e.g., LTE for data with 3G/GSM for voice, or 5G NR).

In one exemplary embodiment, the processor subsystem/CPU 773 may include one or more of a digital signal processor (DSP), microprocessor (e.g., RISC core(s) such as ARM core), field-programmable gate array, or plurality of processing components mounted on one or more substrates (e.g., printed circuit board). The processor subsystem/CPU 773 may also comprise an internal cache memory (e.g., L1/L2/L3 cache). The processor subsystem is in communication with a memory subsystem 771, the latter including memory which may for example comprise SRAM, flash, and/or SDRAM components. The memory subsystem may implement one or more of DMA-type hardware, so as to facilitate data accesses as is well known in the art. The memory subsystem of the exemplary embodiment contains computer-executable instructions which are executable by the processor subsystem.

In this and various embodiments, the processor subsystem/CPU 773 is configured to execute at least one computer program stored in program memory 771 (e.g., a non-transitory computer readable storage medium). A GPU 760 and DRM module 760 are also in data communication with the processor subsystem, and collectively the foregoing components include a plurality of computer programs/firmware configured to perform various functions such as communication with relevant network entities such as a network-side HE 400, FDAT 402, or other processing entity. It will be appreciated that the illustrated HAM 406 may in fact be integrated with an MSO app (e.g., Android OS app operative to execute on the Linux kernel of the CPU), or be a separate logical entity on the mobile client. For instance, in one implementation, the app includes the necessary logic and functionality to communicate with the "cloud" HE 400 for e.g., analytics results and deep learning results data communication. The app is in one variant authored and provided by the MSO or its proxy to the user (the latter which may be a user/subscriber). Various other functions useful for and typical in consumer electronics including user interface via the UI 764 (e.g., capacitive touch-screen with soft function key generation) and speech recognition via the DSP 768 are provided in the exemplary mobile device 304.

GPU-Based Processing Systems—

Figure 8A:
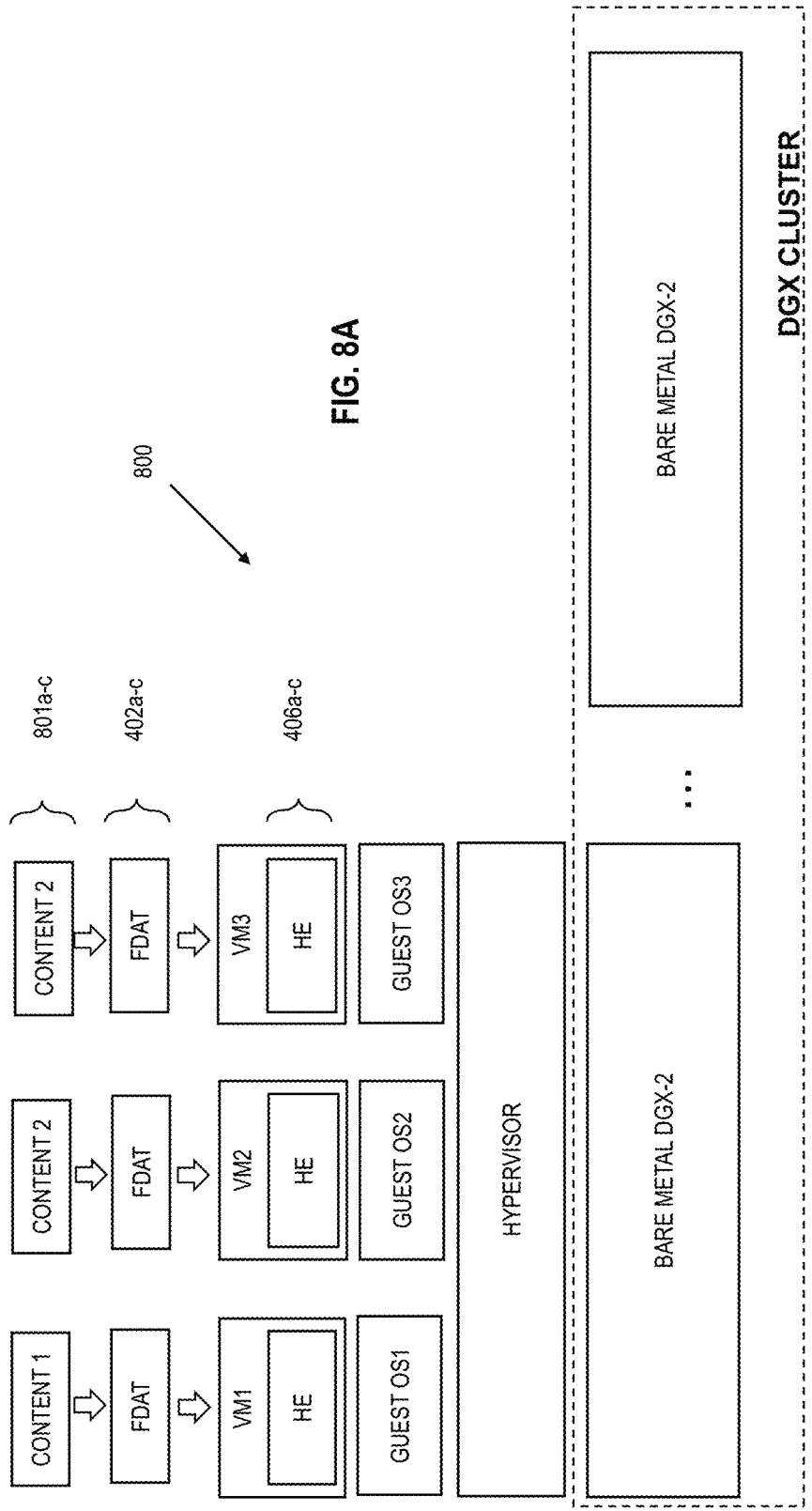
FIG. 8A is a block diagram illustrating a first HE-enabled software stack configuration of an accelerated GPU-based processing system with homogeneous FDAT/HE configuration, according to the present disclosure.

FIG. 8A is a block diagram illustrating a first HE-enabled software stack configuration of an accelerated GPU-based processing system 800 with homogeneous FDAT/HE configuration, according to the present disclosure. In this embodiment, a high-performance GPU-based device (e.g., Nvidia DGX-2) is utilized as a basis for VM access by a number of different VMs, each allocated a portion of the DGX-2 GPU processing capability and memory. The exemplary DGX-2 is particularly adapted for e.g., deep learning and ML/AI processing at high speed and processing efficiency. Each of the different content elements 801*a-c* are input to homogeneous FDATs 402 which supply the HE's 406 operative to run within each of their own containerized VM environment. This architecture 800 is particularly adapted for parallel processing of different input content elements 801*a-c* using the same FDAT and HE engine configurations.

FIG. 8B is a block diagram illustrating a second HE-enabled software stack configuration of an accelerated GPU-based processing system 810 with heterogeneous FDAT/ homogeneous HE configuration, according to the present disclosure. In this embodiment, the architecture uses a heterogeneous FDAT configuration (e.g., different ML COTS engines as the "front end" on each VM, the latter having homogeneous HE's 406). This architecture is adapted to leverage the strengths/weaknesses of different COTS front ends 402. For instance, in one variant, similar types of content elements 801*a-c* are aggregated to leverage a given COTS FDAT strength, and fed through the same VM "stack" on the system 810.

FIG. 8C is a block diagram illustrating a third HE-enabled software stack configuration of an accelerated GPU-based processing system 820 with homogeneous FDAT/heterogeneous HE configuration, according to the present disclosure. In this embodiment, the architecture uses a homogeneous FDAT configuration (e.g., the same ML COTS engines as the "front end" on each VM, the latter having heterogeneous HE's 406). This architecture is adapted to leverage the strengths/weaknesses of different HE engine configurations 406. For instance, in one variant, similar types of content elements 801*a-c* are aggregated to leverage a given HE engine strength, and fed through the same FDAT and VM "stack" on the system 810.

Figure 8D:
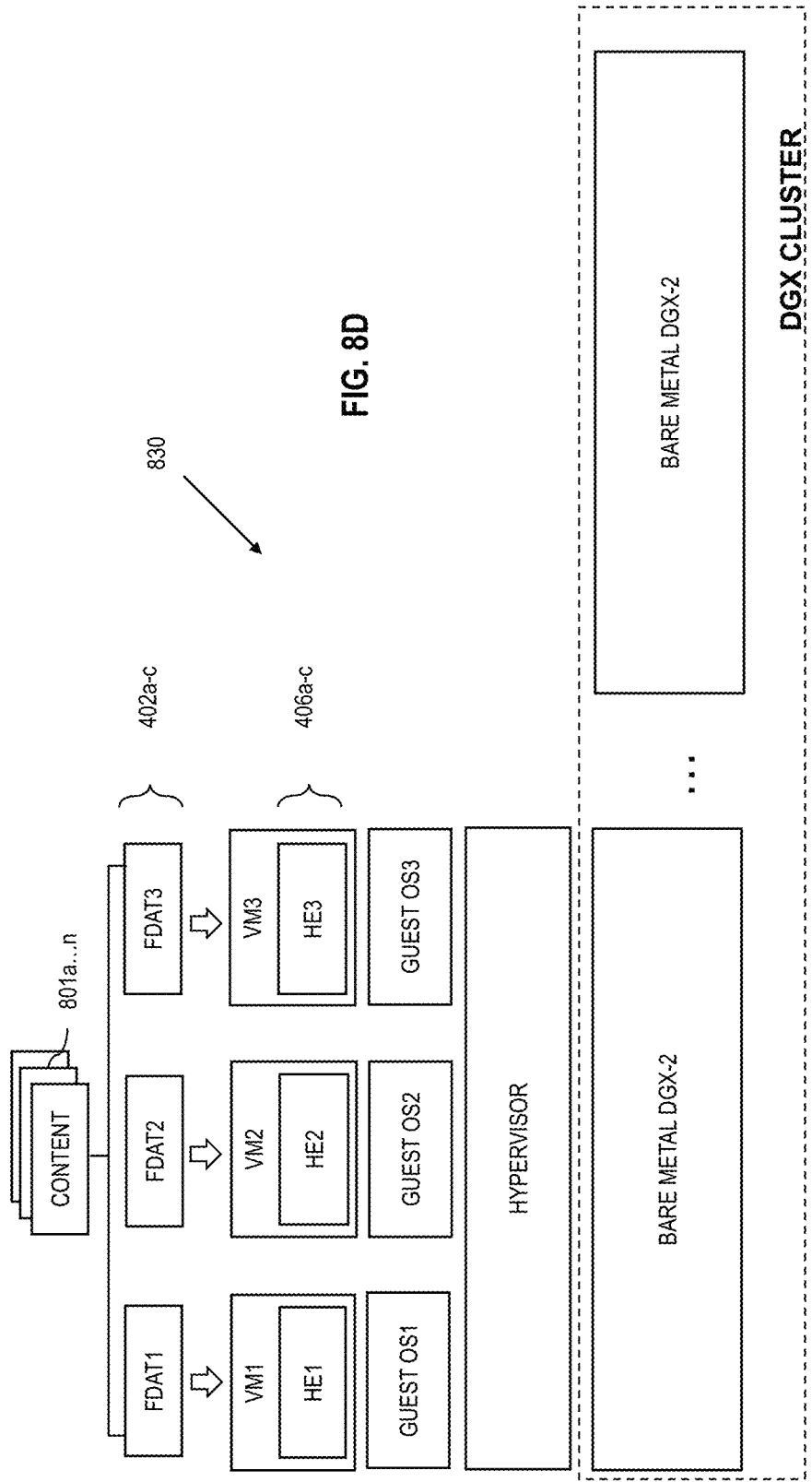
FIG. 8D is a block diagram illustrating a fourth HE-enabled software stack configuration of an accelerated GPU-based processing system with heterogeneous FDAT/HE configuration, according to the present disclosure.

FIG. 8D is a block diagram illustrating a fourth HE-enabled software stack configuration of an accelerated GPU-based processing system 830 with heterogeneous FDAT/HE configuration, according to the present disclosure. In this embodiment, the architecture uses a heterogeneous FDAT configuration (e.g., different ML COTS engines as the "front end" on each VM) and heterogeneous HE's 406. This architecture is adapted to leverage the strengths/weaknesses of different combinations of COTS front ends 402 and HE's 406. For instance, in one variant, the same content element 801 is fed to all three FDATs/VM stacks (whether sequentially or simultaneously) to, inter alia, compare the efficacy of each combination, the results of such comparison which can be used to better optimize or configure subsequent instances of the FDATs/HE's. Additionally, the "best" of the three results can be selected for subsequent utilization, analysis or distribution (e.g., transmission to a JIT encoder/ packager for inclusion in an encoded media stream).

It will also be appreciated that various combinations, hybrids, or even time-shared variants of the foregoing may be used consistent with the present disclosure. For example, it may be that one of the four architectures 800, 810, 820, 830 described above may be optimized for temporal latency-critical applications while also producing sufficiently accurate results. As such, that architecture can be selected for content element processing during or in support of such applications, whereas the other architectures may be better suited to other types of applications (e.g., at different times of day, in support of different geographic regions, etc.).

Advantageously, the VM-based approach above enables multi-process/VM utilization simultaneously of a common GPU asset or cluster, with near bare-metal performance levels. For instance, the MSO may maintain a single DGX-2 or cluster and provide various entities within its infrastructure VM-based access to the centrally maintained GPU assets. Since the DGX-2 GPUs (and even cluster of DGX-2s) are in one embodiment physically co-located, the actual computations in support of the DL/ML/AI algorithms is not penalized by a more distributed architecture, yet the user space/VMs can be physically and geographically disparate. "Firewalling" or containment between the VMs and their allocated GPU resources is also advantageously maintained, and as such, one exemplary model herein allows for control of the VMs by the content sources/providers on MSO maintained cluster or cloud infrastructure. Accordingly, in one business model, each content source can "self validate" their prospective secondary or other content virtually through the MSO cloud compute resources before ingestion by the MSO. As such, anything validated and subsequently ingested has already been analyzed for e.g., appropriateness and context, thereby obviating such processing by the MSO (which can be very beneficial in high-volume/critical latency "real time" applications, such as with live content.

It will be appreciated by those skilled in the art that other use cases may be applicable. For example, the primary use case studied was for ad-ingest quality control, although the method is applicable to other cases. The methods and apparatus of the present disclosure may be useful for identifying ads with restricted content (e.g., alcohol, tobacco, firearms, drugs, gambling, adult content and political), which are not allowed to air during certain TV programs. Furthermore, video content may be analyzed by the methods and apparatus of the present disclosure for recommending ad opportunities for contextual advertising.

The methods and apparatus disclosed herein are not limited to current usages. As metadata become available for more types of data, the methods and apparatus of the present disclosure may be applied to e.g., virtual reality (VR)/ augmented reality (AR)/3D/holographic multimedia as well as haptic/tactile sensory implementations.

While the above detailed description has shown, described, and pointed out novel features of the disclosed embodiments as applied to various systems, it will be understood that various omissions, substitutions, and changes in the form and details of the device or process illustrated may be made by those skilled in the art without departing from the principles described herein. This description is in no way meant to be limiting, but rather should be taken as illustrative of the general principles of the disclosure. The scope of the disclosure should be determined with reference to the claims.

What is claimed is:

1. A computerized apparatus for accelerated characterization of digital content comprising:
   processor apparatus;
   network interface apparatus in data communication with a computerized data analysis entity; and
   storage apparatus in data communication with the processor apparatus, the storage apparatus comprising at least one computer program configured to, when executed on the processor apparatus, cause the computerized apparatus to:
      receive data relating to a result of a first algorithmic data analysis performed by the computerized data analysis entity, the result of the first algorithmic data analysis comprising an identification of an absence of respective ones of a plurality of primary signatures, the absence of the respective ones of the plurality of primary signatures indicating a respective plurality of items are absent in the digital content;
      perform an algorithmic validity check on the data relating to the result of the first algorithmic data analysis, the algorithmic validity check comprising:

(i) an evaluation of a plurality of digital data streams to identify an absence of respective ones of a plurality of auxiliary signatures in the digital contend; and (ii) a comparison of respective ones of the plurality of auxiliary signatures against the respective ones of the plurality of primary signatures, wherein the plurality of auxiliary signatures comprise descriptors of the respective plurality of items;

modify the data relating to the result of the first algorithmic data analysis based at least on the algorithmic validity check;

perform a second algorithmic data analysis based on the modified data; and generate data relating to a result of the second data analysis.

2. The computerized apparatus of claim 1, wherein the computerized data analysis entity comprises a cloud-based data analysis apparatus accessible via the network interface apparatus.

3. The computerized apparatus of claim 1, wherein the storage apparatus comprises a database for storing the data relating to the result of the first algorithmic data analysis.

4. The computerized apparatus of claim 1, wherein the storage apparatus comprises a database for storing one or more keywords useful for the modification of the data relating to the result of the first algorithmic data analysis.

5. The computerized apparatus of claim 1, wherein the at least one computer program is further configured to perform the second algorithmic data analysis via another computerized data analysis entity.

6. The computerized apparatus of claim 1, wherein one or more of the plurality of auxiliary signature are determined based on customer profile data, the customer profile data comprising at least viewing history data associated with one or more subscribers of a managed content delivery network.

7. The computerized apparatus of claim 1, wherein:
the performing of the algorithmic validity check further comprises assigning one or more respective values to the one or more descriptors, the one or more respective values based on a level of relatedness to the one or more characteristics; and the modification of the data relating to the result of the first data analysis based at least on the algorithmic validity check comprises, based at least on the identification of the absence of the respective ones of the plurality of auxiliary signatures in the digital content, dividing the one or more values associated with the one or more respective confidence levels by the one or more respective values assigned to the one or more descriptors, such that the one or more values associated with the one or more respective confidence levels are decreased based on the absence of the one or more descriptors in the digital content.

8. A computerized method of characterizing digital content in a content distribution network, the computerized method comprising:

receiving first data indicative of one or more characteristics alleged to be present in the digital content;

performing an algorithmic validity check on the first data, the algorithmic validity check comprising:

(i) analyzing an audio or data stream associated with the digital content to identify one or more descriptors of the one or more characteristics;

(ii) comparing the one or more descriptors to the one or more characteristics;

(iii) based on the comparing, assigning one or more respective values to the one or more descriptors, the one or more respective values based on a level of relatedness to the one or more characteristics; and (iv) analyzing the digital content to determine an absence of the one or more descriptors in the digital content; and based at least on the algorithmic validity check, modifying one or more values associated with one or more respective confidence levels associated with the one or more characteristics being absent in the digital content;

wherein the modifying of the one or more values associated with the one or more respective confidence levels comprises, based at least on the determination of the absence of the one or more descriptors in the digital content, dividing the one or more values associated with the one or more respective confidence levels by the one or more respective values assigned to the one or more descriptors, such that the one or more values associated with the one or more respective confidence levels are decreased based at least on the absence of the one or more descriptors in the digital content.

9. The computerized method of claim 8, wherein:
the performing of the algorithmic validity check further comprises (i) quantizing an accuracy of the first data, and (ii) based on the quantizing, evaluating whether a value associated with the accuracy of the first data is within a prescribed threshold level, the threshold level based at least in part on one or more policies specified by a computerized network entity of the content distribution network; and the modifying is based on the evaluating.

10. The computerized method of claim 9, wherein the modifying of the one or more values associated with the one or more respective confidence levels based on the evaluating comprises adjusting the value associated with the accuracy of the first data by at least one factor.

11. The computerized method of claim 8, further comprising, based at least on the modifying, determining that one or more other characteristics are present in the digital content, the determining that the one or more other characteristics are present in the digital content comprising identifying an advertisement with content restricted for a prescribed audience.

12. Computer readable apparatus comprising a non-transitory storage medium, the non-transitory storage medium comprising at least one computer program having a plurality of instructions, the plurality of instructions configured to, when executed on a digital processing apparatus, cause a computerized apparatus to:

receive data relating to a result of a first algorithmic data analysis, the result of the first algorithmic data analysis comprising an identification of an absence of one or more primary signatures, the absence of the one or more primary signatures indicating one or more respective attributes or elements are absent from digital content;

perform an algorithmic validity check on the data relating to the result of the first algorithmic data analysis, the algorithmic validity check comprising: (i) an evaluation of one or more digital data streams to identify an absence of one or more auxiliary signatures from the digital content, and (ii) a comparison of the one or more auxiliary signatures against the one or more primary signatures, wherein the one or more auxiliary signatures comprise one or more descriptors of the one or more respective attributes or elements;

modify the data relating to the result of the first algorithmic data analysis based at least on the algorithmic validity check;

perform a second algorithmic data analysis based on the modified data; and generate data relating to a result of the second data analysis.

13. The computer readable apparatus of claim 12, wherein the plurality of instructions are further configured to, when executed on a digital processing apparatus, cause the computerized apparatus to:

assign at least one rating or confidence metric to absence of the one or more primary signatures, the at least one rating or confidence metric indicative of a likelihood that the one or more respective attributes or elements are absent from the digital content.

14. The computer readable apparatus of claim 12, wherein the plurality of instructions are further configured to, when executed on a digital processing apparatus, cause the computerized apparatus to:

based at least in part on the data relating to the result of the second data analysis, prevent distribution of the digital content asset to a prescribed portion of a plurality of subscribers of a managed content distribution network.

15. The computer readable apparatus of claim 12, wherein the one or more digital data streams comprise a plurality of digital data streams comprising at least one of: image data, audio data, or text data, of a decoded digital video content asset.

16. The computer readable apparatus of claim 12, wherein the plurality of instructions are further configured to, when executed on a digital processing apparatus, cause the computerized apparatus to:

access a database, the database comprising customer data relating to customers of a managed content delivery network; and identify the one or more descriptors of the one or more respective attributes or elements from the customer data.

17. The computer readable apparatus of claim 12, wherein the plurality of instructions are further configured to, when executed on a digital processing apparatus, cause the computerized apparatus to:

based at least in part on the data relating to the result of the second data analysis, create a digital content stream comprising at least the digital content and the one or more second digital content elements for delivery to a user of a content delivery network.

18. The computer readable apparatus of claim 12, wherein the one or more descriptors of the one or more respective attributes or elements comprise at least one of size, location, or format of text associated with the one or more respective attributes or elements.

19. The computer readable apparatus of claim 12, wherein:

the first algorithmic data analysis comprises analysis, with respect to time, of at least two separate content elements in parallel by at least two respective parallelized analytical chains; and the identification of the absence of one or more primary signatures comprises a determination of a first one of the at least two separate content elements to emerge as a suitable result.

20. The computer readable apparatus of claim 12, wherein the modification of the data relating to the result of the first algorithmic data analysis comprises an adjustment of a value associated with an accuracy of the result of the first algorithmic data analysis.

* * * * *